(12) United States Patent
Koenig et al.

(10) Patent No.: US 9,644,969 B2
(45) Date of Patent: May 9, 2017

(54) RECREATIONAL VEHICLE INTERACTIVE TELEMETRY, MAPPING, AND TRIP PLANNING SYSTEM

(71) Applicant: Polaris Industries Inc., Medina, MN (US)

(72) Inventors: David J. Koenig, Wyoming, MN (US); Joseph D. Tharaldson, Roseau, MN (US); Adam C. Koosmann, Oak Grove, MN (US); Christopher G. Wolf, Excelsior, MN (US); William C. Fisher, Eden Prairie, MN (US); Kim A. Weckert, Hanover, MN (US); John W. Callahan, St. Paul, MN (US); Daren W. Herman, Fargo, ND (US); Todd L. Frostad, Chanhassen, MN (US); Gary L. Gustafon, Clear Lake, MN (US); Stephen G. Crain, Wyoming, MN (US); Jonathan P. Oakden-Graus, Stacy, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 14/770,424

(22) PCT Filed: Feb. 26, 2014

(86) PCT No.: PCT/US2014/018638
§ 371 (c)(1),
(2) Date: Aug. 25, 2015

(87) PCT Pub. No.: WO2014/134148
PCT Pub. Date: Sep. 4, 2014

(65) Prior Publication Data
US 2016/0003621 A1    Jan. 7, 2016

Related U.S. Application Data

(60) Provisional application No. 61/926,013, filed on Jan. 10, 2014, provisional application No. 61/769,378, filed on Feb. 26, 2013.

(51) Int. Cl.
*G06F 3/0485* (2013.01)
*G01C 21/00* (2006.01)
(Continued)

(52) U.S. Cl.
CPC ............. *G01C 21/00* (2013.01); *B60K 35/00* (2013.01); *G01C 21/20* (2013.01); *G06F 3/0482* (2013.01);
(Continued)

(58) Field of Classification Search
CPC . G01C 21/00; G06F 3/04842; G06F 3/04845; G06F 3/0485; G06F 3/0482;
(Continued)

(56) References Cited

U.S. PATENT DOCUMENTS 3,784,839 A    1/1974  Weber
3,987,408 A    10/1976  Sassover et al.
(Continued)

FOREIGN PATENT DOCUMENTS

DE    43 26 328    11/1994
DE    4431070    3/1996
(Continued)

OTHER PUBLICATIONS

International Search Report and Written Opinion issued by the European Patent Office, dated Aug. 13, 2014, for related International Application No. PCT/US2014/018638; 13 pages.
(Continued)

*Primary Examiner* — Yonel Beaulieu
*Assistant Examiner* — Martin Weeks
(74) *Attorney, Agent, or Firm* — Faegre Baker Daniels LLP

(57) ABSTRACT

An interactive system for use in connection with recreational vehicle usage includes a server system, including an off-road trail database containing trail data, trail condition information, and points-of-interest information, as well as a trip mapping system accessible by any of a plurality of riders, allowing a rider to create a route based on the data in the off-road trip database. The server system further includes a trail maintenance interface accessible by users affiliated with an authorized group to edit the trail data, trail condition information, and points-of-interest information associated with the authorized group. The server system includes a location data management system configured to receive location data, allowing a rider to publish location information to one or more other riders, and a user feedback interface configured to receive trip data from riders for publication, including information describing an actual route and user data associated with that route.

40 Claims, 46 Drawing Sheets

(51) Int. Cl.
| | | |
|---|---|---|
| G01C 21/20 | (2006.01) | |
| B60K 35/00 | (2006.01) | |
| G06F 3/0482 | (2013.01) | |
| G06F 3/0484 | (2013.01) | |
| G07C 5/00 | (2006.01) | |

(52) U.S. Cl.
CPC ........ *G06F 3/0485* (2013.01); *G06F 3/04842* (2013.01); *G06F 3/04845* (2013.01); *G07C 5/008* (2013.01); *B60K 2350/1004* (2013.01); *B60K 2350/1072* (2013.01)

(58) Field of Classification Search
CPC ............ B60K 35/00; B60K 2350/1004; B60K 2350/1072; G07C 5/008
See application file for complete search history.

(56) References Cited

U.S. PATENT DOCUMENTS

| | | | |
|---|---|---|---|
| 4,532,507 A | 7/1985 | Edson et al. | |
| 4,675,865 A | 6/1987 | DeVries et al. | |
| 4,682,062 A | 7/1987 | Weinberger | |
| 4,696,148 A | 9/1987 | Brace | |
| 4,715,031 A | 12/1987 | Crawford et al. | |
| 4,745,596 A | 5/1988 | Sato | |
| 4,991,683 A | 2/1991 | Garretto et al. | |
| 5,023,591 A | 6/1991 | Edwards | |
| 5,040,168 A | 8/1991 | Maue et al. | |
| 5,070,832 A | 12/1991 | Hapka et al. | |
| 5,081,586 A | 1/1992 | Barthel et al. | |
| 5,168,957 A | 12/1992 | Ross | |
| 5,191,531 A | 3/1993 | Kurosu et al. | |
| 5,311,514 A | 5/1994 | Cook | |
| 5,418,526 A | 5/1995 | Crawford | |
| 5,491,631 A | 2/1996 | Shirane et al. | |
| 5,513,107 A | 4/1996 | Gormley | |
| 5,742,226 A | 4/1998 | Szabo et al. | |
| 5,767,771 A | 6/1998 | Lamont | |
| 5,769,051 A | 6/1998 | Bayron et al. | |
| 5,803,043 A | 9/1998 | Bayron et al. | |
| 5,856,976 A | 1/1999 | Hirano | |
| 5,869,907 A | 2/1999 | Marler | |
| 6,060,981 A | 5/2000 | Landes | |
| 6,154,132 A | 11/2000 | Iwamoto et al. | |
| 6,249,727 B1 | 6/2001 | Muller | |
| 6,275,231 B1 | 8/2001 | Obradovich | |
| 6,339,745 B1 | 1/2002 | Novik | |
| 6,356,186 B1 | 3/2002 | Price et al. | |
| 6,430,488 B1 | 8/2002 | Goldman et al. | |
| 6,595,811 B2 | 7/2003 | Dagenais et al. | |
| 6,697,966 B1 | 2/2004 | Smuk et al. | |
| 6,744,985 B1 | 6/2004 | Smuk et al. | |
| 6,756,697 B2 | 6/2004 | Mizutani et al. | |
| 6,772,061 B1 | 8/2004 | Berthiaume et al. | |
| 6,784,569 B1 | 8/2004 | Peller | |
| 6,806,590 B1 | 10/2004 | Smuk et al. | |
| 6,871,250 B2 | 3/2005 | Froeschl et al. | |
| 6,898,656 B2 | 5/2005 | Griessbach et al. | |
| 6,987,446 B2 | 1/2006 | Konno et al. | |
| 7,044,814 B2 | 5/2006 | Kamio et al. | |
| 7,222,006 B2 | 5/2007 | Proefke et al. | |
| 7,227,283 B2 | 6/2007 | Suzuki | |
| 7,394,352 B2 | 7/2008 | Bell et al. | |
| 8,060,400 B2 | 11/2011 | Wellman | |
| 8,610,550 B2 | 12/2013 | Hagiwara et al. | |
| 8,620,515 B2 | 12/2013 | Kwak | |
| 8,994,494 B2 | 3/2015 | Koenig | |
| 2001/0044677 A1 | 11/2001 | Bauer et al. | |
| 2002/0042670 A1 | 4/2002 | Diaz et al. | |
| 2002/0059075 A1 | 5/2002 | Schick | |
| 2002/0171291 A1 | 11/2002 | Wayne et al. | |
| 2003/0070020 A1 | 4/2003 | Kondo et al. | |
| 2003/0097211 A1 | 5/2003 | Carroll | |
| 2003/0105567 A1 | 6/2003 | Koenig | |
| 2004/0003153 A1 | 1/2004 | Froeschl et al. | |
| 2004/0011096 A1 | 1/2004 | Quinn et al. | |
| 2004/0015603 A1 | 1/2004 | Griessbach et al. | |
| 2004/0048598 A1 | 3/2004 | Gagnon | |
| 2004/0164850 A1 | 8/2004 | Konno et al. | |
| 2004/0186929 A1 | 9/2004 | Salerno | |
| 2004/0215861 A1 | 10/2004 | Beaudoin et al. | |
| 2004/0254690 A1 | 12/2004 | Hasegawa et al. | |
| 2005/0065678 A1* | 3/2005 | Smith | G07C 5/008 |
| | | | 701/31.4 |
| 2005/0125565 A1 | 6/2005 | Ying | |
| 2005/0190080 A1 | 9/2005 | Flick | |
| 2006/0226961 A1 | 10/2006 | Bell et al. | |
| 2006/0265117 A1 | 11/2006 | Cahoon | |
| 2007/0005202 A1* | 1/2007 | Breed | B60W 50/0205 |
| | | | 701/29.1 |
| 2007/0050095 A1 | 3/2007 | Nelson et al. | |
| 2007/0222293 A1 | 9/2007 | Shimomura | |
| 2007/0279344 A1* | 12/2007 | Kimura | G09G 3/2022 |
| | | | 345/77 |
| 2008/0019420 A1* | 1/2008 | Carbone | H04L 5/0091 |
| | | | 375/132 |
| 2008/0278314 A1* | 11/2008 | Miller | G07C 5/008 |
| | | | 340/539.13 |
| 2009/0005928 A1* | 1/2009 | Sells | G06Q 30/0641 |
| | | | 701/31.7 |
| 2009/0085368 A1* | 4/2009 | Coffelt | B60K 35/00 |
| | | | 296/70 |
| 2009/0322510 A1* | 12/2009 | Berger | H04W 60/00 |
| | | | 340/539.1 |
| 2010/0088023 A1* | 4/2010 | Werner | A63B 24/0021 |
| | | | 701/467 |
| 2010/0150122 A1* | 6/2010 | Berger | H04W 4/02 |
| | | | 370/338 |
| 2010/0198508 A1* | 8/2010 | Tang | G01C 21/3469 |
| | | | 701/414 |
| 2011/0060480 A1 | 3/2011 | Mottla et al. | |
| 2013/0018577 A1* | 1/2013 | Gooding | G01C 21/3407 |
| | | | 701/423 |
| 2013/0110739 A1 | 5/2013 | Hill et al. | |
| 2013/0158860 A1* | 6/2013 | Gum | G01C 21/265 |
| | | | 701/410 |
| 2013/0226633 A1 | 8/2013 | Brock et al. | |
| 2013/0246102 A1 | 9/2013 | Finegold et al. | |

FOREIGN PATENT DOCUMENTS

| | | |
|---|---|---|
| EP | 0 723 892 | 7/1996 |
| EP | 0978 433 | 2/2000 |
| GB | 2 232 272 | 12/1990 |

(56) References Cited

FOREIGN PATENT DOCUMENTS

| WO | WO 2006/110805 A2 | 10/2006 |
|---|---|---|
| WO | WO 2009/014861 | 1/2009 |
| WO | WO 2013/137182 | 9/2013 |

OTHER PUBLICATIONS

"TrakMaps—Our Digital Maps & Charts," Jan. 28, 2013, XP055134443, retrieved from the Internet: URL:https://web.arvhive.org/web/20130128163653/http://www.trakmaps.com/ListGPSProducts.aspx?p=s [retrieved on Aug. 12, 2014]; 1 page.
2004 Engine Preview—Volvo Penta; www.powerandmotoryacht.com/engines/0104preview/index.html; printed Jun. 30, 2005; 2 pgs.
BMW Motorrad article, "Single Wire Systems and CAN bus," www.bmwmotorrad.com/technology; printed Jul. 8, 2005; 3 pgs.
BMW Motorrad Media Release, Overall Concept and Model Features, www/motorcycles.bmw.com.au/scripts/main.asp (Jul. 14, 2004); printed Jul. 8, 2005; 4 pages.
BMW Motorrad of Santa Cruz On-Line Article, "Electrics and Electronics, "www.bmwscruz.com/motorcycles/K1200S/K1200S_F4.html; printed Jul. 8, 2005; 3 pgs.
BMW Motorrad of South Africa; The Motorcycles, R1200GS SA Road Test, www.bmwmotorrad.co.za/bikes/tests/display.asp?Id=100, (Feb. 2004 ed.); printed Jul. 8, 2005; 3 pgs.
BMW Motorrad RepROM R-Modelle K2x 1. Auflage; Nov. 2004 edition, © BMW Motorrad, UX-VS-2; D-80778 Munchen; Nov. 2004; 1-Auflage; replacing main wiring harness, 19 pgs.
BMW Motorrad; R 1200 RT Sales Brochure; Printed in Germany in Mar. 2005; Front Cover, Rear Cover and p. 26—Information at Your Fingertips—The Single Wire System; 3 pgs.
Ford Motor Company web page, "Ford's Mykey Feature Allows Fleet Owners to Control Speed and Radio Volume For Safety," 2 pgs., 2008, downloaded from www.ford.com/about-ford;news-announcements/press-releases.
Ford Motor Company, 2007 Explorer Owner's Guide (post-2002-fmt), pp. 1, and 124-126; 4 pgs.
My Jeep Community—Welcome Jeep Owners, Enthusiasts, Employees and Suppliers! online community, 25 pages, downloaded on Jun. 8, 2009 from www.myjeepcommunity.com.
RPM8000 TacTrack User Manual, Atgo Technologies, 11 pgs., Buffalo, MN, available at least as early as Mar. 2009; 11 pgs.
RPM8000 TacTrack web page, "New RPM8000 Device Manager Software Available Free!," Atgo Technologies, 2 pgs., downloaded on Dec. 12, 2008 from www.atgotech.com.
Sport Rider Online Magazine; 2005 BMW K1200S Electronics, 4 pgs., downloaded on Aug. 31, 2006 from www/sportrider.com/bikes/2005/146_05_bmw_K12s_electronics/ 5.
Sport Rider Online Magazine; 2005 BMW K12005, 5 pgs., downloaded on Jun. 30, 2005 from www/sportrider.com/bikes/2005/146_05_bmw_K12s/.
Valk, John, "The New BMW R1200 RT," 11 pgs., downloaded on Jul. 8, 2005 from www.johnvalkbmw.ca/2005/BMW/R1200RT/General-R1200RT-More.htm.
Jeep—The Jeep Community—Jeep Urban Ranger, 3 pgs; downloaded on Jun. 8, 2009 from www.jeep.com; 3 pgs.
International Preliminary Report on Patentability of the International Searching Authority for PCT/US2014/018638, Sep. 1, 2014; 7 pages.
"TrakMaps—Our Digital Maps & Charts"—All Products Tab, Jan. 4, 2013, retrieved from the Internet: URL: https://web.archive.org/web/20130104230952/http://www.trakmaps.com/ListGPS Product . . . [retrieved on Nov. 10, 2015]; 4 pages.
"TrakMaps—Our Digital Maps & Charts"—ATV Trails Tab, Jan. 28, 2013, retrieved from the Internet: URL: https://web.archive.org/web/20130128164123/http://www.trakmaps.com/ListGPS Product . . . [retrieved on Nov. 10, 2015]; 2 pages.
"TrakMaps—Our Digital Maps & Charts"—Snowmobile Trails Tab, Jan. 28, 2013, retrieved from the Internet: URL: https://web.archive.org/web/20130128163653/http://www.trakmaps.com/ListGPSProduct . . . [retrieved on Nov. 10, 2015]; 2 pages.
"TrakMaps—Our Digital Maps & Charts"—Topography Tab, Jan. 6, 2013, retrieved from the Internet: URL: https://web.archive.org/web/20130106085557/http://www.trakmaps.com/ListGPS Product . . . [retrieved on Nov. 10, 2015]; 2 pages.
Patent Examination Report No. 2 issued by the Australian Government IP Australia, dated Sep. 12, 2016, for related Australian Patent Application No. 2014223584; 3 pages.

\* cited by examiner

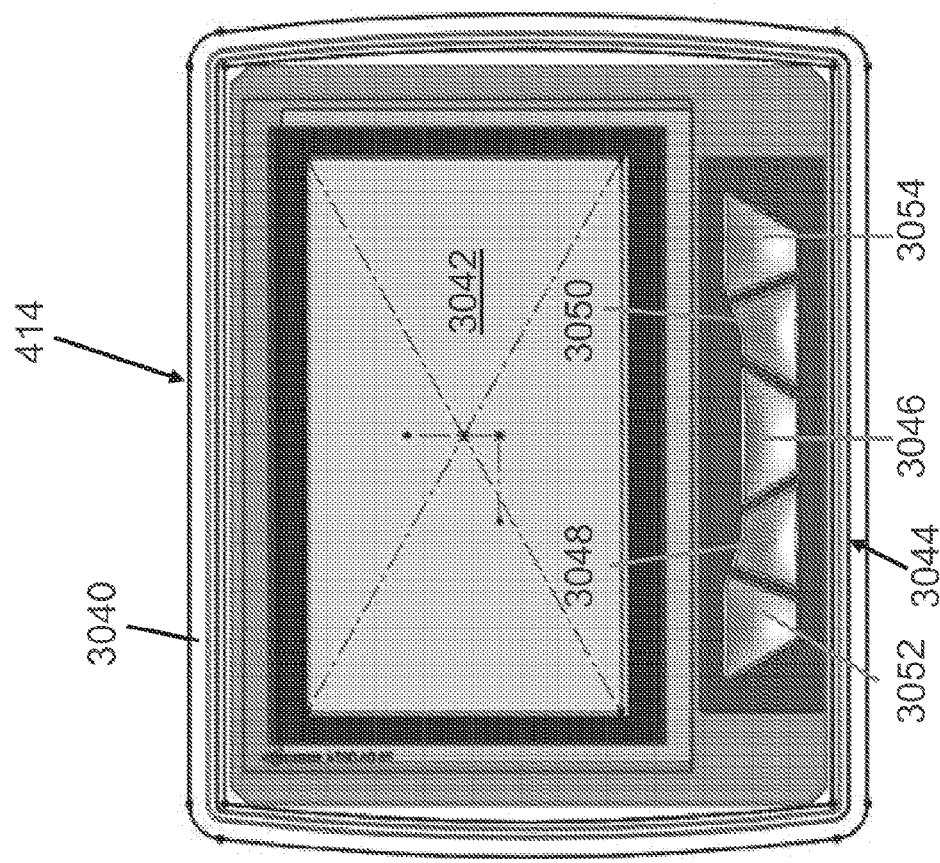
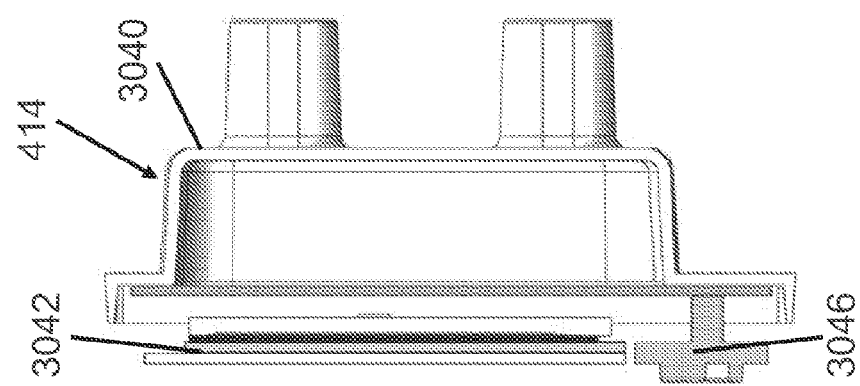
FIG. 28
FIG. 27

4022   4024   4026   4028   4030

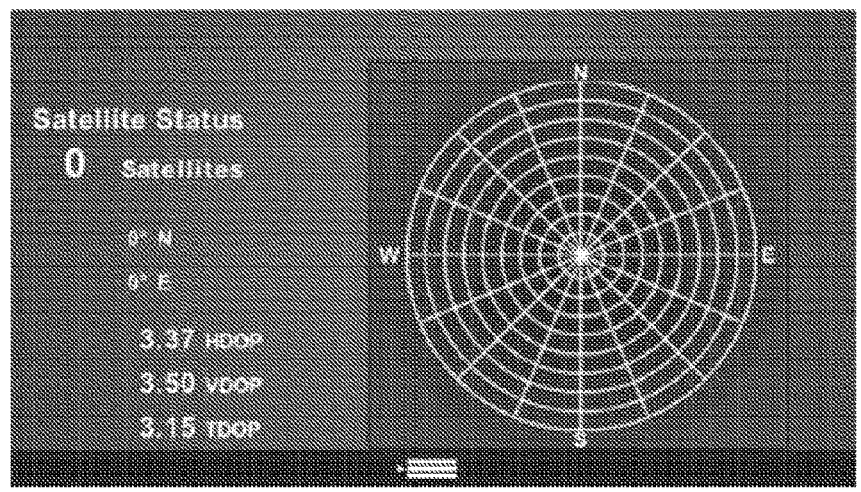
FIG. 70
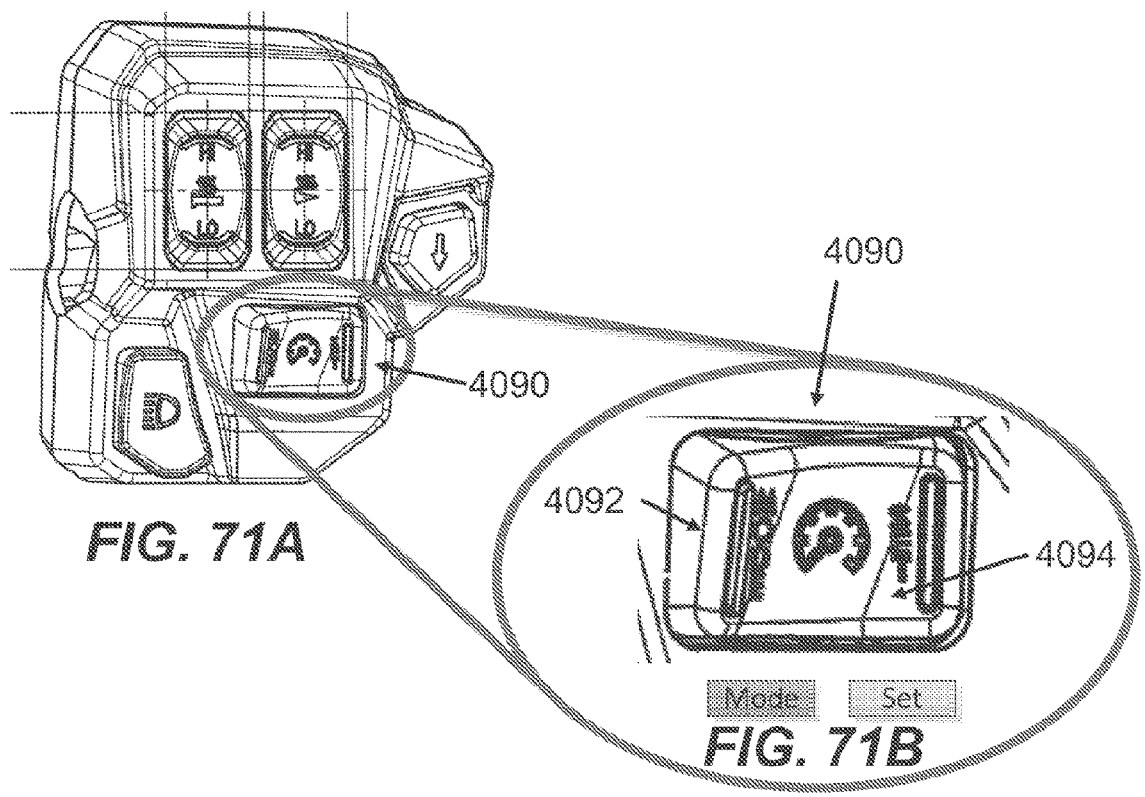
FIG. 71A
FIG. 71B

RECREATIONAL VEHICLE INTERACTIVE TELEMETRY, MAPPING, AND TRIP PLANNING SYSTEM

CROSS-REFERENCE TO RELATED APPLICATIONS

The present application is a national stage application under 35 U.S.C. §371 of International Patent Application No. PCT/US2014/18638, which in turn claims priority from Application Ser. No. 61/769,378 filed Feb. 26, 2013 and Application Ser. No. 61/926,013 filed Jan. 10, 2014; the disclosures of which are expressly incorporated herein by reference.

BACKGROUND AND SUMMARY

Recreational vehicles, such as motorcycles, or off-road vehicles such as all-terrain vehicles (ATVs) and snowmobiles, are widely used for recreational purposes. These vehicles might be used on both roads and trails, or only on trails. The trails often pass over a mixture of private and public properties, which can extend for hundreds of miles in many directions, and through different areas. Such trails generally extend through rural areas, but can connect to gas stations, restaurants, bars, maintenance locations, scenic areas, and other points of potential interest to outdoor adventurers.

Currently, clubs in areas where such trails exist maintain the trails on which such off-road vehicles are used. For example, a snowmobile club in a particular geographical area will maintain a relationship with the owners of the lands through which the trails pass, and will monitor and maintain the trail conditions (e.g., by monitoring the snow and trail conditions, maintaining signs, clearing obstacles, etc.). That club generally also will create a map that can be purchased by visitors to the area. The map will generally include points of interest in the area, and advertisements and coupons associated with the businesses on the map. Those maps can be sold at gas stations, bars, restaurants, and online for use by riders who plan to visit the area. The cost of the map and the cost of the advertisements are used to fund the club's upkeep of the trail system in that area.

This arrangement is convenient for upkeep of trails, but can be inconvenient to trail users. There are a number of reasons for this. For example, trail maps are generally organized by region, and riders may wish to travel among a number of regions whose maps are maintained by different clubs. Furthermore, trail riders may wish to have coordinated maps of points of interest that are not limited to the regions covered by a particular club, and not limited those businesses that choose to advertise with that club.

In connection with these difficulties, trail riders will often opt to purchase and download an electronic copy of the trail map, and plan their routes prior to starting that trip. However, once that trip is planned, the user will typically print out the trail map for use on the recreational vehicle for use.

In addition, recreational vehicle usage, because it typically occurs in off-road, rural areas, may cause a rider to become stranded in a location remote from any other individual, and far from a maintenance facility for that vehicle. For example, in the case of a snowmobile, a user may have an equipment malfunction or other issue far from a repair shop, or even from a road. In such cases, even if that rider had a cell phone with them (and even if that rider had service in the rural area where such a maintenance issue occurs) it may be difficult to diagnose problems with the recreational vehicle.

Beyond these existing issues in recreational vehicle usage and navigation, there is also no convenient way to coordinate route plans among riders, despite the fact that it is common to take such trips in groups. Accordingly, improvements in the rider experience, and in vehicle integration with the rider experience, are desired.

In one illustrated embodiment of the present disclosure, an interactive system for use in connection with recreational vehicle usage includes a server system. The server system includes an off-road trail database containing trail data, trail condition information, and points-of-interest information, as well as a trip mapping system accessible by any of a plurality of riders, the trip mapping system allowing a rider to create a planned route based on the data in the off-road trip database and navigate the planned route. The server system further includes a trail maintenance interface accessible by users affiliated with an authorized group to edit at least a portion of the trail data, trail condition information, and points-of-interest information associated with the authorized group. The server system includes a location data management system configured to receive location data, the location data management system allowing a rider to publish his or her location information to one or more other riders within the mapping system. The server system further includes a user feedback interface configured to receive trip data from riders for publication to one or more other riders using the interactive system, the trip data including information describing an actual route and user data associated with the actual route.

In another illustrated embodiment of the present disclosure, a method of facilitating usage of a recreational vehicle includes receiving, from users affiliated with a plurality of authorized groups, trail data, trail condition information, and points-of-interest information from areas affiliated with the authorized groups, respectively. The method further includes receiving a request from a user device to define a planned off-road route in one or more of the areas, and generating a map associated with the planned off-road route, the map including trail condition information and points-of-interest information received. The method also includes receiving location information from a communications device at a location of a recreational vehicle operated by the user during travel along the planned off-road route, and publishing the location information to one or more other users based on permissions set by the user. The method includes receiving user feedback information associated with the planned off-road route from the user.

In yet another illustrated embodiment of the present disclosure, an application embodied on a computer-readable medium is disclosed that is executable on a computing device and includes program instructions that, when executed, are configured to cause the computing device to receive user input requesting an off-road route, the user input including one or more ride parameters. The computing device is also configured to define an off-road route based at least in part on the one or more ride parameters and trail condition data received from one or more third-party sources, and present the off-road route to the user via a map display, including presenting a plurality of route variations to the user, the route variations including display of one or more ride parameters of the route variations compared to the off-road route. The computing device is further configured to receive user selection of a desired off-road route for traversal.

In still another illustrated embodiment of the present disclosure, a computer-readable medium comprising computer-executable instructions is disclosed that, when executed, perform a method for integrating rider experience with recreational vehicle performance. The method includes receiving from a user a selection of a planned route for a recreational vehicle at a computing device associated with the recreational vehicle, and receiving at the computing device, via a communication interface connected to a control unit of a recreational vehicle, data regarding operation of the recreational vehicle. The method further includes displaying a user interface to a user, the user interface including information associated with the planned route and at least a portion of the data regarding operation of the recreational vehicle, and communicating data to a remote system from the computing device, and at least a portion of the data regarding operation of the recreational vehicle. The method also includes receiving from the remote system one or more instructions for display to the user regarding maintenance or repair tasks to be performed on the recreational vehicle.

In a further illustrated embodiment of the present disclosure, a gauge is mounted in a recreational vehicle. The gauge includes a large color display. The gauge is coupled to an on-board vehicle computer such as an engine control unit, to a remote computer network through a mobile device, and to accessory items. The vehicle gauge provides interactive vehicle information, telemetry, mapping, and trip planning to a vehicle operator.

In another illustrated embodiment of the present disclosure, a method of facilitating usage of an off-road vehicle comprises providing a vehicle gauge having a display, a processor, at least one user input, and a communication link; receiving through the communication link trail information from a remote computing device related to a selected off-road trail for traversal by off-road vehicle; and displaying a user interface on the display of the gauge. The user interface includes information associated with the trail information including a trail map for the selected off-road trail and trail conditions on the selected off-road trail.

In yet another illustrated embodiment of the present disclosure, a gauge for an off-road vehicle comprises at least one processor; a memory accessible by the at least one processor; a display coupled to the processor; a wireless data link coupled to the processor to provide communication between the gauge and a handheld mobile device so that the gauge transmits information to the handheld mobile device and receives information from the handheld mobile device; and software stored in the memory and configured for execution by the at least one processor. The software comprises instructions providing a user selectable menu for receiving a user input to selectively display vehicle operation information on the display of the gauge including vehicle speed, RPM, fuel level, coolant temperature; receiving a user input to selectively display information from a mobile device on the display of the gauge including phone call information, texting information, and cell signal strength; and receiving a user input to selectively display trail information on the display of the gauge. The trail information includes a trail map for a selected off-road trail and information related to trail conditions on the selected off-road trail.

In another illustrated embodiment, the software further comprises instructions providing a user selectable menu for receiving a user input to selectively display service information related to the off-road vehicle on the display of the gauge. The service information includes a service interval and a number of hours remaining until service is required.

Additional features of the present invention will become more apparent to those skilled in the art upon consideration of the following detailed descriptions of illustrative embodiments exemplifying the best mode of carrying out the invention as presently perceived.

BRIEF DESCRIPTION OF THE DRAWINGS

FIGS. 27 and 28 illustrate additional details of a multi-function gauge of one embodiment of the present disclosure;

FIG. 70 is a satellite status screen displayed on the display screen of a gauge;

FIGS. 71A and 71B illustrate a control button for navigating through the menus of functions displayed on the gauge and/or the mobile device.

DETAILED DESCRIPTION OF THE DRAWINGS

Figure 1:
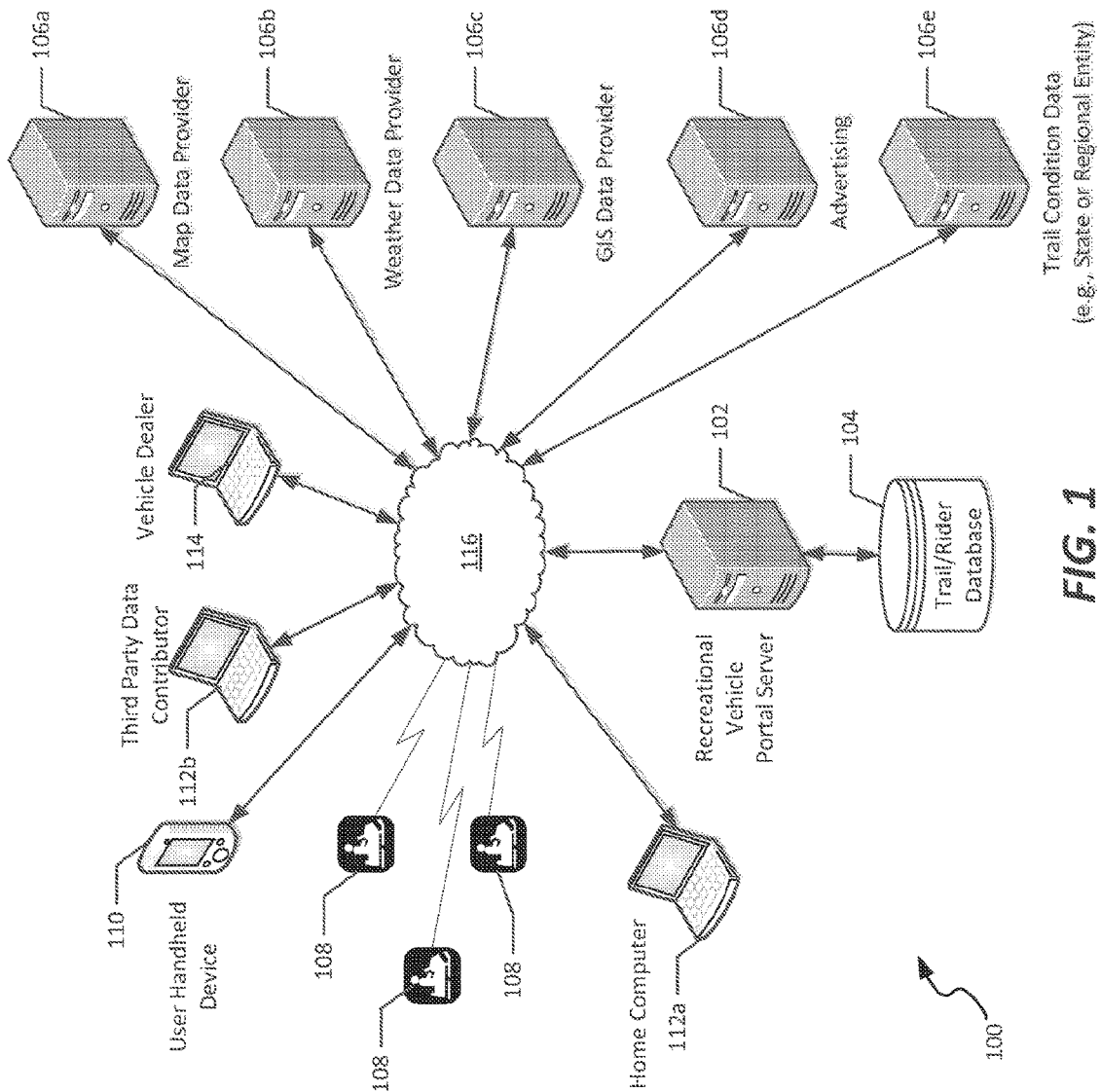
FIG. 1 illustrates an interactive system for use in connection with recreational vehicle usage, according to an example embodiment of the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

As briefly described above, embodiments of the present invention are directed to systems and methods that provide for a guided, interactive user experience for use in off-road or recreational vehicle usage. This can include, for example, usage in connection with motorcycle, all-terrain vehicle, snowmobile, or other types of recreational vehicles, and involves aggregation of user feedback regarding trail information and points-of-interest data, club information regarding trail conditions, and weather, hazard, and vehicle data to enrich the rider experience. By providing users with shared information regarding trail condition, length, difficulty, weather, and points of interest data, while also displaying to a rider various data regarding his her vehicle on a display alongside weather or hazard data and locations of other riders along a particular trail, that user's experience can be improved, by ensuring that the user is connected with the people, places, and vehicle experiences that will encourage the user to continue use of recreational vehicles.

Referring now to FIG. 1, an interactive system 100 is shown for use in connection with recreational vehicle usage, according to an example embodiment of the present disclosure. The interactive system 100 includes a server system, shown as recreational vehicle portal server 102, hosting a trail and rider database 104. The recreational vehicle portal server 102, referred to herein as server 102, generally corresponds to one or more computing systems configured to store and process data associated with one or more riders of recreational vehicles, as well as data associated with trails of interest to those riders. Such data can be located in the trail and rider database 104, or can be received from any of a plurality of data providers, such as data providers 106a-e, discussed below.

In the embodiment shown, the server 102 is accessible by any of a plurality of users of recreational vehicles 108, which can include off-road vehicles, such as all-terrain vehicles or snowmobiles, and can also include other types of recreational vehicles such as motorcycles. It is noted that, although in the embodiment illustrated in FIG. 1 only snowmobiles are shown, it is understood that other types of recreational vehicles could be used as well, according to the various aspects of the present disclosure.

The server 102 is also accessible via a plurality of other computing devices, such as a mobile device 110 (e.g., a mobile phone or tablet device) and/or a computing device 112 having a web browser installed thereon. However, for some uses of the server 102, a computing device 112 and associated web browser may be required to enable some functionality, while in other example embodiments, an application installed on a mobile device 110 may be required. For example, as discussed in connection with some embodiments of user interfaces discussed below, location-based services in which a user's location is published, and where loyalty-based social networking and location services are provided may require use of a mobile device 110, while some features, such as entry of trail maintenance and/or condition data may require entry through a specific web interface by particular individuals (e.g., authorized members of a club responsible for maintaining the trail). In the example shown, first and second computing devices 112a-b are shown, representing a user acting as a rider (computing device 112a) and a second computing device associated with a member of a trail-managing club (computing device 112b), respectively.

In the embodiment shown, a plurality of third-party data services is integrated with the information delivered to the users of devices 110, 112a-b. The data services, provided by data providers 106a-e, allow for integration of a variety of types of data in a user interface coordinated by server 102. In the embodiment shown, the data providers 106a-e include a map data provider 106a, a weather data provider 106b, a GIS data provider 106c, an advertising data provider 106d, and a trail condition data provider 106e.

The map data provider 106a delivers map services to the server 102, with which various data overlay services can be provided including trail or route data, trail or route plans, GIS data, or other types of information as discussed herein. In some cases, the weather data provider 106b can provide weather data such as forecast data, or could alternatively (or in addition) provide current weather or radar data for overlay on the map data received from the map data provider 106a, for delivery to a user who is a rider of a recreational vehicle 108, for example to allow that rider to view forecast or current inclement weather conditions. The GIS data provider 106c similarly provides overlay information allowing for definition of topography, locations of properties, locations of cities/towns, trails, roads, and other information.

In some embodiments, the advertising data provider 106d delivers advertisements to users who are riders. The advertising systems of the present disclosure can take many forms. For example, in some cases, when a particular route is being displayed, advertising corresponding to businesses located along that route can be displayed to the user. In such cases, the advertising is managed by the server 102, or specific advertising businesses are selected by one or more trail clubs that manage a particular area of a trail system. Correspondingly, and as discussed in further detail below, proceeds from advertising may be apportioned to the trail club in the area based on the frequency of display of advertising, or other metrics. As such, trail clubs can continue to receive revenue from advertising that currently is received based on placement of advertisements on printed trail maps associated with the area the trail club maintains.

In the embodiment shown, the trail condition data provider 106e provides to the server 102 trail condition data. This trail condition data illustratively includes reported data from trail clubs or users, but typically corresponds to third party trail condition data, such as may be monitored by a governmental organization (e.g., the department of natural resources for the state in which the trail is located), or other regional groups.

In an illustrated embodiment, other data providers are integrated with such a system as well. For example, in the case where social networking services are provided for riders using the services provided by system 100, such services are either integrated into the server 102 or provided by a further data provider 106.

In addition to the data providers and third party contributors, a dealer 114 is illustratively provided access to the server 102, for example to manage, store, and access vehicle maintenance records associated with particular vehicles. In such embodiments, the dealer 114 stores such records locally, and receives maintenance and/or repair information from a vehicle 108 from the server 102, or alternatively stores all such maintenance and repair information in the database 104, associated with the server 102.

As illustrated in FIG. 1, the various data providers 106e are communicatively interconnected with the server 102 via a network 116, such as the Internet. Additionally, such a network is used by users of mobile device 110 or computing devices 112a-b, as well as dealers 114 for communicative interconnection to the server 102.

Figure 2:
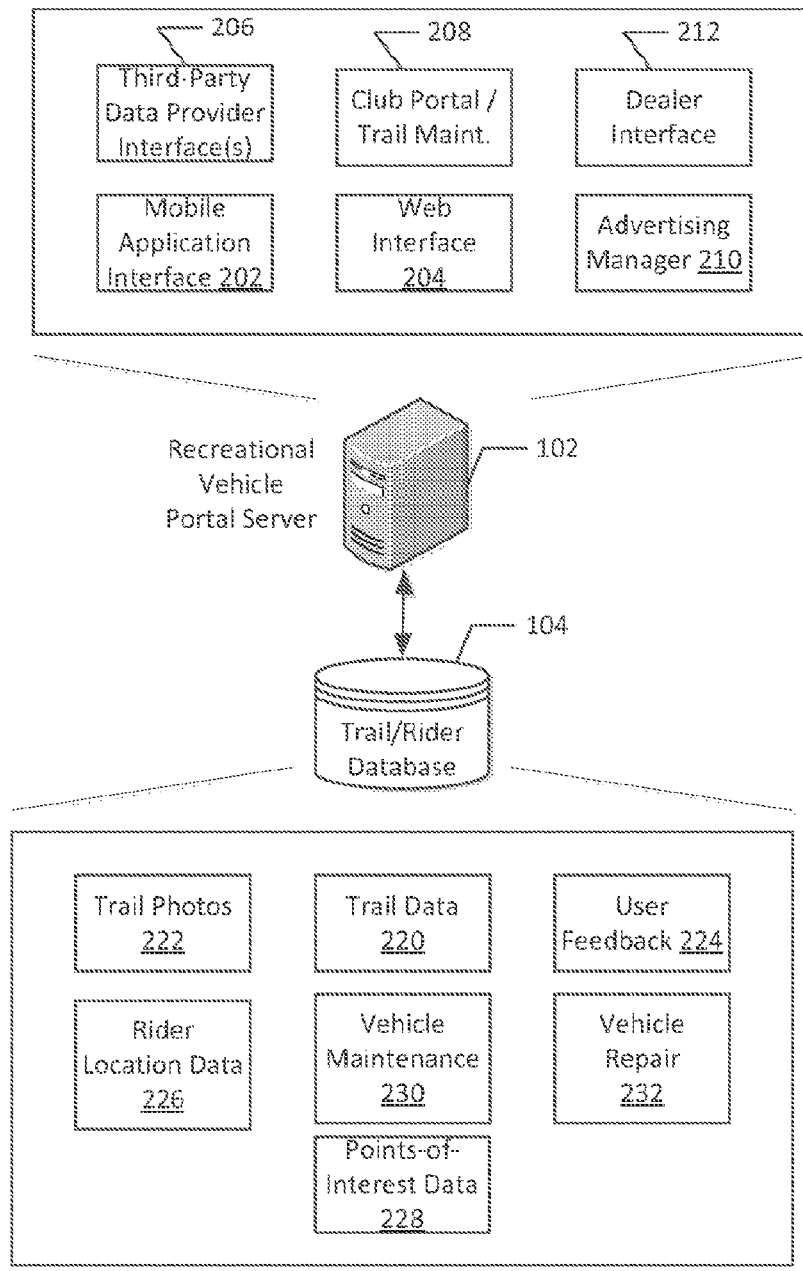
FIG. 2 illustrates an example server and database useable in the interactive system of FIG. 1.

Referring now to FIG. 2, additional details regarding the server 102 and the trail and rider database 104 of FIG. 1 are shown. The server 102 generally provides a plurality of interfaces and services by which data are aggregated and delivered to users who are riders of recreational vehicles. As further discussed herein, the interfaces and services delivered to those users include trip planning, navigation, social networking and trail feedback, and vehicle maintenance and repair services, among others.

In the embodiment shown, the server 102 includes a mobile application interface 202 and a web interface 204 that provide user access to various mapping, planning, and on-trail data services. The web interface 202 allows a user to connect to the server 102 via a computing device 112, and register his or her recreational vehicle with the server 102. The mobile application interface 202 provides analogous functionality via a downloadable application stored on a smartphone or tablet device, such as mobile device 110. Furthermore, through the web interface 204 or mobile application interface 202, the user plans a route that the user intends to take on his/her recreational vehicle, and the server 102, based on the trail condition data, confirms that the selected route is passable. The web interface also allows users to select their skill level, and presents various possible available routes based on the vehicle type defined by the user (snowmobile, all-terrain vehicle, motorcycle, etc.) and associated skill levels for those routes. For example, a beginner motorcycle rider has routes presented to him or her that are limited to non-technical street routes, while a snowmobile rider is routed solely on trails, since snowmobiles are not typically ridden on roads. The route displayed includes, for example, a distance and expected time for traveling the route based on the user's skill level. Other data, such as fuel needed along the route, or display of alternative routes nearby, is delivered as well. Various other possible route selection features are possible as well, as further discussed below.

In addition to the route selection features, the mobile application interface 202 and web interface 204 each allow the user to "preview" the trip that is selected, for example by providing a user-perspective "fly-through" view or simulation of a selected route, based on trail photos or videos collected in the database 104. Additionally, a user feedback interface available in the mobile application interface 202 and web interface allows a user to indicate that he or she has taken a particular route, and allows that user to enter a review of their experience when taking that route. This information is used by subsequent riders, during trip planning, since it can be made visible in association with the route planning features discussed above.

The mobile application interface 202 and web interface 204 also allow for tracking one or more other individuals' locations along a trail, for example to trace where fellow riders are along a trail, or to monitor progress of friends or relatives who are on a trail ride. Additional details regarding the features presented by the mobile application interface 202 are discussed below in connection with FIG. 3, and examples of user displays generated by such interfaces are discussed in further detail below in connection with FIGS. 7-22.

In addition to the mobile application and web interfaces 202-204, in the embodiment shown the server 102 includes a plurality of data interfaces. These data interfaces can include, for example, a third party data provider interface 206, which receives and manages data associated with data providers 106a-e, as well as a club portal interface 208. The club portal interface 208 is configured to manage communication with members of regional trail clubs. These trail clubs generally maintain and monitor the status of trails in a particular geographical area. Members of the trail club can therefore use the portal interface 208 to update trail routes, trail conditions, provide advisories to trail riders (e.g., instructions to avoid departing trails that pass through private land, tips regarding scenic locations or routes, etc.), and notes regarding local regulations. An advertising manager component 210 coordinates with the club portal to communicate with an advertising provider 106e, to control the types of advertisements provided to users of the mobile or web interfaces 202, 204, thereby limiting the advertisements displayed to a user to those approved by the club, or those in the same geographical area as the club. As further discussed below in connection with FIG. 6, the advertising manager also manages revenue apportionment across trail clubs and other entities, to provide incentives to contribute to the overall system 100.

In addition, a dealer interface 212 can be included, which associates one or more of the riders using the services of the server 102 with a particular dealer. The dealer interface 212 is used in a number of ways. In some cases, the dealer interface is used to communicate error codes or diagnostic data received from one or more recreational vehicles 108, for example to receive in response repair instructions or maintenance tips from the dealer(s) associated with those vehicles. Accordingly, riders of recreational vehicles are ensured of vehicle repair support during trail rides, while dealers receive notifications of possible repairs, allowing the dealer to provide additional value to customers who use such vehicles that support diagnostic data communication via the server 102.

The database 104 stores various types of data used by the server 102, including the various interfaces 202-210, to generate, along with data providers 106a-e, services to be presented to users who are riders of recreational vehicles. In the embodiment shown, the database 104 includes trail data 220 used for route planning purposes, which can include routes, property details, and trail condition data as may be received from a club member or third party data provider. The database 104 can also include trail photos 222, either submitted by riders who have previously traveled along the trails, or from a trail photo capture system useable to generate a "fly-through" sequential photo playback that simulates traveling along the trail. The database 104 further includes user feedback 224, which can include reviews of a trail, as well as ratings of the trail (e.g., difficulty, time required to traverse, etc.) as well as notes regarding points of interest, or other features.

In the embodiment shown, the database 104 includes rider location data 226, which can be received from a mobile device hosting a complementary application via mobile interface 202, or directly from a GPS-equipped recreational vehicle. The rider location data 226 is used to provide turn-by-turn navigation along on- and off-road routes, and is also selectively published to other riders, for example other riders in a group of riders who wish to track each other's progress along a trail. Additionally, points-of-interest data 228 is received from users or club members, and includes specific scenic locations or businesses alongside trails. The points-of-interest data is displayed to the users. For example, the data is overlaid on a mapping display as illustrated below.

In some embodiments, the database 104 includes vehicle maintenance data 230 and vehicle repair data 232. The vehicle maintenance data 230 includes information associated with general vehicle maintenance tips that are provided to the user, as well as specific maintenance records associated with the user's recreational vehicle. The vehicle repair data 232 includes instructions for responding to various malfunctions that may occur on such vehicles, for example including instructions for physically repairing the vehicles, or for responding to error codes received at the server 102 that are generated by an electronic control unit of a recreational vehicle, as discussed further below in connection with FIGS. 4-5. This maintenance and repair data is, for example, provided by the user via the mobile application or web interfaces 202, 204, or from a dealer 114 as illustrated in FIG. 1.

In operation, the server 102 uses the data stored in database 104 for a variety of applications that are provided to a user via the web or mobile application interfaces 204, 202, respectively. Accordingly, in FIG. 3, an example embodiment of a mobile application 300 is illustrated, which represents functionality that is made available to a user of a mobile device (e.g., device 110) that is communicatively connected to the server 102.

In the embodiment shown, the mobile application 300 resides in a memory 302 of a mobile device 110, which typically includes a programmable circuit, display, camera, and global positioning system (GPS) antenna. Generally, the mobile application 300 is configured to interface to the mobile application interface 202 of FIG. 2, on the server 102. By way of this communicative connection, the mobile application 300 delivers a number of services to a user who is a rider of a recreational vehicle. In particular, the mobile application includes, in the embodiment shown, a route planner component 304, a buddy tracker component 306, a route flythrough component 308, and a points-of-interest component 310. The mobile application 300 also includes, for use during the trip, turn-by-turn navigation component 312 and a vehicle interface 314.

The route planner component 304 provides a mechanism by which a user selects and plans one or more routes on which to take a ride with his/her recreational vehicle. The route planner component 304 includes a rules engine that operates to automatically plan a "best" route for a user given a set of parameters. For example, the route planner component 304 determines a distance, duration, difficulty level, and expected fuel consumption of a particular ride, based for example on map and GIS data received by data providers. The route planner 304 includes selectable options that allow a user to either select a particular destination (in which case the best route between a start point and that destination is supplied) or to route a user on a loop of a predetermined duration, based on skill of the user and starting location. In some embodiments, the route planner component 304 is configured to search for and/or present to a user a set of routes from which that user can select a desired route, with the routes varying in duration and/or difficulty. The route planner component 304, in such embodiments, is directed by a user to select only "safe" or "challenging" rides for display to the user, and is configured according to rider skill level.

In some embodiments, the route planner component 304 further includes a ride finder, which locates previously-taken routes of that user/rider or other riders. In such embodiments, the route planner component 304 causes display of trails and/or destinations that are recommended by other riders, and includes, for example, text describing the ride or trail, pictures, and video highlights provided by other riders for viewing by the user of the application 300, to allow that user to select a ride or trail recommended by others. In addition, the route planner component 304 allows users to save and share their own historical routes, as well as upload to the server pictures, videos, and descriptions of those routes.

In some embodiments, the route planner component 304 also accounts for, when assisting in planning a route, whether that route will cross any private land. In some embodiments, the route planner component 304, when determining a route to be displayed to a user, is configured (e.g., at a user's option) to display only routes that avoid crossing private land.

Figure 16:
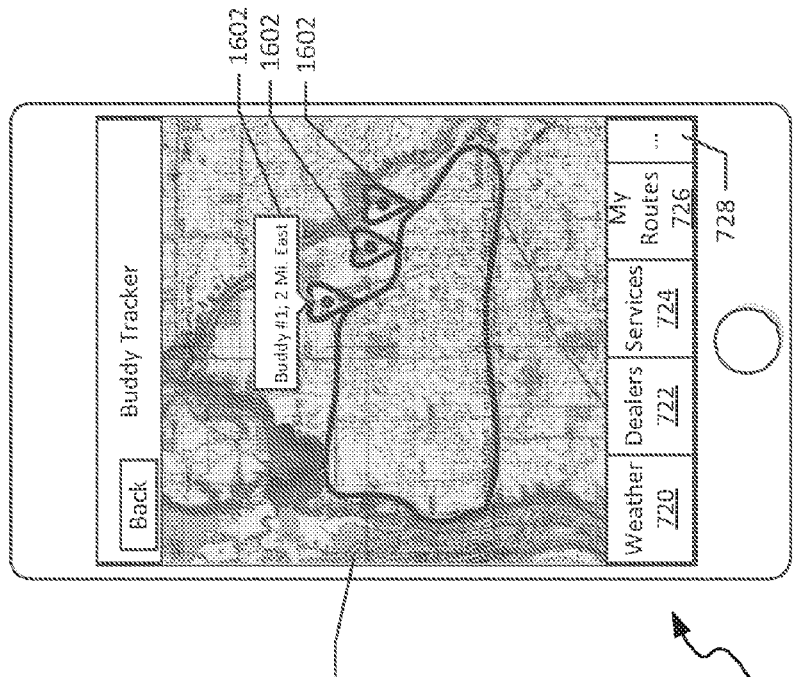
FIG. 16 illustrates an example user interface used for displaying locations of selected other individuals along a route to a user or recreational vehicle rider.

The buddy tracker component 306 allows a user to publish his/her location to be viewable by others during a trip, and also allows the user to view others' locations on a map interface, for example as illustrated in FIG. 16, discussed below. In some embodiments, the buddy tracker component 306 coordinates with the route planner to determine if the rider, during the course of a ride, is on a collision course with another rider, and can notify that rider accordingly. For example, a second rider may be ahead of the rider having the application running, but that second rider may have stopped, for rest or due to an equipment malfunction. The rider, if traveling at a high rate of speed, may not have adequate time to see that second rider stopped on a trail before he/she needs to stop.

Additionally, the route flythrough component 308 allows playback and pausing of a route traveled, as well as managing a virtual "fly-through" or simulation of a route. This "fly-through" corresponds to a projected, 360-degree view of a route, based on captured images along a route. In some cases, the trail photos 222 stored in database 104 includes a set of photographs or videos used for such a "fly-through" feature.

The points-of-interest component 310 is configured to display one or more points of interest associated with a selected route. In some such embodiments, the points-of-interest component 310 includes a feature in which the points-of-interest component associates specific points of interest with a particular trail club along which those points of interest are located. In such embodiments, the point of interest information that is displayed is limited to the specific points of interest provided by that trail club, or in the area managed by the trail club.

The turn-by-turn navigation component 312 provides, once a user has selected a particular route, turn by turn directions for following that route, analogous to those turn by turn directions available via current road-based navigation systems, but managed based on GIS and trail data received from a plurality of sources and data providers.

The vehicle interface 314 also provides additional functionality during a ride, and receives data from a vehicle that indicates a current of historical operational state of the vehicle. For example, in some embodiments, the vehicle interface 314 receives data from an electronic control unit of a vehicle, and is configured to display such information on a display of a mobile device (e.g., in the case of fuel consumption, speed, throttle position, or other similar operational parameters), or communicates such data, such as error codes or other issues, to a server for relay to a dealer or repairperson. In those cases, the dealer or repairperson communicates with the user of the application 300, for example to provide information regarding how to fix issues on the recreational vehicle.

Audible interface 316 can be used in a variety of contexts, and simplifies operation of the mobile application by presenting the user with audible updates as to the route, turn by turn directions, locations of buddies along the trail, or points of interest that are being approached. This allows the user to keep his or her eyes on the trail while traveling.

In addition to the above, the mobile application also includes a user feedback component 318. The user feedback component 318 is used during or after a ride, for example to provide that user's information regarding the perceived difficulty, length, or feedback regarding points of interest encountered during the ride. In some embodiments, the user feedback component 318 includes a social networking aspect in which the user "checks in" or comments regarding businesses that are located along a trail, and provides tips to other riders regarding those points of interest.

Figure 3:
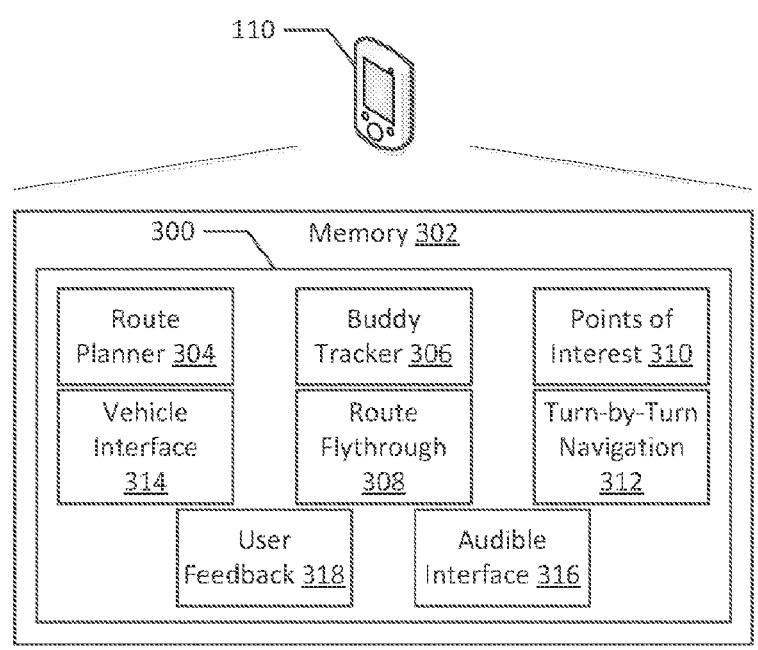
FIG. 3 illustrates an example application useable on a mobile device and integrable to with the interactive system of FIG. 1.

In accordance with the various components and interfaces of FIG. 3, it is noted that the mobile application is configured to generate a plurality of user interfaces, examples of which that illustrate the above-described functionality being shown in FIGS. 7-22, described below. Furthermore, although the functionality of the mobile application 300 is discussed in terms of a mobile device system, it is recognized that most, if not all, of the same functionality is provided via a web interface accessible via a browser of a desktop or laptop computing system. In some cases, where mobile device functionality such as GPS or camera features are used, corresponding features of the mobile application 300 may be unavailable via a browser-based version of the application.

Figure 4:
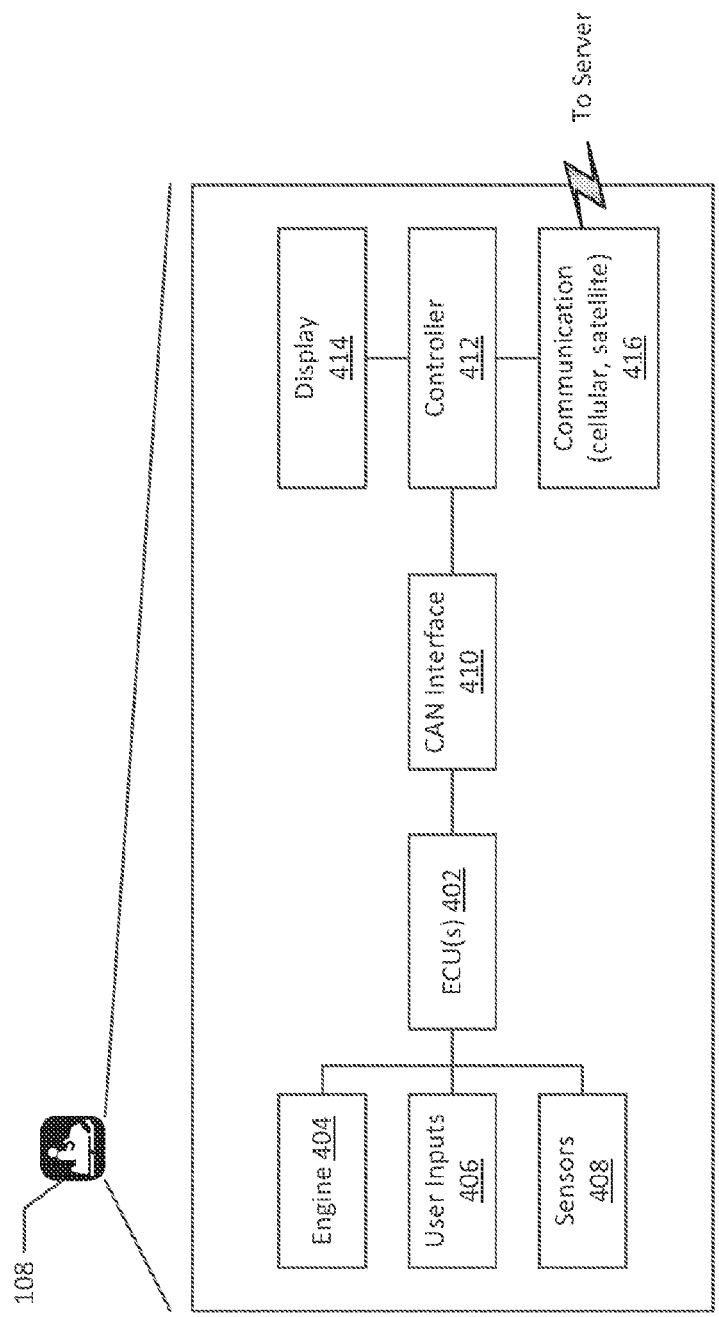
FIG. 4 illustrates an example arrangement for integrating a recreational vehicle into an interactive system as illustrated in FIG. 1.
Figure 5:
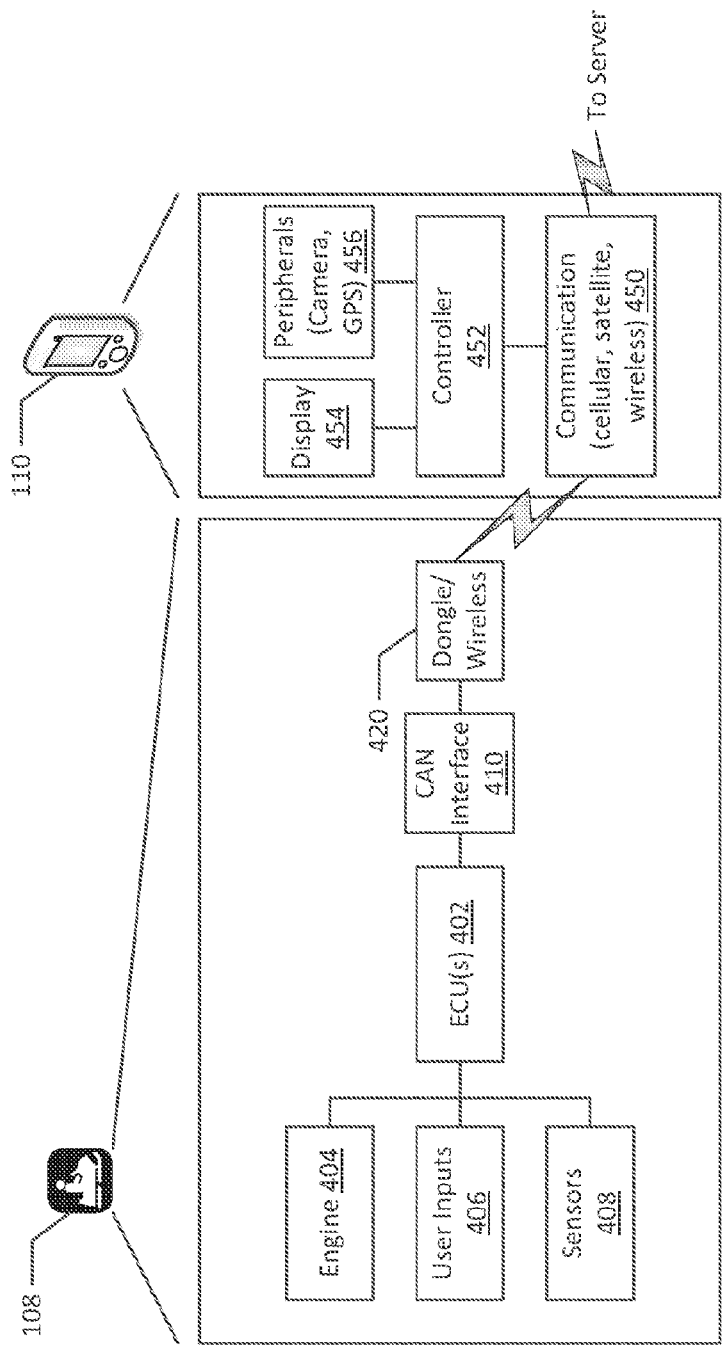
FIG. 5 illustrates an alternative arrangement for integrating a recreational vehicle into an interactive system as illustrated in FIG. 1.

Referring now to FIGS. 4-5, example embodiments of systems are shown that integrate communication from a recreational vehicle to the server 102. In general, the embodiments illustrated herein communicate with the server 102, either directly as illustrated in FIG. 1 or are coordinated through the vehicle interface 314 of the mobile application 300, to provide to that user "on-trail" information.

In the embodiment shown in FIG. 4, a first embodiment of integrating communication of a recreational vehicle 108 into the system 100 of FIG. 1 is shown. In the embodiment shown, the recreational vehicle 108 has an electronic control unit (ECU) 402, which is communicatively connected, as is known, to various vehicle subsystems, such as an engine 404, user inputs 406 (e.g., throttle, braking, or other input information), as well as sensor data 408 (e.g., ambient and exhaust temperatures, fuel levels, component sensors, etc.). The ECU 402 is typically communicatively connected to a controller area network (CAN) interface 410, which exposes various parameters of operation of the vehicle 108. In the embodiment shown in FIG. 4, an integrated controller 412 is communicatively connected to a gauge or display 414 and a communication interface 416, which is, for example, a cellular or satellite communication interface, communicatively connectable to server 102. The controller 412 illustrative includes a programmable circuit and memory, and as such cooperates with the display 414 to provide much of the functionality discussed above with respect to the mobile application 300. In addition, various other components, such as a GPS or audible interface, are included in the overall recreational vehicle system as well, to provide additional functionality that is desired natively within the recreational vehicle. Additional details of this embodiment are described below with reference to FIG. 25.

In contrast to FIG. 4, in FIG. 5 a mobile device 110 is used, with integration at the CAN interface 410. This is accomplished, for example, by connecting a dongle 420 or other wired-to-wireless or direct-wired connection between the ECU 402 and the mobile device 110. In some embodiments, dongle 420 implements a Bluetooth, radio frequency (RF) or some other short-range wireless standard for wireless communication between the ECU and a communication interface 450 of the mobile device 110. In such an arrangement, the mobile device 110 includes a controller 452 that receives data from the ECU 402, and integrates a display 454 and various peripheral devices 456 (e.g., GPS, camera, etc.), for integration of vehicle operational data with data received at the mobile device, in accordance with the functionality discussed above in connection with FIG. 3.

It is noted that, via the CAN interface 410, a variety of types of information are provided for display at the vehicle, or for communication to the server 102. In various embodiments, vehicle data received from the ECU 402 includes, for example: engine revolutions per minute; vehicle speed; coolant temperature; battery voltage; fuel level; throttle position; pedal position; fuel consumption rate; vehicle range; engine load; barometric pressure; air intake temperature; exhaust air temperature; gear indication; spark timing; operational hours; drive status; and trouble codes. Other types of information is received via the CAN interface 410, depending upon the particular type of vehicle and features included thereon. Examples of display information that integrates route and vehicle information are illustrated in the user interfaces of FIGS. 21-22.

Figure 6:
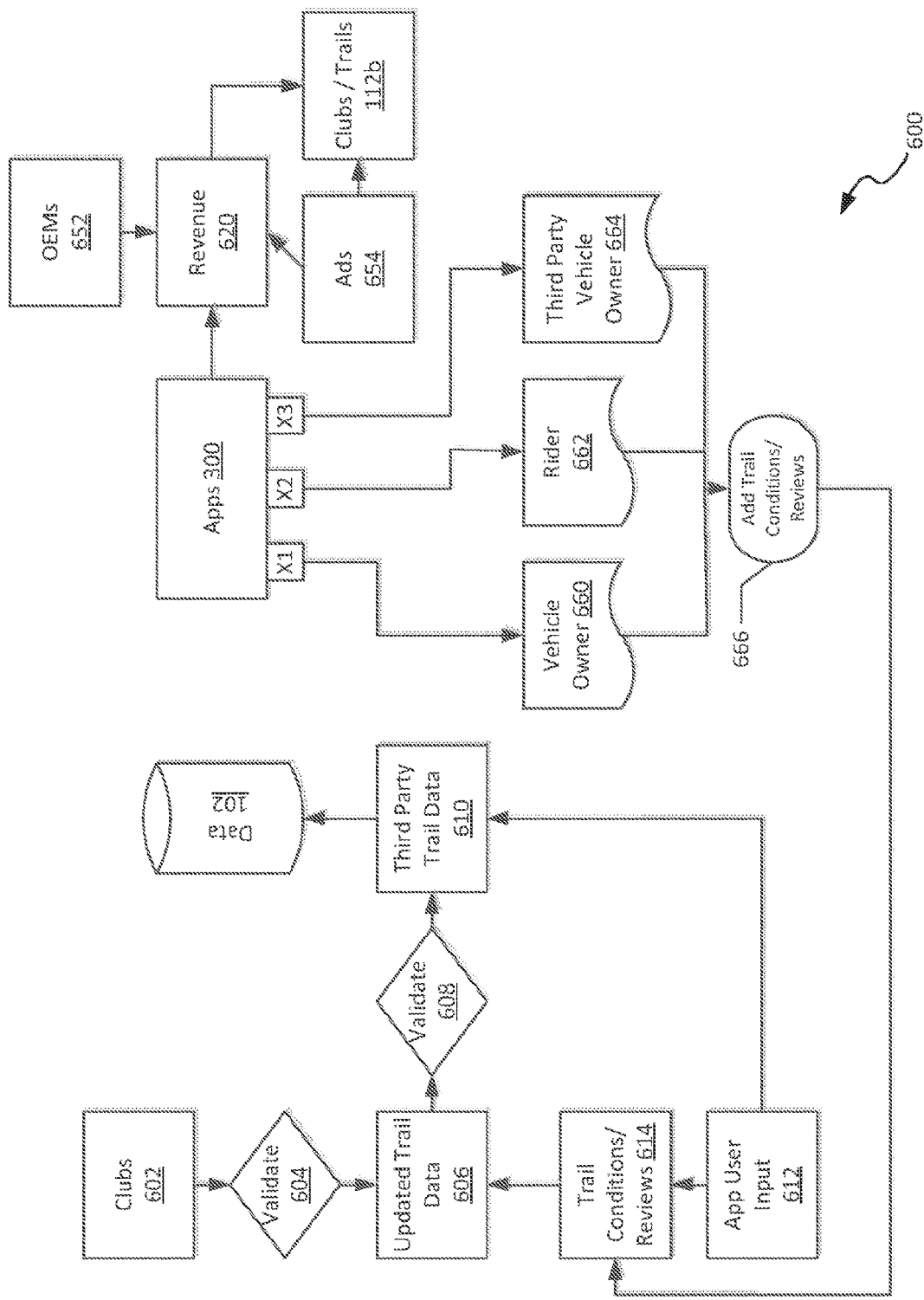
FIG. 6 illustrates an example dataflow for management of trail data useable within the interactive system of FIG. 1.

Referring now to FIG. 6, an example data administration arrangement 600 is shown which is useable in connection with the system 100 of FIG. 1, and which illustrates how various types of data that is received from users of various types (e.g., riders, trail club members, advertisers, etc.) are received and managed, and how attendant revenue is managed and distributed across those entities as well. In the embodiment shown, clubs 602, which generally include trail maintenance organizations who typically receive revenue from advertisements on trail maps, are validated as recognized organizations (step 604). Validated clubs and associated members can then provide trail data, including new and/or updated trail data, to be stored in the database 102 (step 606). That trail data is validated (step 608), and the validated trail data is then merged with trail data maintained by a larger aggregator of trail data, such as the trail maps maintained by USTRAILS.org or some other analogous organization (step 610), prior to storage in the database 102 of trail data 220. For example, the aggregated trail data includes trails generally entirely on public lands, whereas the club-maintained trails may include trails on private lands where a club has negotiated some right-of-way or through-route with the landowner.

In addition to receiving club and third party trail data, users provide information regarding trails (step 612), either as aggregate to the club trail data (e.g., providing reviews of the club-provided trails, or directly providing additional comments regarding the public trails. The information regarding the club-sponsored trails includes, for example, trail condition information, review information regarding the quality, difficulty, or other information regarding the trails (step 614).

To support the aggregation of trail data, a revenue model is incorporated into the overall data administration at the server, and is included, for example as part of the advertising manager component 210 of the server 102. In the embodiment shown, the revenue model includes generation of revenue 620 from various sources, such as original equipment manufacturers 652 who wish to be integrated into such a system as well as revenue from downloads of a mobile application 300 (shown as application revenue 652), and advertising revenue 654. In the arrangement shown, trail clubs and other trail aggregators are illustratively compensated out of this revenue, either directly by advertisers or as subsidized by application downloads or OEMs directly.

In addition, it is noted that a mobile application 300 is downloadable by various individuals, such as a vehicle owner 660, a rider 662, or a third party vehicle owner 654, which represents an owner of a recreational vehicle that is not supported by the overall system 100, for example because it is manufactured by a non-participant OEM. It is noted that some features and functionalities discussed above, which are typically provided to users of a mobile application, may not be available to users of a mobile application in connection with a recreational vehicle manufactured by a non-participant OEM. For example, integration of vehicle data and application data, such as is used to display vehicle data within the application 300, or to send error codes to server 102 to receive on-trail repair and maintenance support, is not provided in such cases. However, in each case, the application is used by these individuals 660-664 to provide trail reviews, as well as up-to-date trail condition information (step 666), which is integrated with the club or third party information, as discussed above in connection with steps 612-614.

Now referring to FIGS. 7-22, various example user interfaces of a mobile application 300 are illustrated, which show some of the example operations that are provided for by the system 100 of FIG. 1, as reflected in a display of a mobile device 110, before, during, and after a ride via a recreational vehicle. As discussed above, the various features and functionalities illustrated in FIGS. 7-22 may at least in part be made available via a web interface to a user of a computing device and associated web browser, or via a display integrated into a recreational vehicle (as illustrated in FIG. 4). In an alternative embodiment shown in FIG. 25, the features of FIGS. 7-22 are displayed on a display of gauge 414 located within the vehicle.

Figures 7, 8:
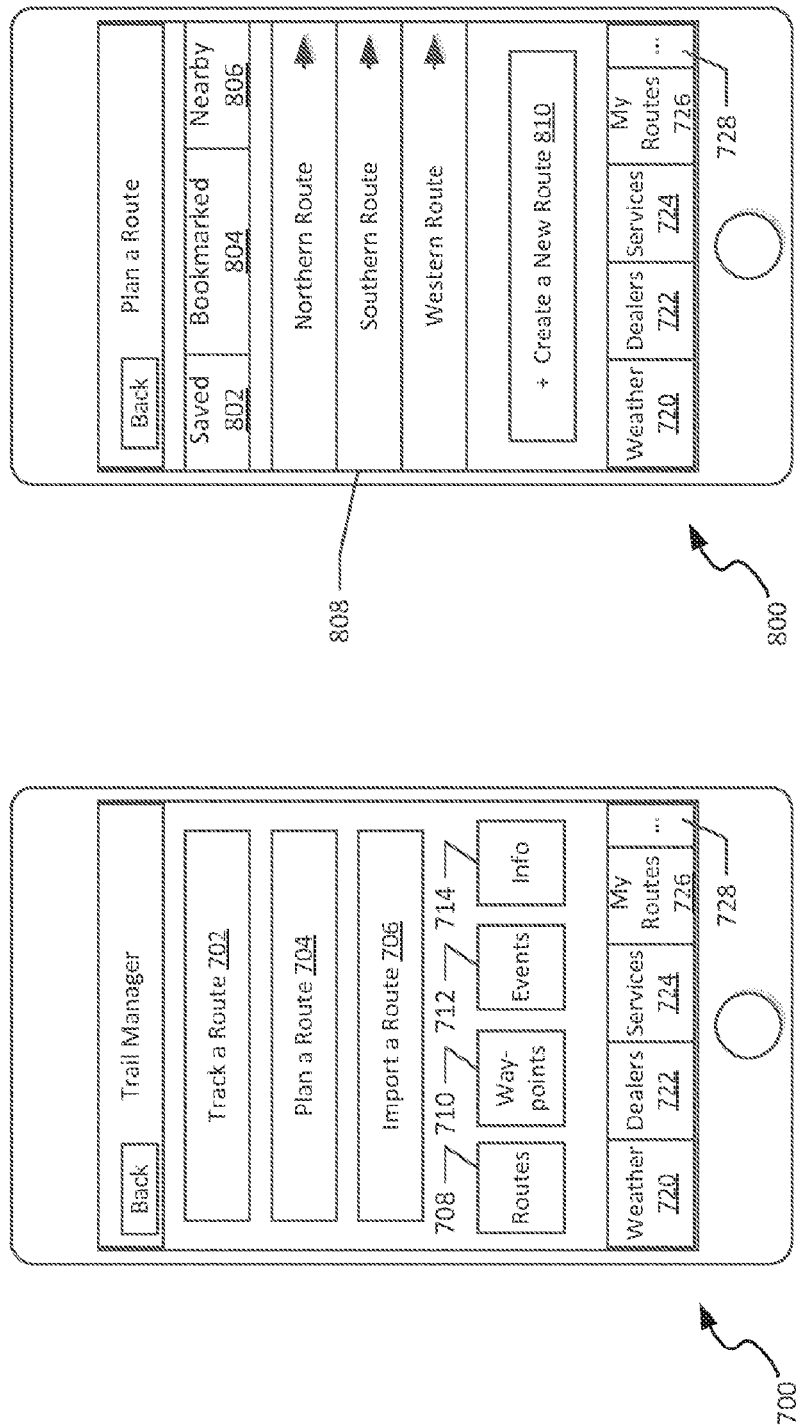
FIG. 7 illustrates an example user interface used for managing trail data by a user or recreational vehicle rider.
FIG. 8 illustrates an example user interface used for planning a route by a user or recreational vehicle rider.

Referring first to FIG. 7, an example user interface 700 used for managing trail data by a user or recreational vehicle rider is shown. The user interface 700 represents a general menu interface that allows a user to use a route tracking component of the web or mobile application, to view or plan various routes. In the embodiment shown, the user interface 700 includes a route tracking option 702, a route planning option 704, and a route import option 706.

The route tracking option 702 allows a user to select from among a plurality of pre-saved routes, or to create a new route using a mapping and direction creation feature. The route planning option 704 allows that same user to view a set of pre-defined, shared routes, and to view points of interest, difficulty levels, and other types of information associated with that route. A route import option 706 allows the user to import data, such as may be included in a route description file (e.g., a flat file or markup language file defining route coordinates) to be used as a route to be traveled.

In the embodiment shown in FIG. 7, a number of additional mapping options are displayed on the user interface 700 as well. A routes option 708 allows display of alternative routes between a start and end point, and a way-points option 710 allows a user to define one or more waypoints along a selected trail that are used as rest locations, or to define the desired trail to the automatic mapping features of the system. An events option 712 allows a user to define rest times, specific locations and times, or specific occurrences along a trail that may be of interest. An information option 714 allows the user to provide descriptive information about the trail to be traveled, for example to provide that trail to others who will be along on the trip.

Figure 18:
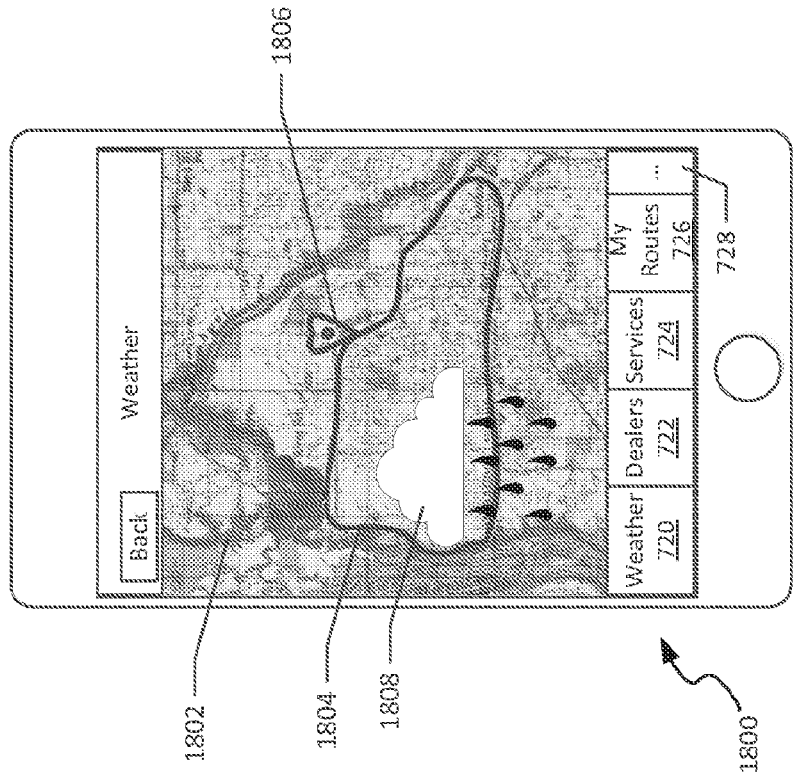
FIG. 18 illustrates an example user interface used for displaying weather data along a trail to a user or recreational vehicle rider.

Furthermore, general options that allow user navigation within the application 300 are included on the illustrated user interface as well. These include general pieces of information that may be of interest to the user, such as a weather option 720, a dealers option 722, a services option 724, and a routes option 726. Additional types of options include, for example in a hidden menu that can be reached via a "more" option (shown as ellipses 728). The weather option 720 causes a weather screen to be displayed, for example weather in an area in proximity to a selected route, as illustrated in FIG. 18. The dealers option 722 allows a user to view nearby dealers or that particular individual's dealer, for example to allow that individual to contact the dealer while on the trail. In one embodiment, a parts check option allows the user to check for the availability of a certain repair part or accessory at an identified dealer on the trail route. The services option allows the user to view additional services available to the user, for example regarding maintenance or repair services.

FIG. 8 illustrates an example user interface 800 that is used for planning a route by a user or recreational vehicle rider. The user interface 800 includes saved routes 802 of the rider, as well as bookmarked routes 804 of other riders, and nearby routes 806 that have been published by other riders. A route listing 808 displays available routes, and a new route option 810 allows the user to initiate an auto-mapping process by which the user defines a new route between points, or point-to-point, using waypoints defined by the waypoints option discussed above in FIG. 7.

Figure 9:
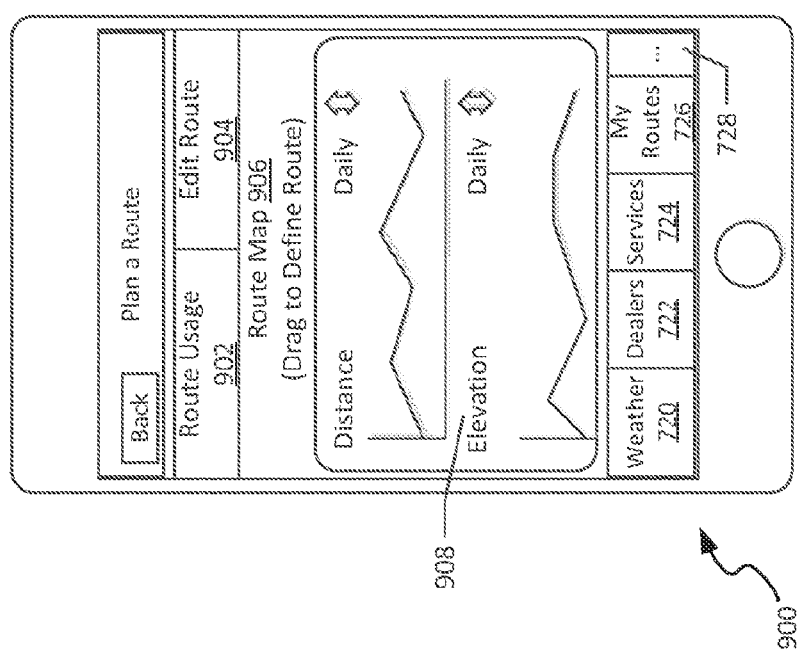
FIG. 9 illustrates an example user interface used for viewing route data by a user or recreational vehicle rider.

FIG. 9 illustrates an example user interface 900 that is used for viewing route data by a user or recreational vehicle rider, for example once a particular route has been selected. In the embodiment shown, a route usage option 902 illustrates a frequency of use of that route, and an edit route option allows the user to change the route based on his/her preferences. The interface 900 also includes a route map 906 (shown schematically), and route contours 908 that illustrate elevation and distance of a particular route.

Figure 10:
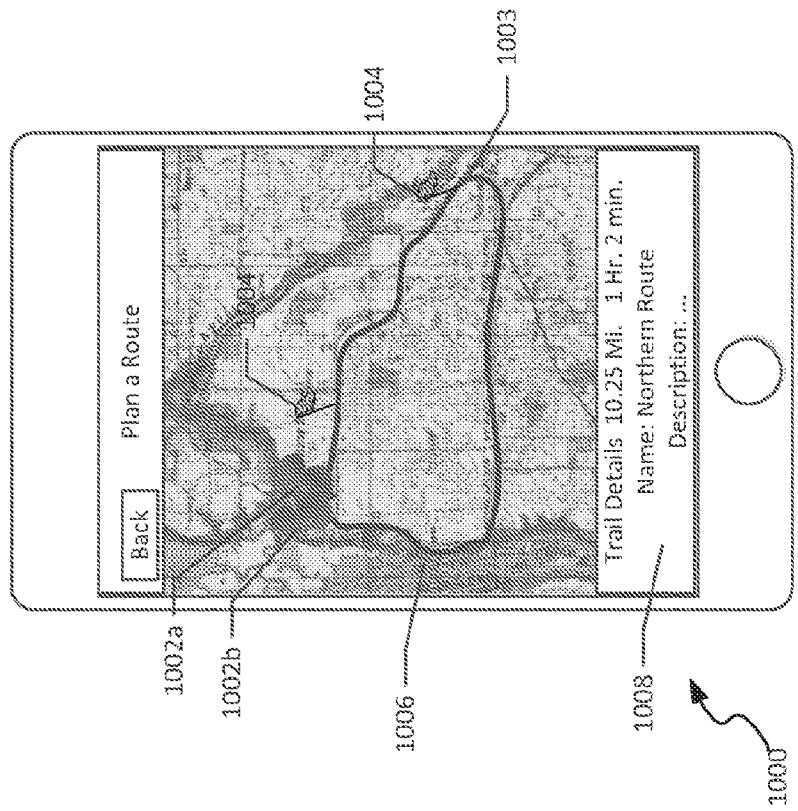
FIG. 10 illustrates an example user interface used for viewing points of interest along a planned route by a user or recreational vehicle rider.

FIG. 10 illustrates an example user interface 1000 that is used for viewing points of interest along a planned route by a user or recreational vehicle rider. The interface 1000 includes a start point and endpoint 1002*a-b* of a route 1003, as well as flagged points of interest 1004 along the route 1003, on a map display interface 1006. The points of interest 1004 illustratively include scenic views, businesses, or other information. An information panel 1008 provides information regarding the route generally; upon selection of one or more of the points of interest, additional details regarding that point of interest, or reviews by other users, is displayed in the panel 1008.

Figure 12:
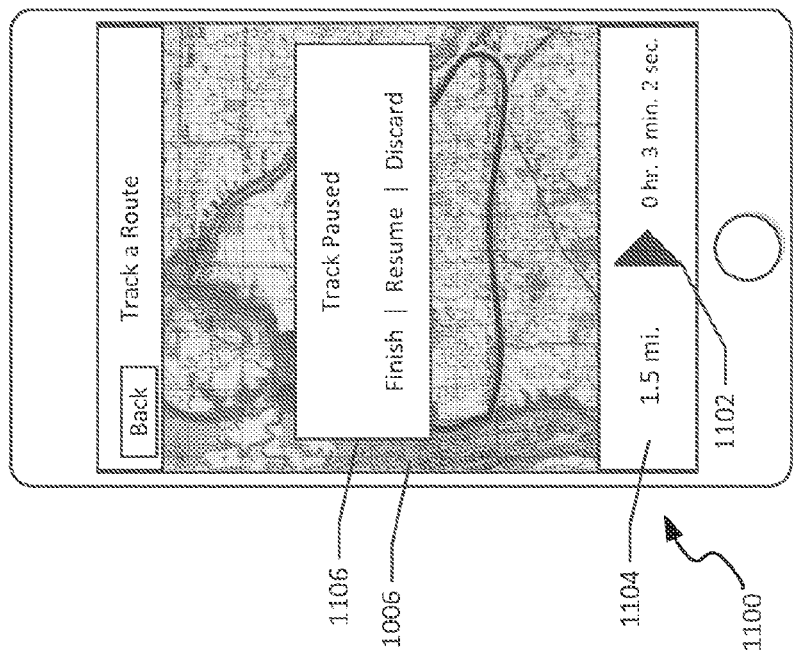
FIG. 12 illustrates a second example user interface used for tracking a route by a user or recreational vehicle rider.
Figure 11:
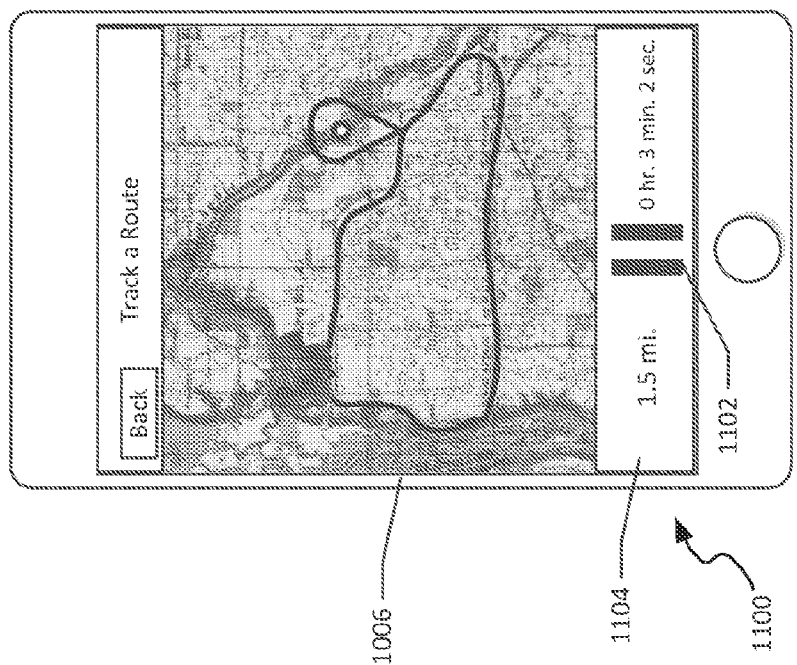
FIG. 11 illustrates an example user interface used for tracking a route by a user or recreational vehicle rider.

FIGS. 11-12 illustrate an example user interface 1100 used for tracking a route by a user or recreational vehicle rider. The route tracking user interface provides a playback of a route traveled by a user, for example to allow that user to revisit his/her route upon completion of the route. Additional details of the route storage and playback are discussed below. The route tracking interface 1100 displays the map display interface 1006, but includes location information, as well as a play/pause option 1102. The route tracking interface 1100 includes an information bar 1104 that illustrates distance traversed, time required, and optionally includes a variety of other types of information, such as fuel consumed, speed at each location (if vehicle data is available) or other information associated with the ride. As seen in FIG. 12, a route management option 1106 allows a user to save or delete the route that was traversed.

Figure 13:
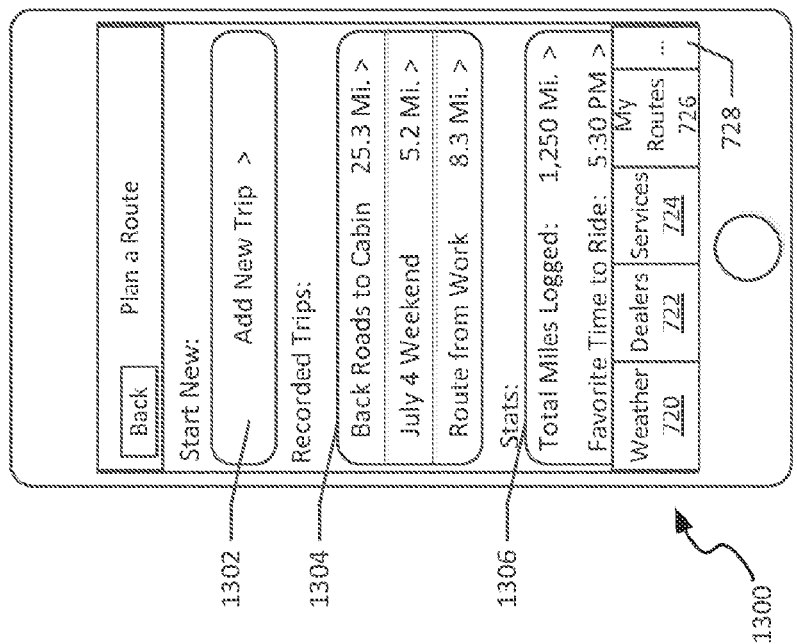
FIG. 13 illustrates an example user interface used for creating a new route by a user or recreational vehicle rider.

FIG. 13 illustrates an example user interface 1300 used for creating a new route by a user or recreational vehicle rider, as well as illustrating historical information regarding routes. The user interface includes an add new trip option 1302 which instantiates the route planning features described above. The user interface 1300 also includes a history 1304 of recorded trips, which is selected for tracking and playback as illustrated in the user interface 1100 of FIGS. 11-12. Additionally, accumulated statistics 1306 are displayed, showing, for example, total miles logged by the rider, as well as typical ride times, distances, and other historical information.

Figure 14:
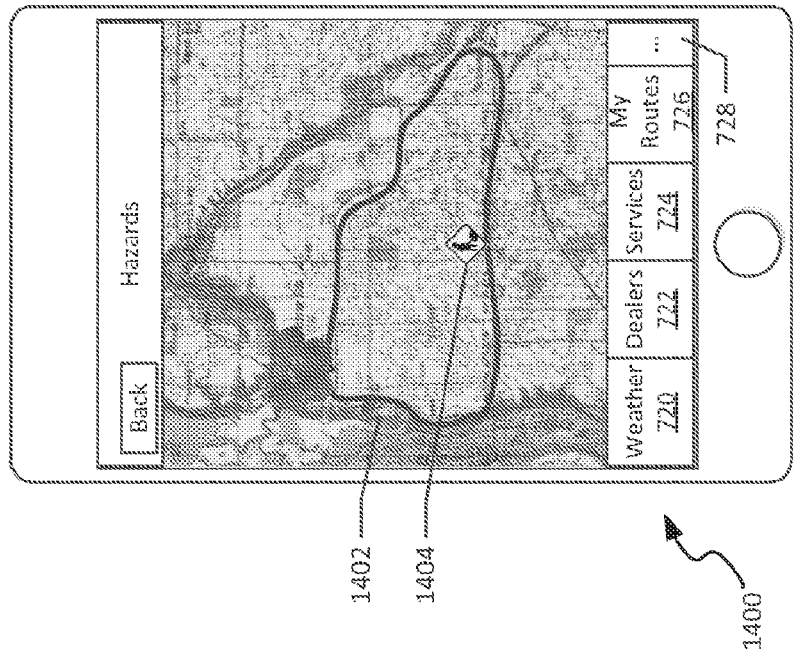
FIG. 14 illustrates an example user interface used for displaying hazards along a route to a user or recreational vehicle rider.
Figure 15:
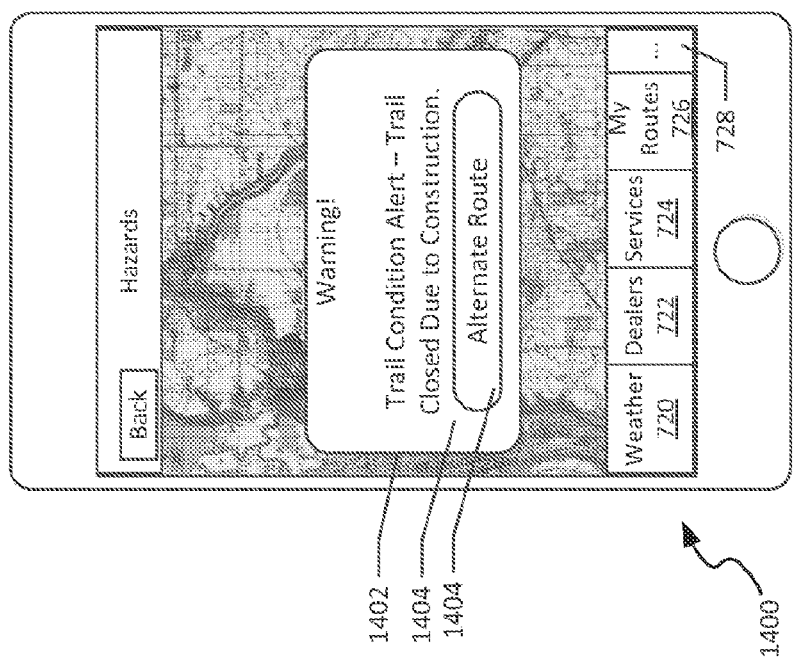
FIG. 15 illustrates a second example user interface used for displaying hazards along a route to a user or recreational vehicle rider.

FIGS. 14-15 illustrate a further example user interface 1400 that is used for displaying hazards along a route to a user or recreational vehicle rider. The user interface 1400 generally illustrates a mapping area 1402, as discussed above in connection with the route planner and points of interest data, but in this view, one or more hazards 1404 are displayed along a selected route. Example hazards, such as reported crashes, fallen trees, closed roads, or other hazardous conditions such as snow grooming equipment on the trail are marked. Upon selection of the hazard 1404, additional details regarding the type and duration of the hazard are displayed, as seen in FIG. 15. Additionally, an alternate route option 1406 allows a user to have an alternate route generated to avoid the hazard, using the routing components discussed above.

FIG. 16 illustrates an example user interface 1600 used for displaying locations of selected other individuals along a route to a user or recreational vehicle rider. The user interface 1600 accordingly implements a "buddy tracker" component of the system in which a user selects one or more other riders to track along a preselected route. The buddy tracker illustrates relative positions of those riders along the trail. As seen in FIG. 16, upon selection of one of the icons 1602 on a map display 1604 illustrating other riders, information about that rider, such as his/her name and relative location, are displayed. In some embodiments, the buddy tracker feature implemented using the user interface 1600 is integrated with the hazards display, for example in the event that a user rides too close to another rider, thereby transforming the buddy tracker into a hazard display, showing a warning to those riders (and nearby riders).

Figure 17:
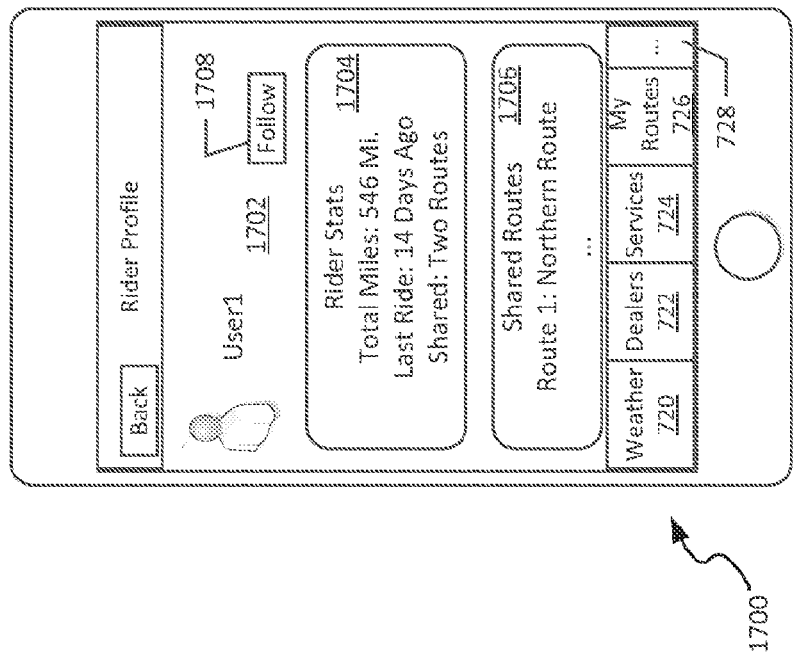
FIG. 17 illustrates an example user interface used for displaying details regarding a selected individual to a user or recreational vehicle rider.

FIG. 17 illustrates a still further example user interface 1700 used for displaying details regarding a selected individual to a user or recreational vehicle rider. The user interface 1700 is displayed, for example, upon selection of a buddy or display of a user profile to show additional information about that other rider. The illustrated user interface includes an information area 1702 including name and photograph of the rider, as well as statistics 1704 regarding that rider, such as miles traveled, frequency or last ride times, or shared routes 1706 with that rider. Optionally, a "follow" option 1706 is included as well, allowing the user to track that rider, for example to add that rider to his/her buddy tracker, or to view additional details regarding that user, or to integrate various social networking features useable in connection with that user (analogous to a "friend" or follower in various social networking systems currently available).

In another illustrated embodiment, the buddy tracking feature provides a notification to the vehicles in a party when one of the vehicles leaves a desired trail. In other words, if one of the vehicles monitored in the buddy tracking system takes a wrong turn and leaves the trail, messages are sent to the other vehicles participating in the buddy tracking system so that the other drivers may locate the driver who left the trail.

FIG. 18 illustrates an example user interface 1800 used for displaying weather data along a trail to a user or recreational vehicle rider. The user interface 1800 includes a map display 1802 that includes a route 1804 selected by the user, and optionally includes an icon 1806 illustrating that user's current location on the route. The map display 1802 includes an overlay of weather information 1808, either in icon form (as shown) or as radar data, illustrating locations and details regarding portions of the trail experiencing inclement weather. Other information such as, for example, warnings (appear large and then shrink on display), snow depth, dealer locations, trail overlays, location of grooming equipment, grooming status of trails, and approved backcountry routes may be provided on the map display. Additional points-of-interest displayable on the display include lodging, medical, shelter, rest areas, gas, and landmarks.

The trail condition information includes specific information applicable to off-road trails. For example, snow depth is received and indicated on the display of the gauge at various locations along the trail. Real time open or closed status for the trail and rerouting due to hazardous conditions on the trail are sent to the gauge from a remote computer. Trail moisture conditions are also included in another illustrated embodiment. Operators can determine whether a trail is too dusty or too muddy or if ideal moisture conditions exist on the trail.

Figure 19:
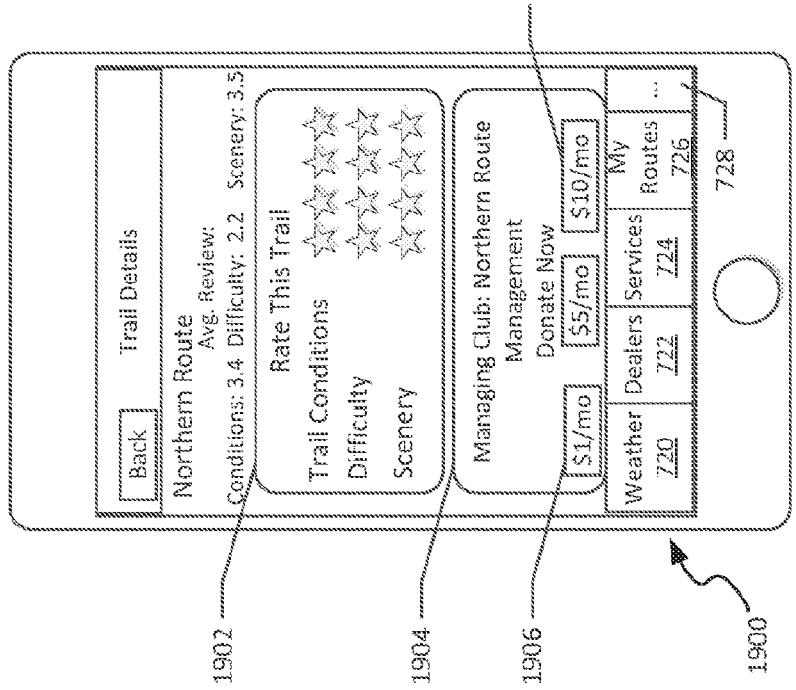
FIG. 19 illustrates an example user interface used for displaying trail details to a user or recreational vehicle rider.

FIG. 19 illustrates an example user interface 1900 used for displaying and reporting trail details to a user or recreational vehicle rider. The user interface 1900 is therefore integrated with a route planning feature as discussed above, in connection with display of difficulty and distance information for a particular route, and is also used to provide feedback to a trail club or other riders regarding a route, as discussed above in connection with FIG. 6.

In the embodiment shown, the user interface 1900 includes a trail rating section 1902 in which the user includes trail ratings regarding the trail conditions, difficulty, and scenery of the trail, and views an aggregate rating of other riders on that trail. The user interface 1900 also includes a trail club region 1904 in which the name of the trail club managing the trail is shown, as well as options 1906 for the rider to donate to the trail club in varying amounts, as well as on a one-time or repeated basis.

Figure 20:
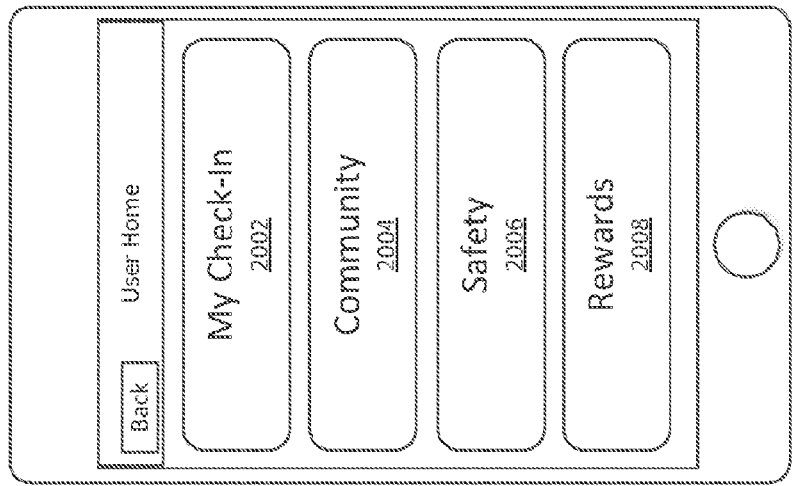
FIG. 20 illustrates an example user interface used for integrating social media features into a trail rider system for use by a user or recreational vehicle rider.

FIG. 20 illustrates an example user interface 2000 used for integrating social media features into a trail rider system for use by a user or recreational vehicle rider. The user interface 2000 includes a check-in option 2002, which allows the user to "check in" to a particular trial or point of interest, analogous to many other location-based social networking systems currently available (e.g., Foursquare, Facebook, Google+, etc.). In accordance with the present disclosure, it is understood that various other features of such a system, such as "mayorships" or various locations, as well as including a recommendations system as part of the trail feedback, could be included as well.

A community option 2004 allows the user to view a group of users in the area, or on the trail, at a particular time, as well as recent activity of the users to which that user is connected (e.g., by using the "follow" option 1708 discussed above). Additionally, a safety option 2006 allows for display of safety-related information regarding the ride or operation of a particular recreational vehicle, or features that may be specific to the trail that is being ridden. Additionally, a rewards option 2008 is included, and is used by businesses or other points of interest to reward repeated visits or "check-ins" to that business as a point of interest, or includes incentives that the business wishes to provide to recreational vehicle riders to encourage them to visit the point of interest.

Figures 21, 22:
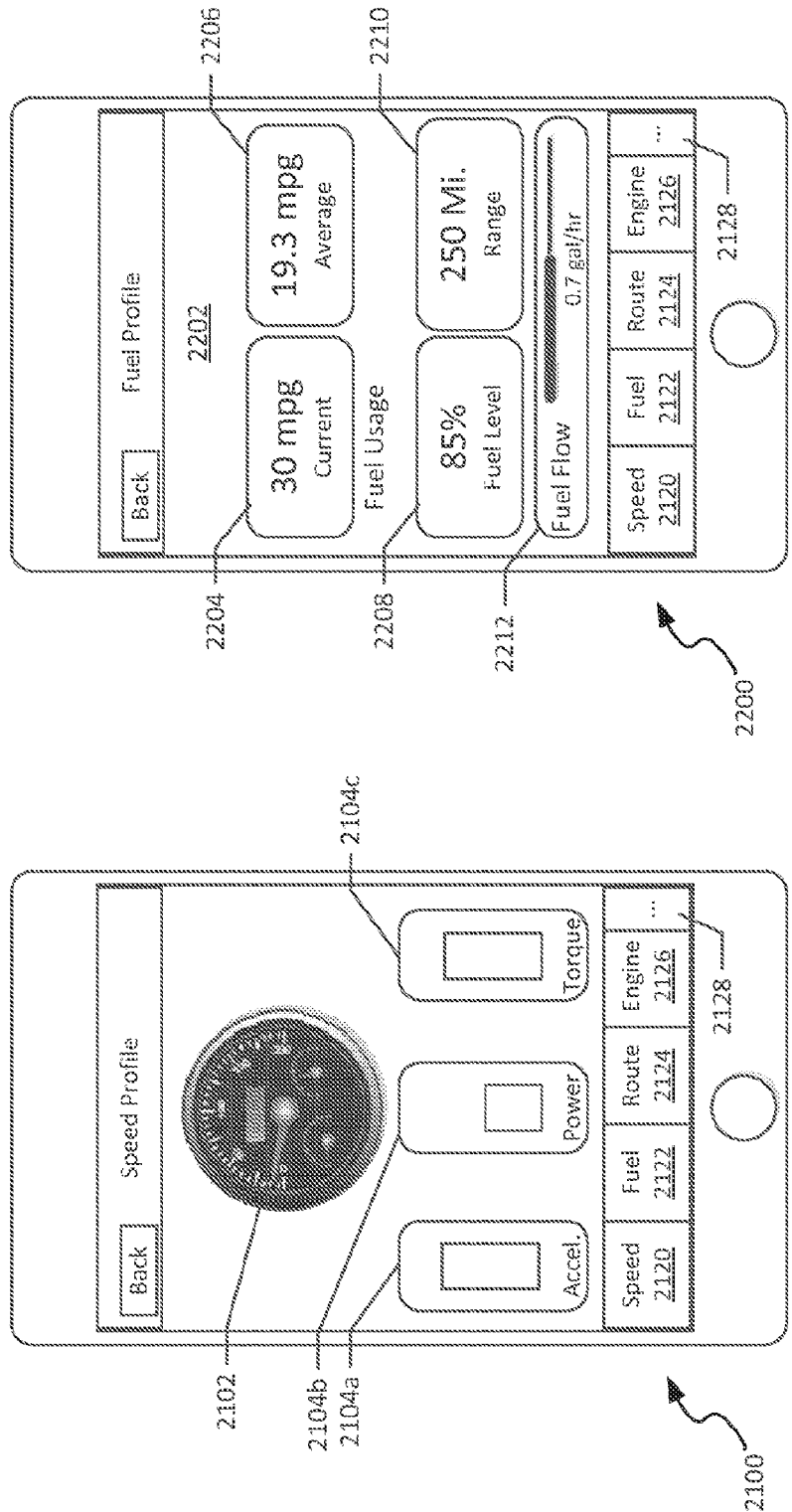
FIG. 21 illustrates an example user interface used for displaying recreational vehicle speed data to a user or recreational vehicle rider.
FIG. 22 illustrates an example user interface used for displaying recreational vehicle fuel usage to a user or recreational vehicle rider.

FIGS. 21-22 illustrates user interfaces 2100, 2200, respectively, that display information that includes integrated vehicle information, such as some of the types of information available from a vehicle ECU, as discussed above in connection with FIGS. 4-5. In the embodiment shown in FIG. 21, a user interface 2100 includes a speedometer 2102, as well as gauges 2104a-c that display acceleration, power, and torque, respectively. It is understood that other types of gauges, and other data, could be included in the display as well. Additional gauge data is discussed below. In FIG. 22, a fuel user interface 2200 is displayed that includes a fuel profile 2202. The fuel profile includes a current fuel consumption 2204, an average fuel consumption 2206, as well as a fuel level 2208 and a range 2210 based on the expected fuel consumption for the remainder of the planned route. Additionally, a fuel flow gauge 2212, illustrating a rate of fuel flow to the engine, is provided. In an illustrated embodiment, terrain maps are used to assist with determining the estimated fuel range. If the trail is steep, the processor factors in terrain when estimating fuel range for the vehicle.

In both FIG. 21 and FIG. 22, options are included that allow for navigation among the available vehicle data. For example, in the embodiments shown, user interfaces 2100, 2200 include a speed option 2120 that causes display of the user interface 2100, as well as a fuel option 2122 that causes display of the user interface 2200. Additional options cause display of other displays; in the example shown, a route option 2124 returns the user to the route planning and tracking user interfaces of FIGS. 7-18, while an engine option 2126 displays additional engine parameters to the user, such as the listing of parameters discussed above as available from the ECU and vehicle 110 of FIGS. 4-5. Additional menu options are accessible via a "more" option 2128 (shown as ellipses).

Figure 23:
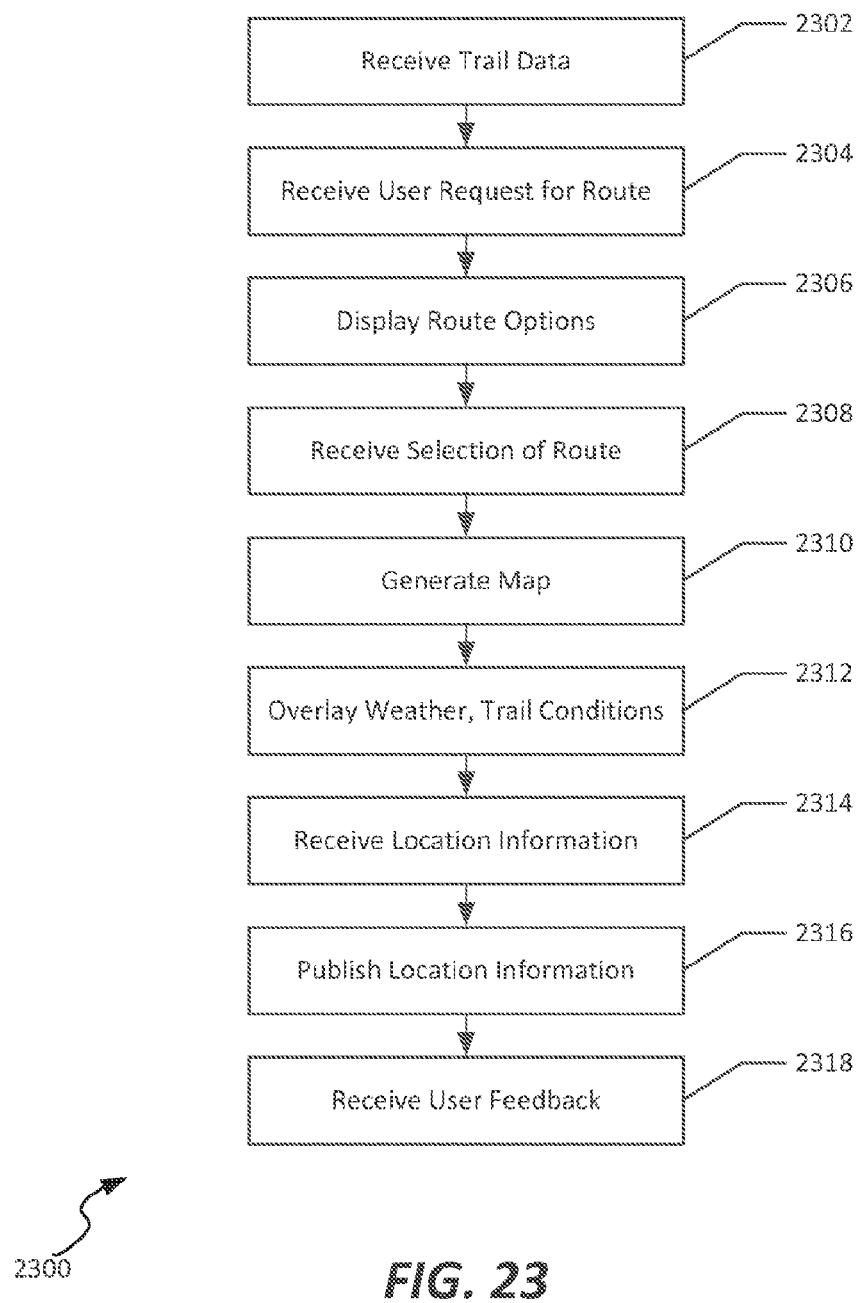
FIG. 23 illustrates a flowchart of a method for facilitating usage of a recreational vehicle, according to an example embodiment.
Figure 24:
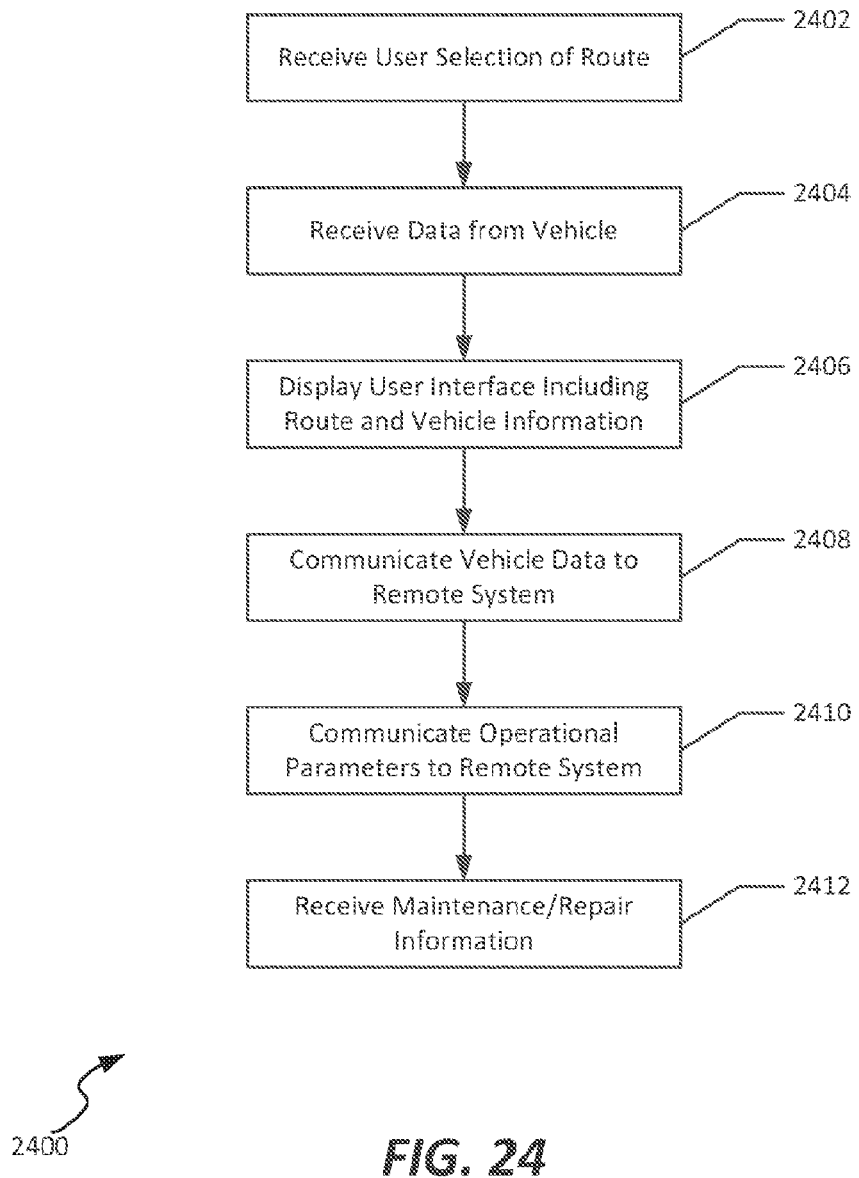
FIG. 24 illustrates a flowchart of a method for integrating rider experience with recreational vehicle performance, according to an example embodiment.

Referring now to FIGS. 23-24, methods of facilitating usage of a recreational vehicle are discussed, according to example embodiments of the present disclosure, including methods for planning and traveling various recreational vehicle routes (including off-road routes), as well as for integrating route planning and vehicle data into a comprehensive display to improve the rider experience.

In the embodiment shown in FIG. 23, a method 2300 is generally instantiated with receipt of trail data, for example from a trail data aggregator or from a plurality of trail clubs (step 2302). Based on that trail data, one or more users of an application or web interface then request route data, to search for or automatically generate a route that the user wishes to traverse (step 2304). This includes, for example, parameters entered by the user, such as a trail difficulty, travel time, specific points of interest or waypoints to be visited, or other options. The mobile application 300 and/or server 102 generates and causes display of one or more route options based on the parameters provided by the user (step 2306). Upon display of the one or more routes, a user selects a route that he/she wishes to travel (step 2308).

Once the user has selected a desired route, a map illustrating the route is generated, as illustrated in the user interfaces of FIGS. 7-18, generally (step 2310). The map is selected to display additional options relating to that route, such as points of interest (as in FIG. 10), hazards (as in FIGS. 14-15), buddies located along the route (as in FIG. 16), weather information (as in FIG. 18), or other types of information (step 2312). In the embodiment shown, the map displays a current location of the user on that user's display (step 2314), and optionally publishes that information to other users for tracking in their applications, for example in buddy tracker features of corresponding applications associated with other riders (step 2316). Once the user has completed his/her ride, that user then provides feedback regarding the ride, such as by providing commentary regarding the route, including text or ratings regarding difficulty or scenery of the trail taken (step 2318).

Referring now to FIG. 24, a method 2400 for integrating such user-based information as discussed above with vehicle information is provided. In the method 2400, a route selection of a user is received (step 2402), and data from a recreational vehicle is also received, for example from the vehicle 108 at a server 102 as seen in FIG. 4, or at a mobile device 110, as seen in FIG. 5 (step 2404). A display is provided to the user, such as is seen in FIGS. 21-22, that displays vehicle information to a user in an application that combines vehicle and user information (step 2406). Optionally, vehicle information and operational parameters can also be delivered to the server 102 for other purposes as well, such as transmitting error code or maintenance information (steps 2408 and 2410). In response, maintenance or repair information is received either at the vehicle 108 or mobile device 110, for presentation to a user (e.g., a person needing to repair his/her vehicle while on the trail) (step 2412).

Figure 25:
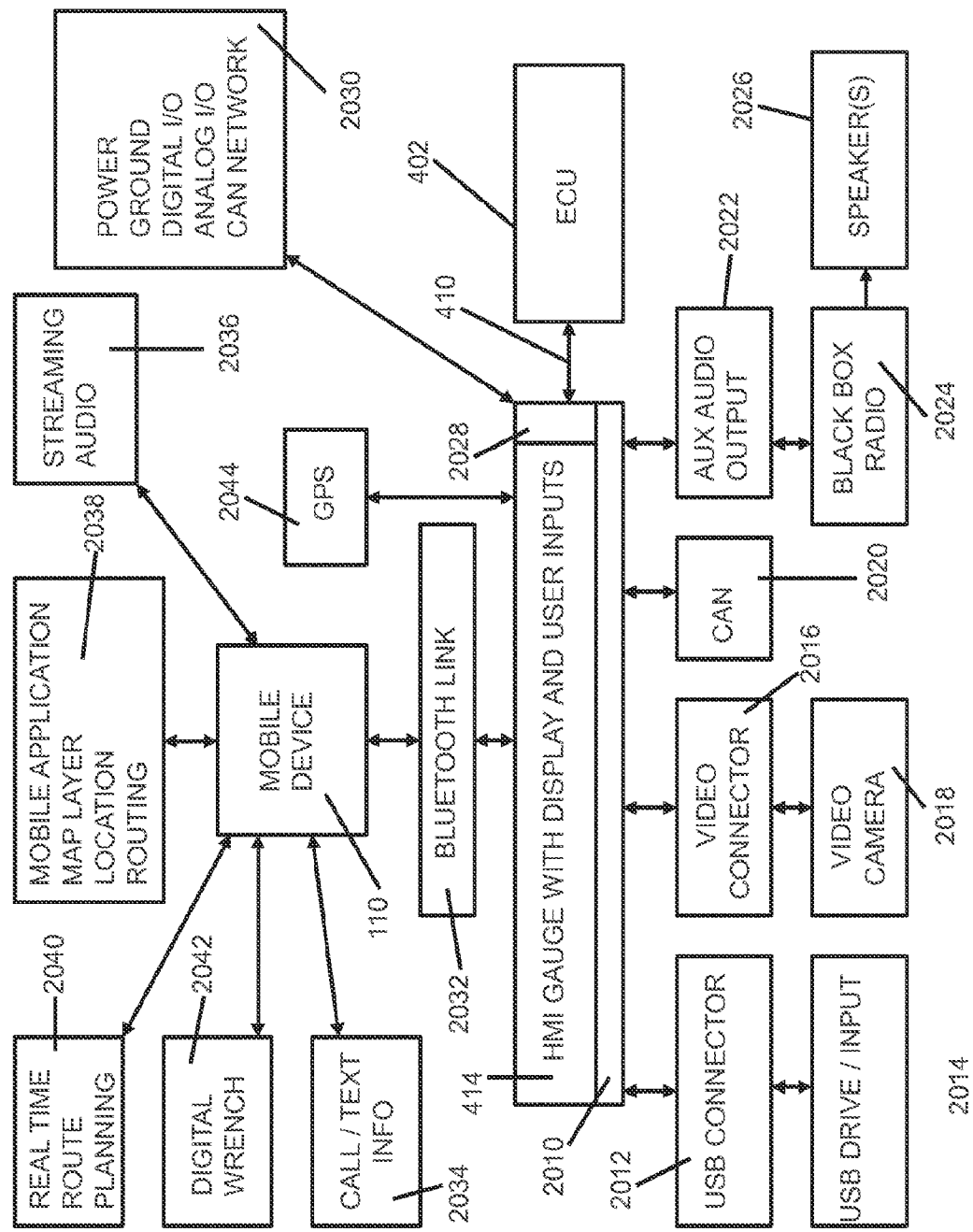
FIG. 25 is a block diagram illustrating components of a multi-function gauge having a full color display screen interacting with a mobile device and other vehicle components.

Another embodiment of the present disclosure is illustrated in FIG. 25. In the embodiment of FIG. 25, a human machine interface (HMI) includes a multi-function gauge 414 having a full color display screen. The gauge 414 includes an accessory connector 2010 including USB connector port 2012 configured to be connected to a USB drive 2014. USB drive 2014 illustratively provides software updates, GPS data, special mapping layers, or other data to the gauge 414. In addition, the USB drive 2014 receives data from the gauge 414 such as for recording route information and "ride data" as discussed herein.

Accessory connector 2010 further includes a video connector 2016 configured to be coupled to a video camera 2018. In addition, accessory connector 2010 includes a CAN network connection 2020 and an auxiliary audio output connector 2022. The auxiliary output connector 2022 is illustratively connected to an audio output device such as a black box radio 2024 to provide audible alerts or other information to an operator through one or more speakers 2026.

Gauge 414 also includes standard I/O connectors 2028 including power, ground, eight digital I/O connections, three analog I/O connections and a CAN network connection as illustrated at block 2030. As discussed above, the gauge 414 is connected to an ECU 402 of the vehicle by a CAN interface 410. The CAN interface 410 may also be coupled to the black box radio or other audio device 2024.

The gauge 414 is illustratively connected to the user handheld mobile device 110 by a suitable connection, preferably a wireless connection such as a Bluetooth data link 2032, to provide communication between the gauge 414 and the mobile device 110. Therefore, the gauge 414 is connected to the Internet 116 or other communication network to the plurality of data sources discussed herein through the mobile device 110. In an illustrated embodiment, phone call and text information from a mobile phone 110 is displayed on gauge 414 as illustrated at block 2034. The information displayed on a display of gauge 414 illustratively includes cell signal strength, call notification, text information, an address book, or other information from the mobile phone 110. User inputs on gauge 414 are used to control functions of the mobile device 110. Music can also be played from mobile device 110, through gauge 414, and speakers 2026.

Streaming audio is provided to the mobile device 110 as illustrated at block 2036. When a black box radio 2024 does not have Bluetooth capability, the streaming audio data is transmitted from mobile device 110 to gauge 414 and then through audio output 2022 to the black box radio 2024.

A mobile application 38 discussed above with reference to FIGS. 1-24 provides information such as map data, route information, location information, or buddy tracking, and other information to the mobile device 110. In the embodiment of FIG. 25, the data from mobile application 2038 is transferred to the gauge 414 for display. Inputs from the gauge 414 are transferred to the mobile device 110 to control features of the mobile application 2038.

A real time route planning mobile application 2040 is used on mobile device 110 to plan and display the route information using inputs on gauge 414. For instance, route planning software from Primordial may be used in application 2040. In addition, a vehicle data recording and diagnostics application 2042 such as a mobile digital wrench is controlled and viewed on the gauge 414 through the mobile device 110.

A GPS puck of module 2044 is also coupled to the gauge 414. The GPS module 2044 provides location data to the gauge 414 for the mapping, route planning, or other functions described herein.

Figure 26:
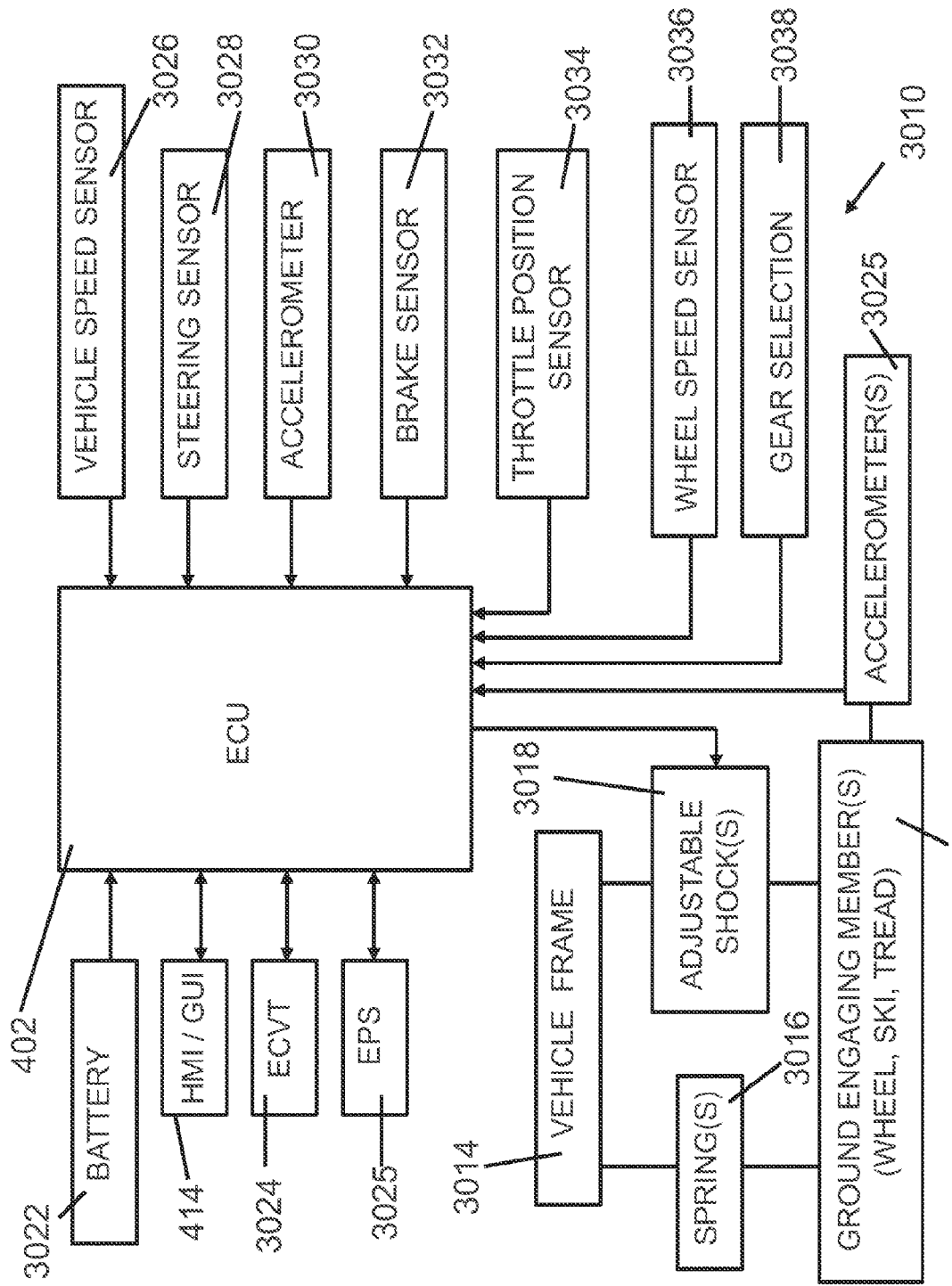
FIG. 26 is a block diagram illustrating vehicle sensors coupled to an electronic control unit (ECU) and components of a vehicle controlled by the ECU through the gauge or mobile device.

Referring now to FIG. 26, in another embodiment of the present disclosure, a vehicle 3010 has a suspension located between a plurality of ground engaging members 3012 and a vehicle frame 3014. The ground engaging members 3012 include wheels, skis, guide tracks, treads or the like. The suspension typically includes springs 3016 and shock absorbers 3018 coupled between the ground engaging members 3012 and the frame 3014. The springs 3016 may include, for example, coil springs, leaf springs, air springs or other gas springs. The air or gas springs 3016 may be adjustable. See, for example, U.S. Pat. No. 7,950,486 incorporated herein by reference. The springs 3016 are often coupled between the vehicle frame 3014 and the ground engaging members 3012 through an A-arm linkage or other type linkage. Adjustable shock absorbers 3018 are also coupled between the ground engaging members 3012 and the vehicle frame 3014. In an illustrated embodiment, a spring 3016 and shock 3018 are located adjacent each of the ground engaging members 3012. In an ATV, for example, four springs 3016 and adjustable shocks 3018 are provided adjacent each wheel 3012. Some manufacturers offer adjustable springs 3016 in the form of either air springs or hydraulic preload rings. These adjustable springs 3016 allow the operator to adjust the ride height on the go. However, a majority of ride comfort comes from the damping provided by shock absorbers 3018.

In an illustrated embodiment, the adjustable shocks 3018 are electrically controlled shocks for adjusting damping characteristics of the shocks 3018. An ECU or other controller 402 provides signals to adjust damping of the shocks 3018 in a continuous or dynamic manner. The adjustable shocks 3018 are illustratively adjustable to provide differing compression damping, rebound damping or both. Additional details of control of the adjustable damping control system are described in U.S. Application No. 61/723,623, filed on Nov. 7, 2012, owned by the assignee of the present application, which is expressly incorporated herein by reference.

In an illustrated embodiment of the present disclosure, a gauge 414 provides a to human machine user interface provided in a location easily accessible to the driver operating the vehicle. Preferably, the gauge 414 is mounted adjacent the driver's seat on the dashboard or integrated onto a display within the vehicle. Gauge 414 includes user inputs discussed below to allow the driver or a passenger to manually adjust shock absorber 3018 damping during operation of the vehicle based on road conditions that are encountered. The display of gauge 414 displays information related to the shock absorber damping settings.

In the illustrated embodiment of FIG. 26, the ECU 402 also controls an electronic continuously variable transmission (ECVT) 3024 and an electronic power steering (EPS) 3025 of the vehicle 3010. In an illustrated embodiment, the mobile device 110 or the gauge 414 is used to control performance features of the vehicle 3010 including the adjustable shocks 3018, the ECVT 3024, the EPS 3025, or other electronically controllable performance functions of the vehicle.

The ECU 402 receives inputs from the gauge 414 or mobile device 110 to adjust the damping characteristics of the adjustable shocks 3018 or control the ECVT 3024 or EPS 3025. The front and rear shock absorbers 3018 are independently adjustable to adjust the ride characteristics of the vehicle 3010.

A plurality of sensors are also coupled to the ECU 402. For example, a global change accelerometer 3025 is coupled adjacent each ground engaging member 3012. The accelerometer 3025 provides an output signal coupled to ECU 402. The accelerometers 3025 provide an output signal indicating movement of the ground engaging members and the suspension components 3016 and 3018 as the vehicle traverses different terrain.

Additional sensors may include a vehicle speed sensor 3026, a steering sensor 3028 and a chassis accelerometer 3030 all having output signals coupled to the ECU 402. Accelerometer 3030 is illustratively a three-axis accelerometer located on the chassis to provide an indicating of forces on the vehicle during operation. Additional sensors include a brake sensor 3032, a throttle position sensor 3034, a wheel speed sensor 36, and a gear selection sensor 3038. Each of these sensors has an output signal coupled to the ECU 402. ECU 402 detects when a vehicle is upside down using accelerometer 3030 and sends a distress signal through mobile device 110.

In one illustrated embodiment, the gauge 414 is used in a demonstration mode on a showroom floor. The gauge 414 illustratively receives video or other information through USB port 12, video connection 16, or through handheld mobile device 110 to provide videos or other information on the display of gauge 414 for promotional purposes.

In another embodiment of the present invention, the gauge 414 facilitates tracking of a vehicle. The gauge 414 receives information from the various sensors shown in FIG. 26 and location data from the GPS input 2044 to track how the vehicle was driven and where it was driven. This "ride data" is stored locally and retrieved, for example, through USB port 12 or the data is sent through the mobile device 110 to a remote location for storage and processing. Additional details of monitoring, storing, and replaying ride data are disclosed in U.S. Patent Publication No. 2010/0090797, owned by the assignee of the present application, which is expressly incorporated herein by reference.

In one illustrated embodiment, an owner can monitor a fleet of vehicles to determine a location of each vehicle and how the vehicles have been driven. In another embodiment, the gauge 414 is used to adjust vehicle settings, such as the springs 3016 or adjustable shocks 3018 of a suspension system or to adjust an electronic continuously variable transmission (ECVT) 3024 through the gauge 414. Vehicle settings are illustratively based on an experience level of a driver of the vehicle, a route the vehicle is being driven, or other factors. For instance, different settings of the ECVT 3024, suspension system 3016, 3018 or other systems are provided depending on whether the vehicle is being operated on-road, on-trail, or off-trail. In an illustrated embodiment, components of the vehicle 3010 are adjusted automatically based on a location of the vehicle detected using GPS data.

In another embodiment, the mobile device 110 provides a security device or security key for the vehicle through its communication with the gauge 414. In an illustrated embodiment, the mobile device 110 includes a driver profile including age and experience level. The gauge 414 receives the driver profile information from the mobile device 110 and automatically sets vehicle settings such as the vehicle suspension, shifting patterns, etc. based upon the driver profile.

In another illustrated embodiment, the gauge 414 receives vehicle information from the sensors shown in FIG. 26 and provides a timestamp on the vehicle kinematic data received. This "ride data" is linked to a vehicle location on the route through the GPS data and a timestamp of the time at which the vehicle was at the different locations. Therefore, the vehicle can store all information associated with a ride and the user can replay the ride after it is over as discussed above.

In another embodiment of the present disclosure, the mobile device 110 and gauge 414 to track and manage a vehicle. The mobile application 2038 tracks and locates a vehicle. A scheduling system prioritizes and assigns use of the vehicle.

Additional details of an illustrated embodiment of the gauge 414 are shown in FIGS. 27 and 28. The gauge 414 includes a body portion 3040 housing a display 3042. A plurality of selection buttons 3044 permit the user to control various features and functions of the present system as described herein. In an illustrated embodiment, the center button 3046 is a menu key button. Buttons 3048 and 3050 provide scroll up and scroll down functionality. Buttons 3052 and 3054 provide selections for various items as discussed below.

Figure 29:
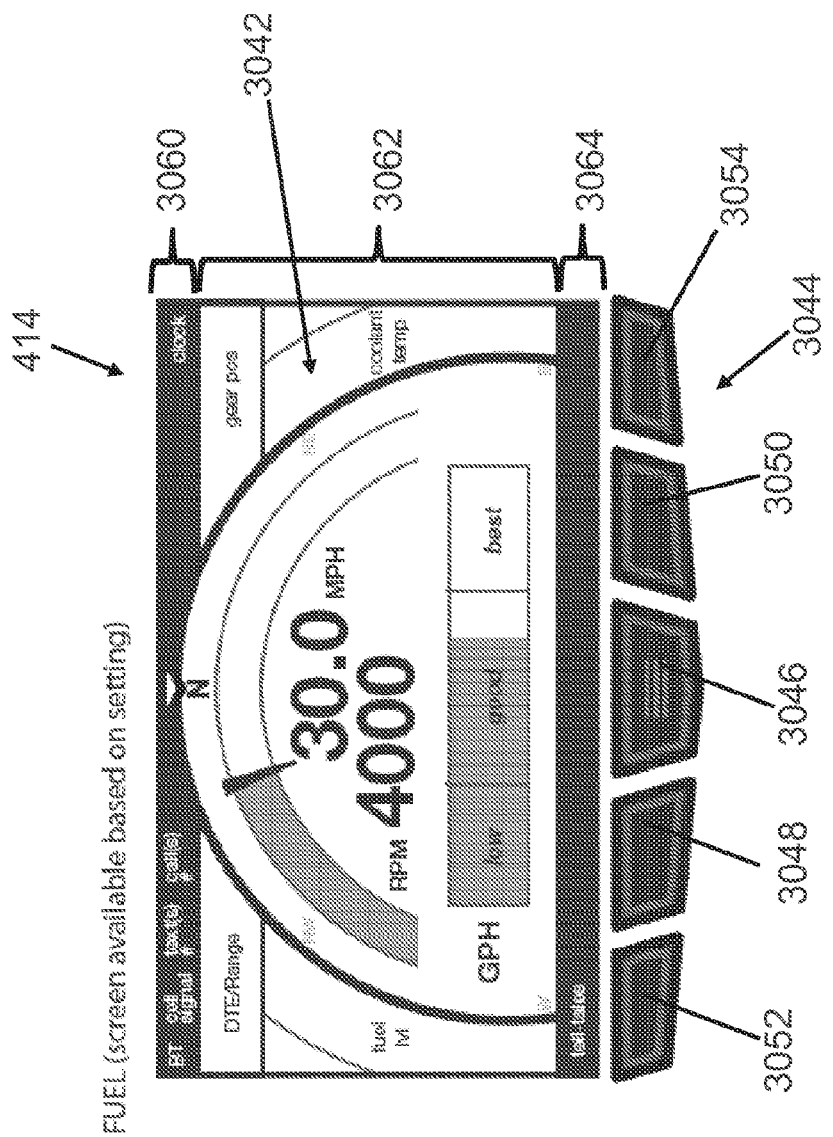
FIGS. 29 and 30 illustrate display screens and control buttons of the gauge of FIGS. 27 and 28.
Figure 30:
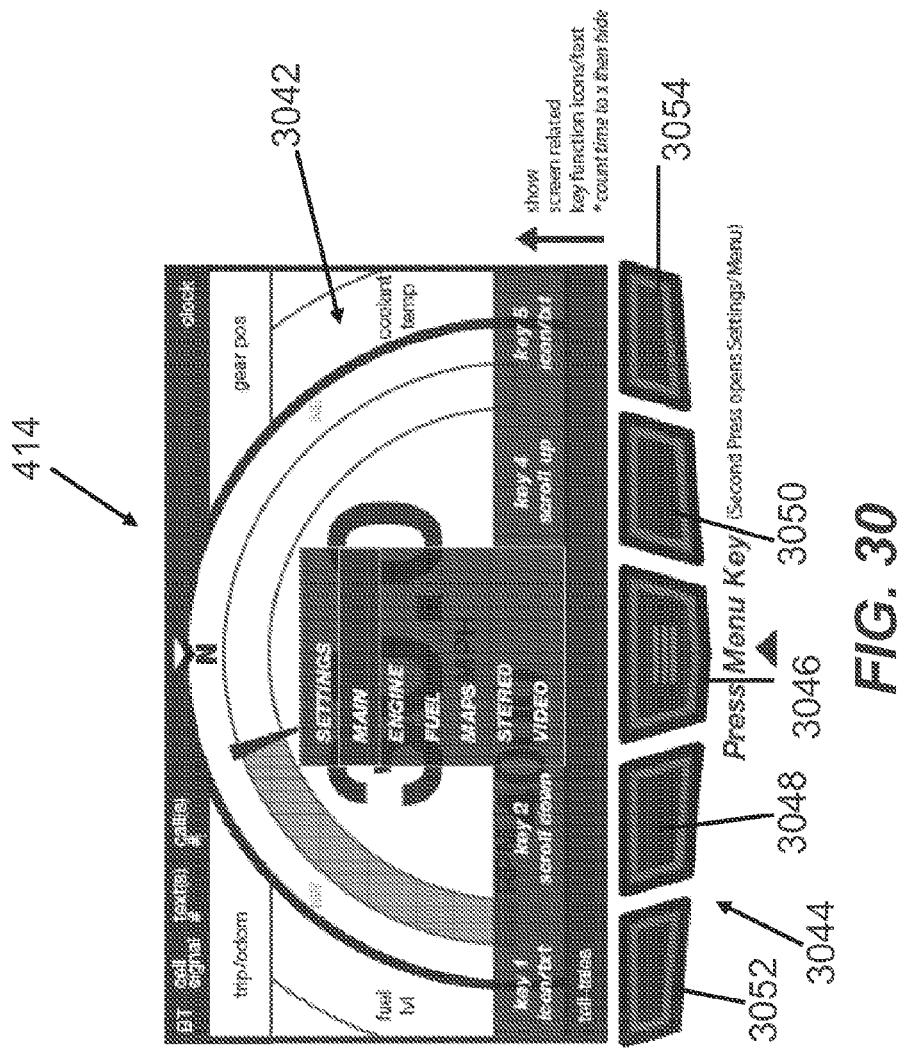

One illustrated embodiment of the display screen on gauge 414 is shown in FIGS. 29 and 30. For example, gauge 414 is used to display speed, fuel level, coolant temperature, RPM, gear position, trip/odometer, compass, and turn signal indicators. A display screen includes a top portion 3060 which provides header information. Main section 3062 of display displays information related to the various parameters discussed above. Section 3064 displays tell-tale information. As shown in FIG. 30, when menu key button 3046 is pressed, the main menu appears on the display screen 3042 of gauge 414. The user then selects different screens for display and control. The tell-tales in section 3064 of screen illustratively include an engine fault alerts, a low fuel, coolant temperature/level alert, an oil pressure alert, voltage low alert, parking brake and high beam indicators.

Figure 31:
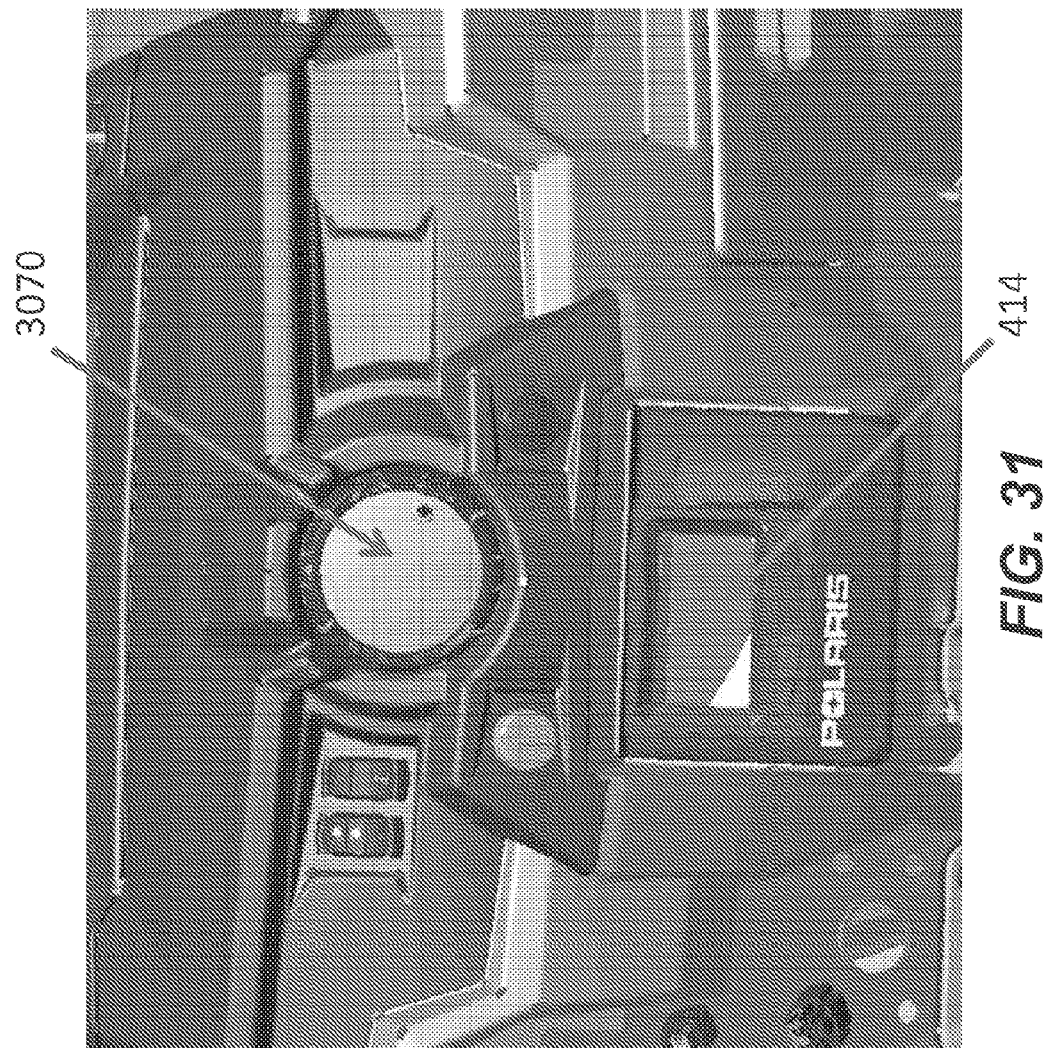
FIGS. 31-34 illustrate the position of the multi-function gauge and display screen located within utility vehicles, all-terrain vehicles, and snowmobiles.
Figure 32:
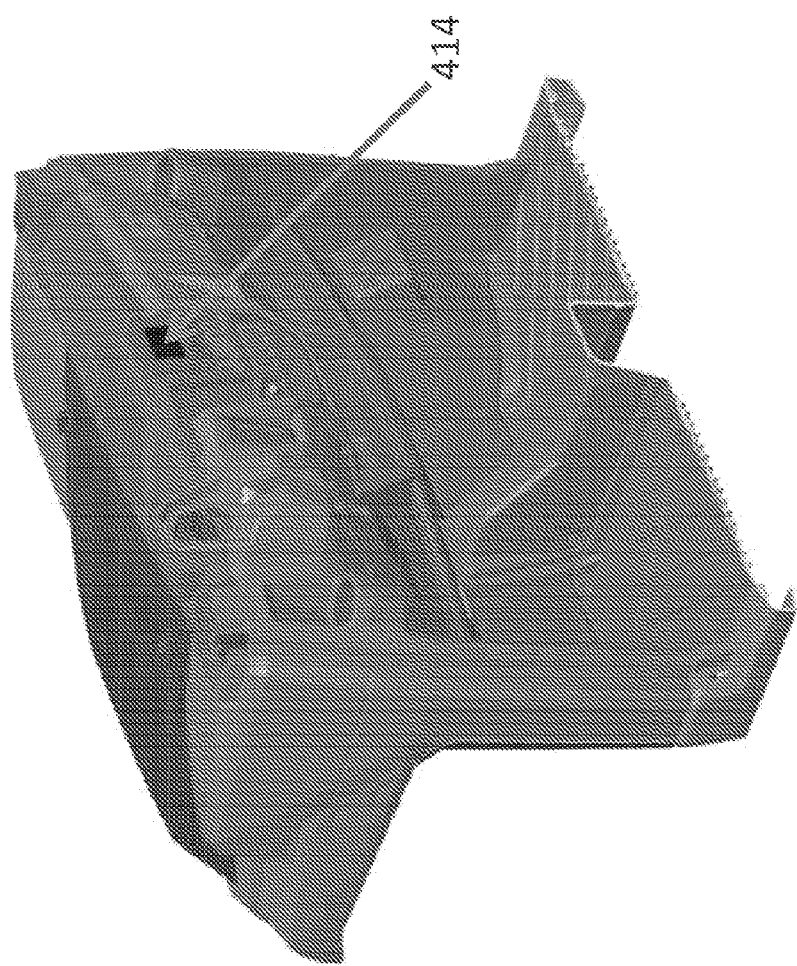
Figure 33:
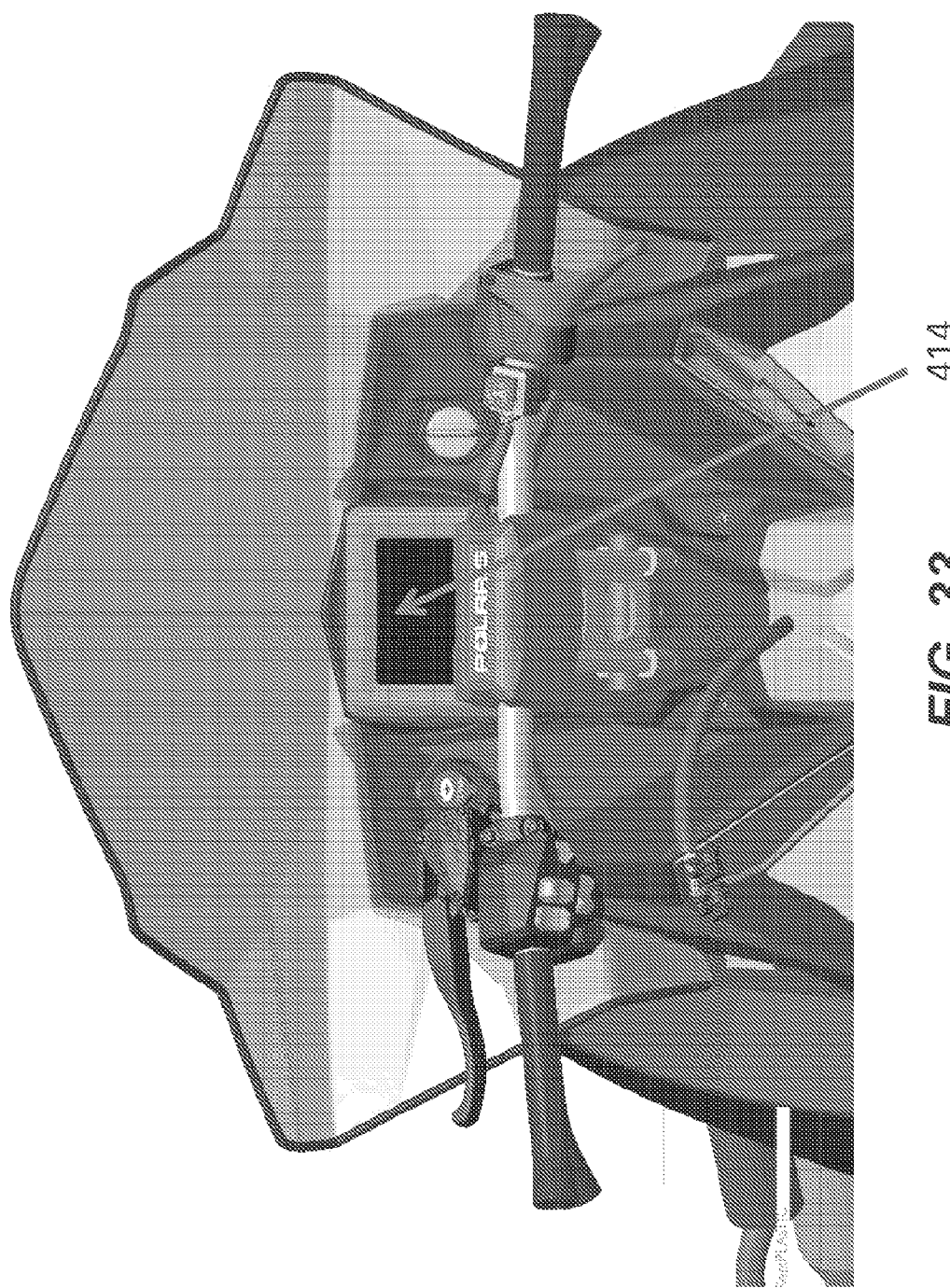
Figure 34:
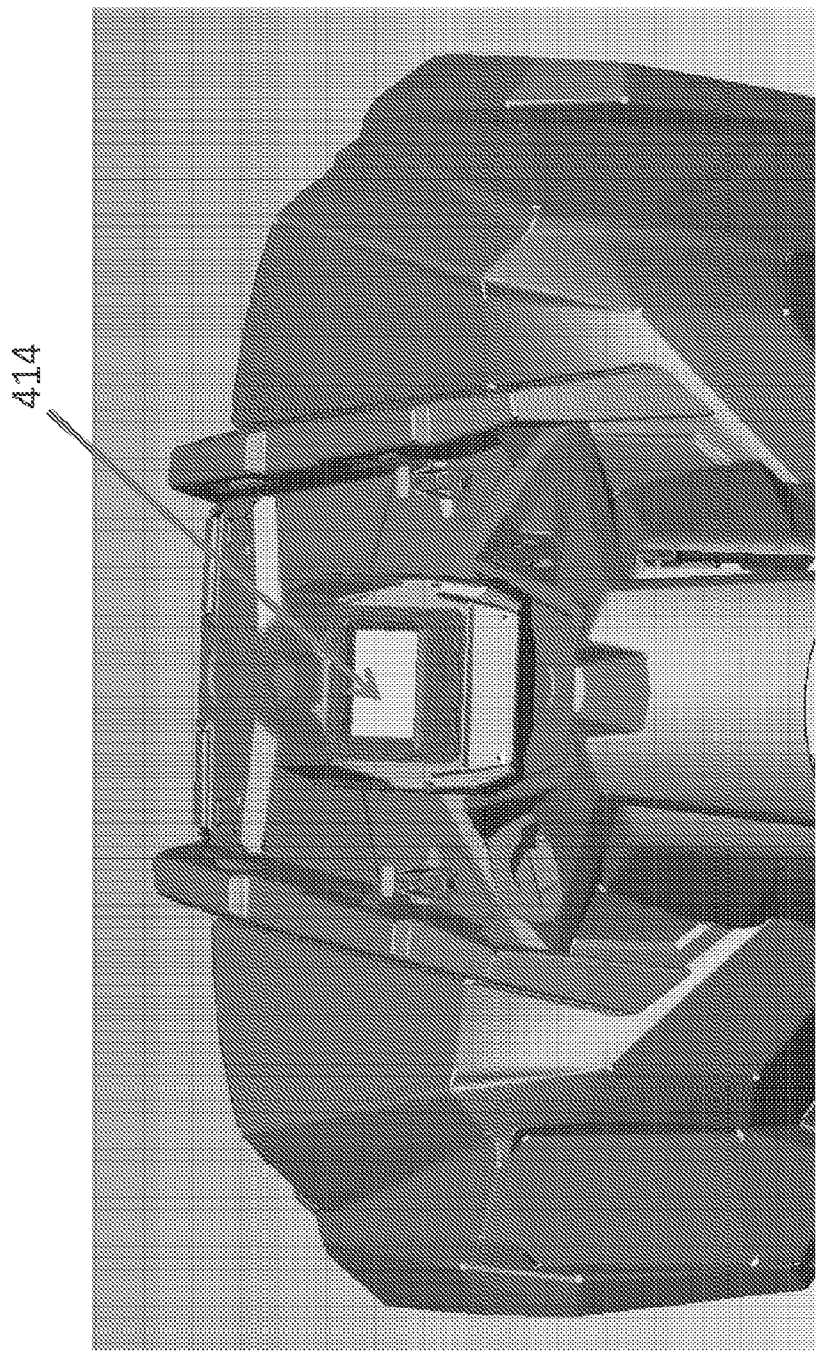

FIGS. 31-34 illustrate various mounting positions for the gauge 414 of the present disclosure. In FIG. 31, the gauge 414 is mounted below an existing display 3070. FIG. 32 illustrates the gauge 414 mounted on a front dashboard of a utility vehicle. FIG. 33 illustrates the gauge 414 mounted within a snowmobile. FIG. 34 illustrates the gauge 414 mounted on an ATV.

The gauge 414 includes a body portion housing a display. A plurality of physical selection buttons permit the user to control various features and functions of the present system as described herein. In an illustrated embodiment, the center button is a menu key button. Other buttons provide scroll up and scroll down functionality. Buttons also provide selections for various items as discussed below. In another embodiment, virtual control buttons are provided on a touch screen.

Figure 35:
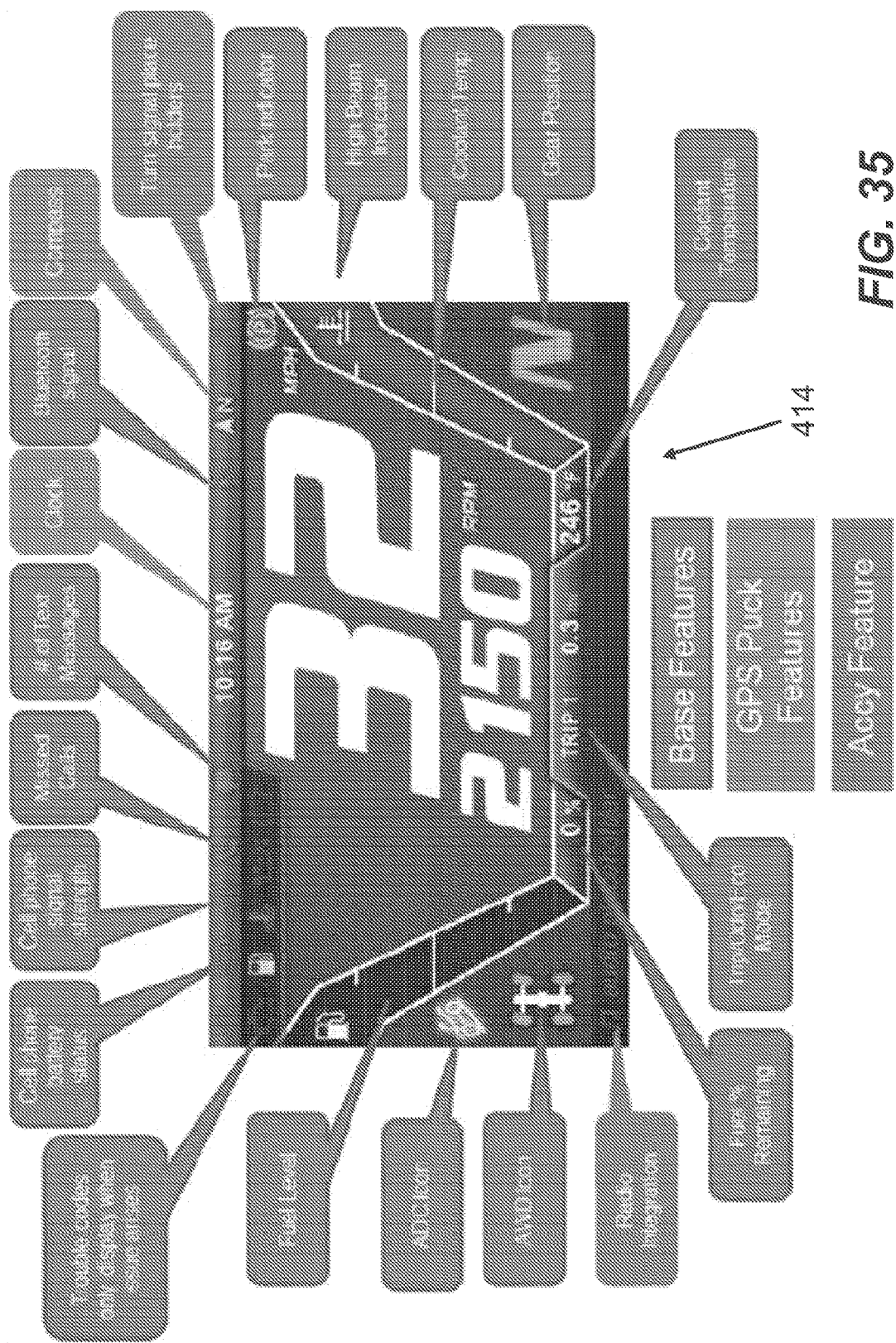
FIG. 35 illustrates a display screen on the gauge along with indicators showing items displayed on the gauge display.

One illustrated embodiment of the display screen on gauge 414 is shown in FIG. 35. For example, gauge 414 is used to display vehicle speed, fuel level, coolant temperature, RPM, gear position, trip/odometer, compass, and turn signal indicators. A display screen includes a top portion which provides header information including cell phone battery status, cell phone signal strength, missed calls, number of text messages, a clock, a Bluetooth signal strength, a compass, and turn signals. Trouble codes are located below the header and are displayed only when an issues arises such as coolant temperature, low fuel, engine trouble, battery issues, or the like. Other icons provide additional information, including fuel level, ADC icon, AWD icon, gear position, coolant temperature, high beam indicator, park indicator, fuel percentage remaining, trip odometer, and coolant temperature. The gauge also provides radio integration.

Figure 36A:
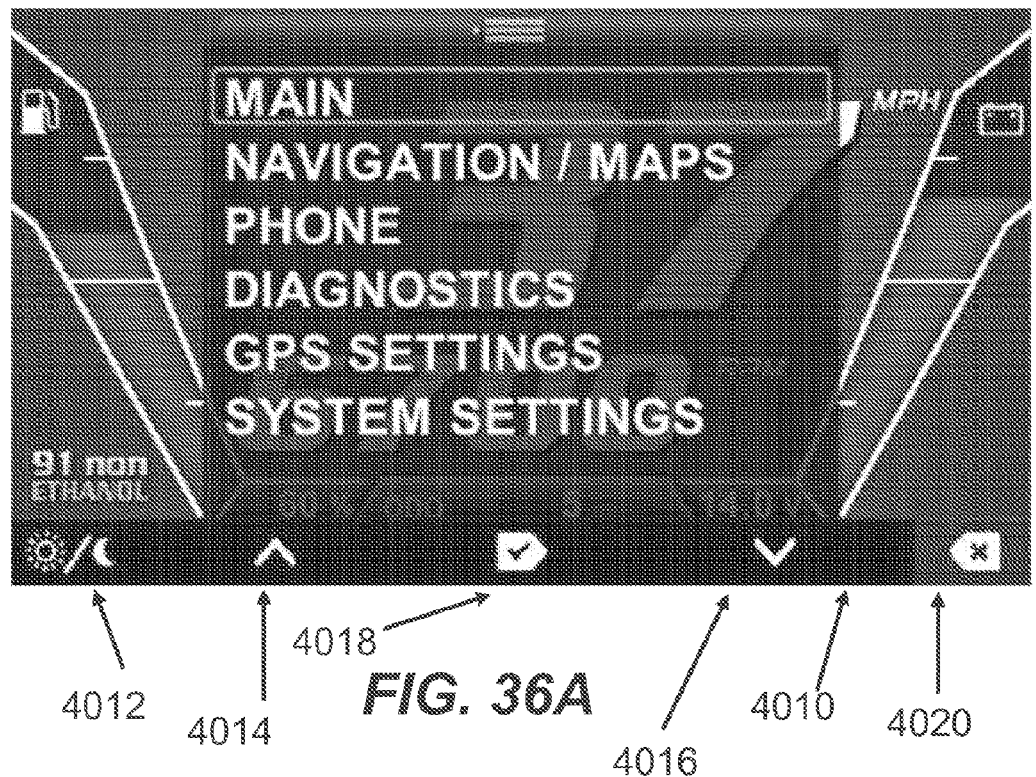
FIGS. 36A and 36B illustrate menus displayed on the display screen of a gauge.

A first main menu screen is shown in FIG. 36A. Controls or buttons or 4010 are shown in the bottom of the display. Actuation of the buttons 4010 is accomplished through a touch screen or physical buttons located below the indicators. Button 4012 controls the brightness of the screen. Up arrow 4014 and down arrow 4016 permit the operator to navigate through the menu on the display screen. For example, the user can navigate between a main menu to display vehicle operation data, new menu item to display navigation/map information, a menu item to display phone information, and a menu item to display diagnostics information, a menu item to display GPS settings, and a menu item to display system settings. Once the appropriate item is highlighted, the operator makes a selection with button 4018. Button 4020 returns to the prior screen.

Figure 37:
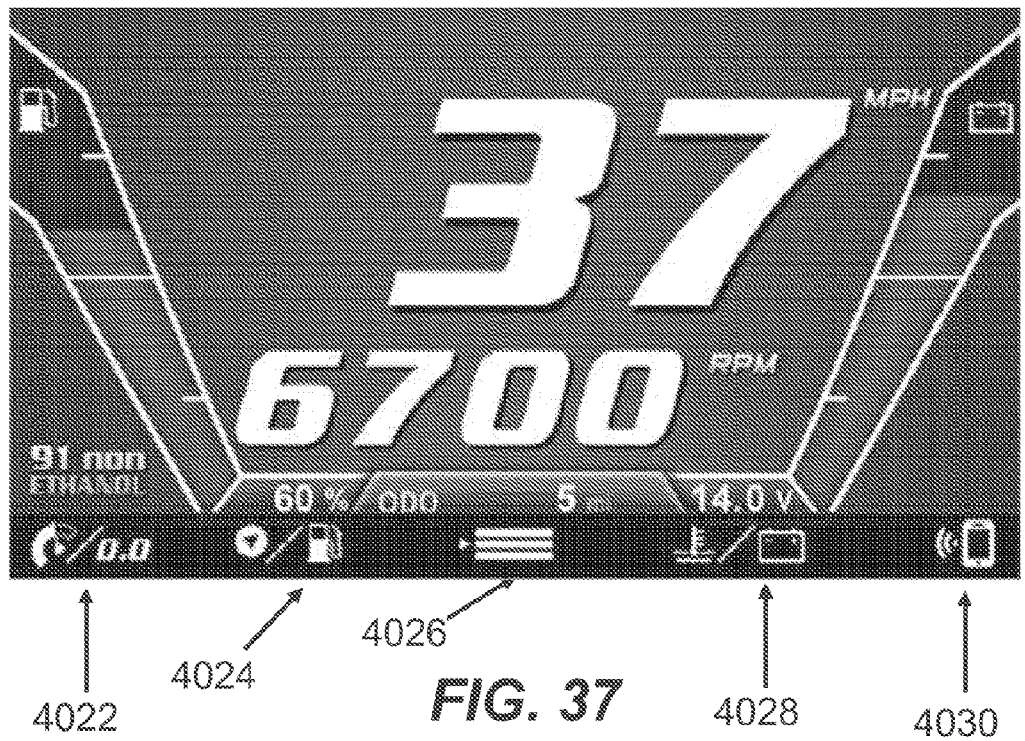
FIGS. 37-42 illustrate a plurality of different formats for displaying vehicle operation data on the display screen of a gauge.
Figure 38:
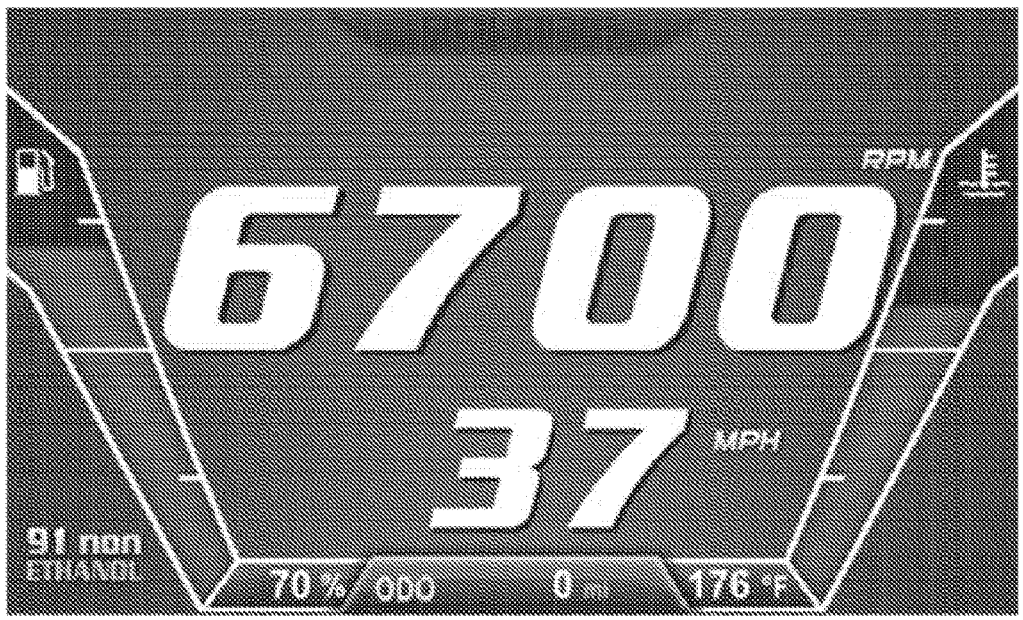
Figure 39:
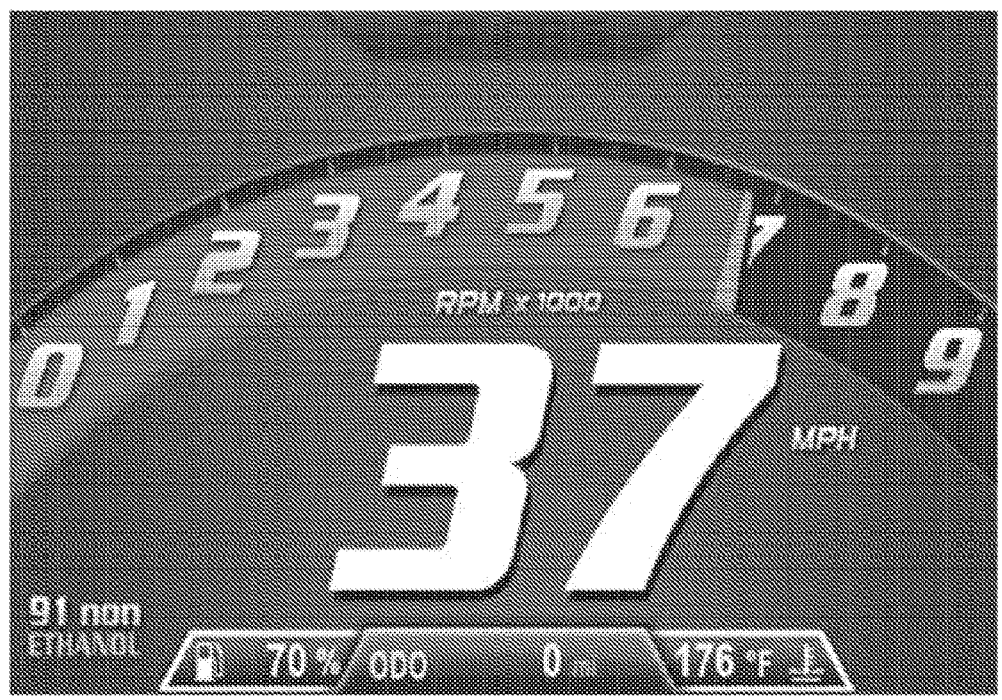

Illustrative embodiments of the main display screens for the gauge 4014 to display vehicle operation data are shown in FIGS. 37-42. In FIG. 37, the far left button 4022 toggles the main screen display. In a first configuration, shown in FIG. 37, miles per hour is shown larger and located on top of the RPM display. Fuel is displayed on the left and system voltage on the right. Toggling the main screen by pressing button 4022 changes to the FIG. 38 display configuration with RPMs larger and on top and MPH on the bottom. Fuel is displayed on the left while engine temperature is displayed on the right. Toggling the main screen can also change the display to the go fast screen shown in FIG. 39.

Figure 40:
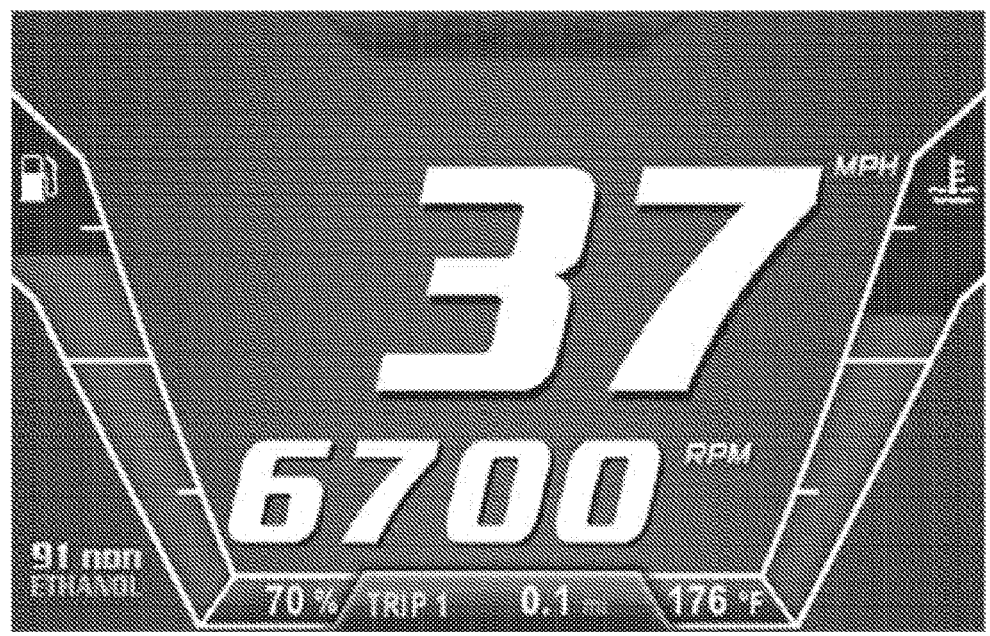
Figure 41:
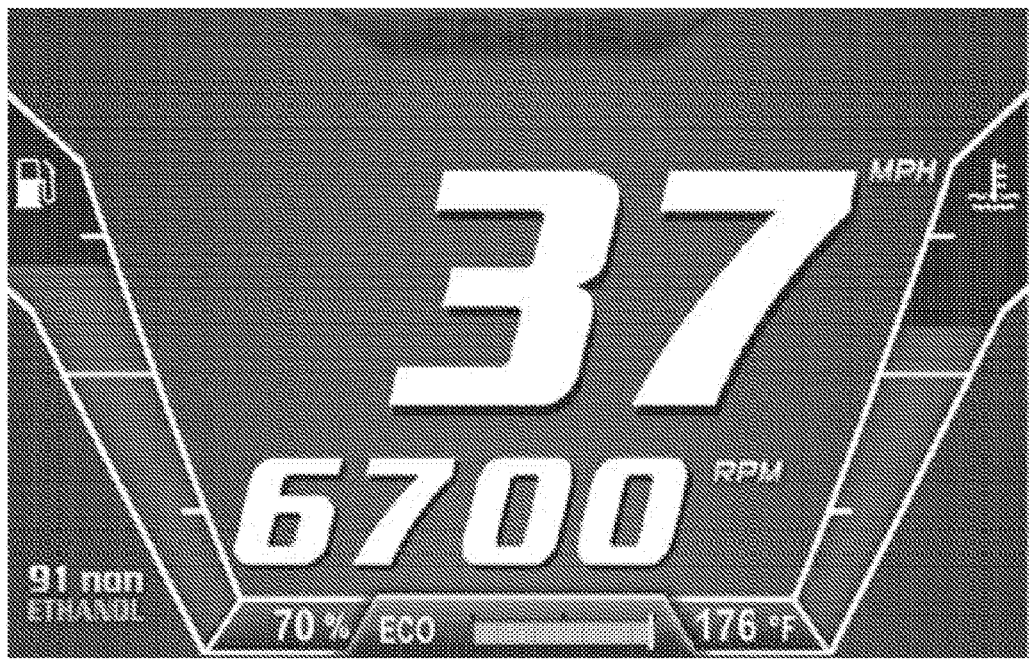
Figure 42:

The next button 4024 on the main menu of FIG. 37 toggles between an odometer reading, trip 1, trip 2, fuel economy and range. The trip odometer is shown in FIG. 40. Fuel economy is shown in FIG. 41 with a graphic indicator. Fuel range is shown in FIG. 42.

The center button 4026 on main menu shown in FIG. 37 causes the additional menu items to be displayed as shown in FIG. 36A. The next button 4028 to the right of center toggles between displaying engine coolant temperature and system voltage. The button 4030 on the far right enters the Bluetooth menu as discussed below with a reference to FIG. 51-58.

Figure 36B:
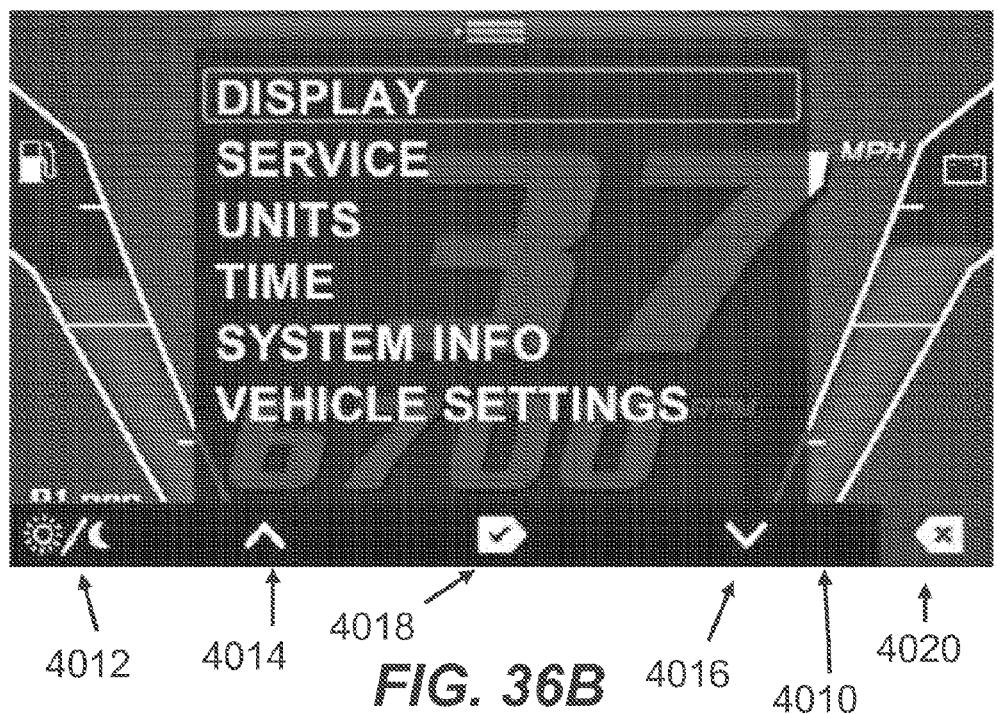

A system setting menu is illustrated in FIG. 36B. The far left button 4012 of the footer controls the brightness setting and the far right button 4020 returns to the previous menu. The center button 4018 selects a menu item while the up and down arrow buttons 4014, 4016 move a cursor to select menu options. The system settings include display, service, units, time, system information and vehicle settings.

Figure 44:
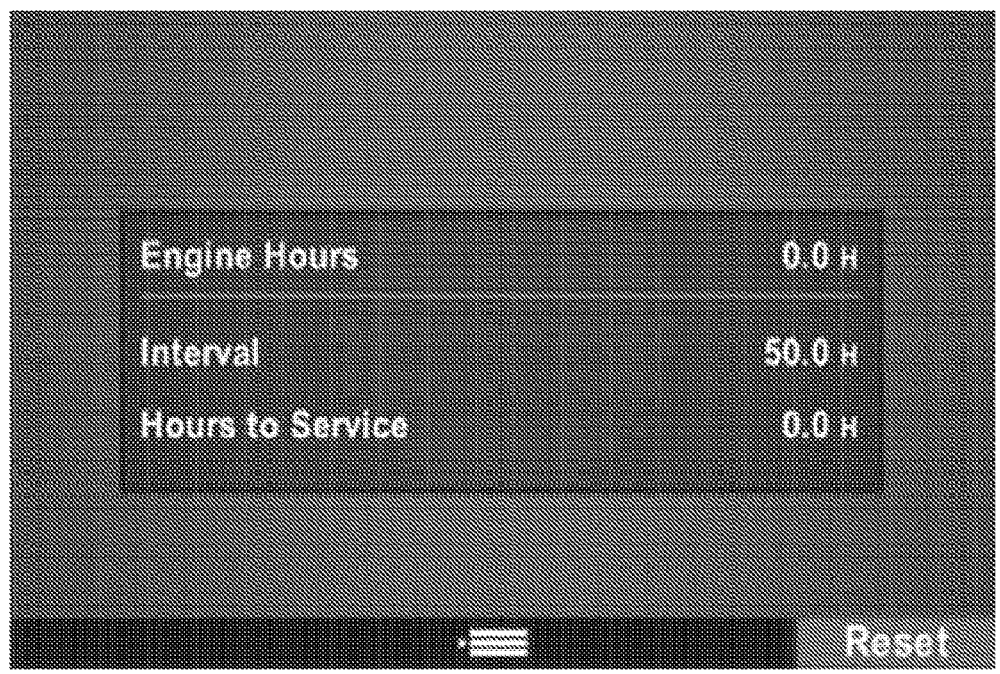

The display settings are used to set day and night brightness levels or change language used on the display. The service screen is used to view engine hours and reset service intervals as shown in FIG. 44. The units setting changes speedometer and temperature units and changes the clock type between 12 hour and 24 hour time. The time settings select either a real time clock or a GPS clock, set the time, time zone or daylight savings time. The system info screen shows engineering information and basic vehicle information.

Figure 60:
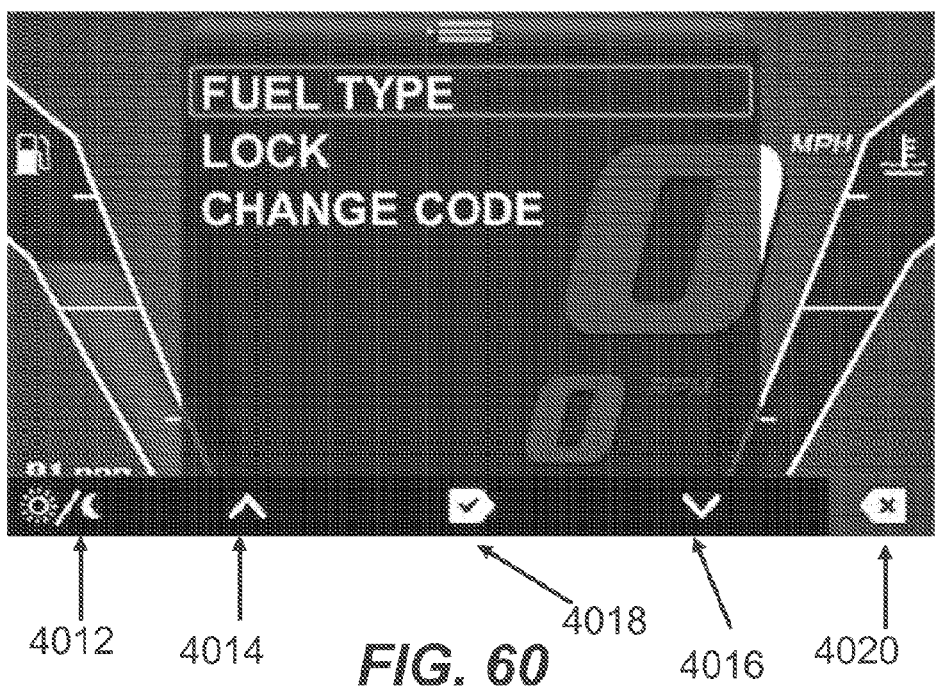
FIG. 60 is a menu for selecting fuel type, locking the gauge, and changing a security code of the gauge.

The vehicle settings menu is shown in more detail in FIG. 60. Again, the far left icon or button 4012 controls brightness setting while the far right button 4020 returns to the main menu. The center selection button 4018 and up and down arrow buttons 4014, 4016 navigate through the menu. The vehicle settings menu includes a fuel type, a vehicle lock, and a change code. The fuel type permits the user to select the type of fuel being used. The lock button allows the user to enter a code to lock the ECU of the vehicle. A dealer may lock or unlock this feature. Change lock code is also available if unlocked by the dealer.

Figure 43:
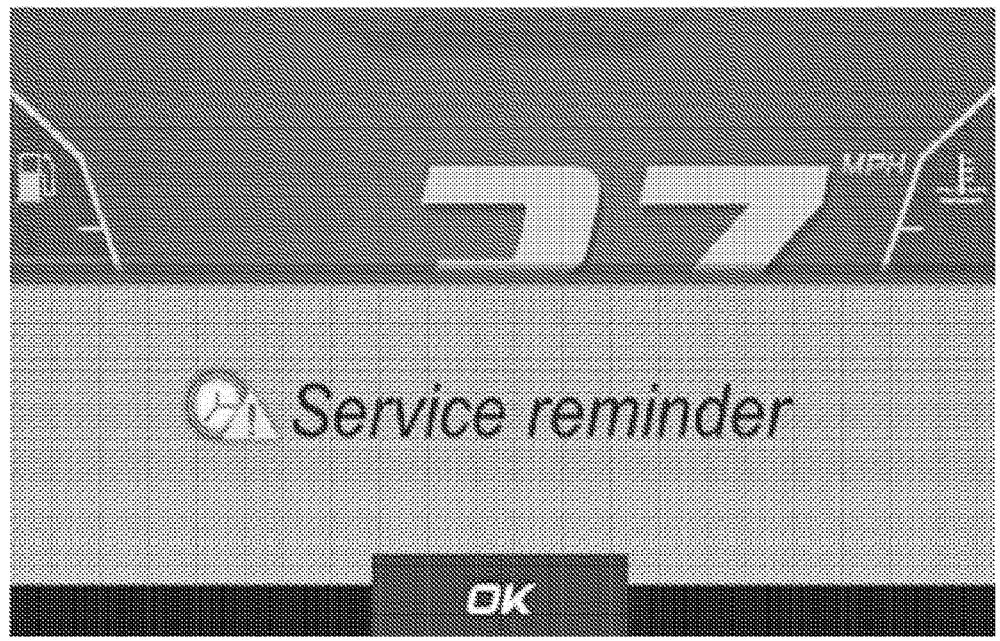
FIGS. 43-45 illustrate display screens related to service reminders for the vehicle.
Figure 45:
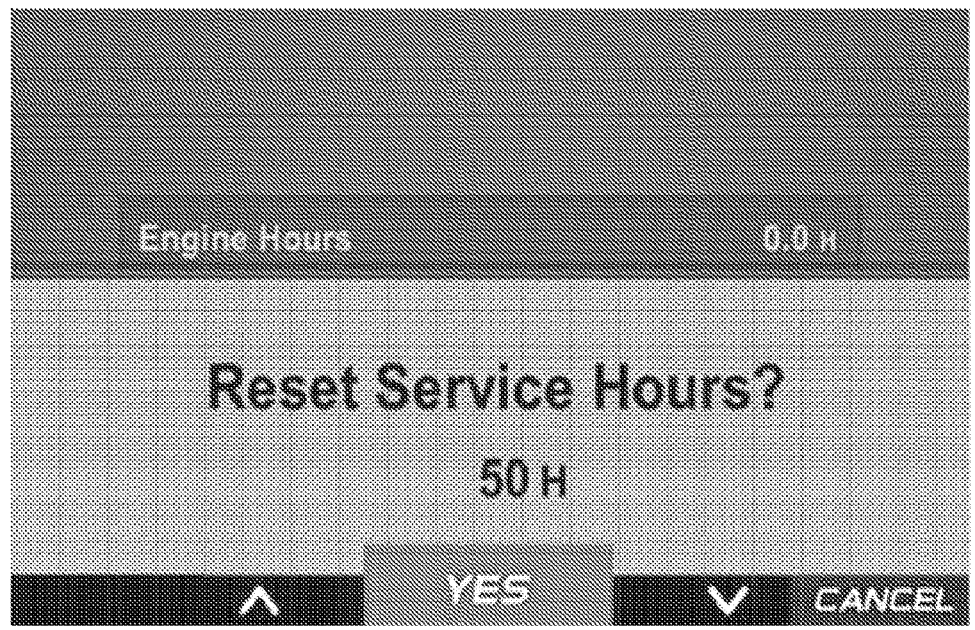

FIG. 43 shows an exemplary service reminder indicator displayed on the display of gauge 414. The operator can press OK to remove the reminder. FIG. 44 indicates the number of engine hours operated, the interval for service, and the remaining hours to service. FIG. 45 allows the operator to reset service hours after service has been performed.

Figure 46:
FIGS. 46-49 illustrate display screens of the gauge with fault detection indicators.
Figure 47:
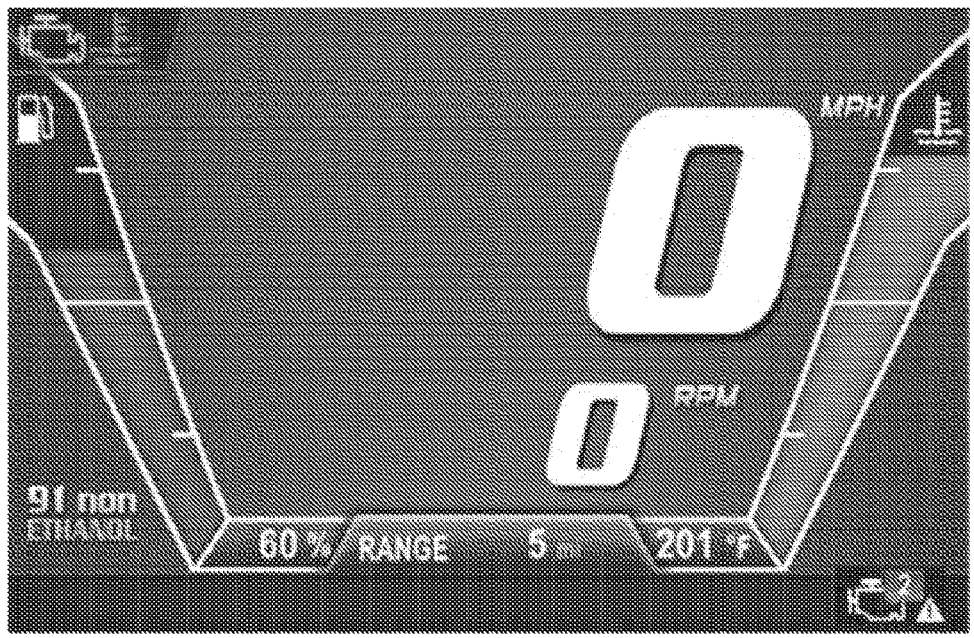
Figure 48:
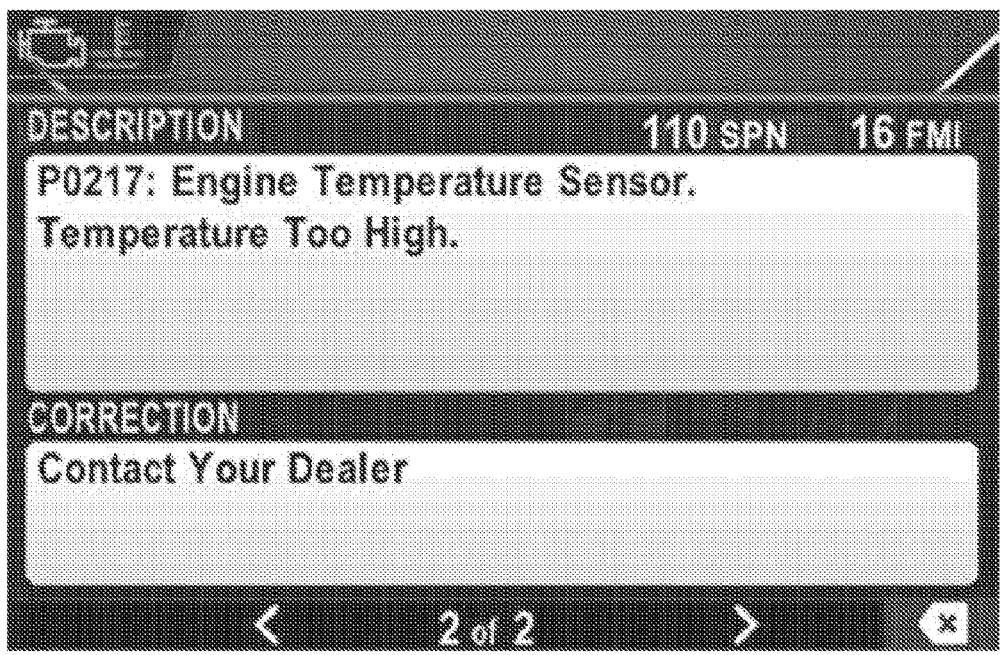

FIG. 46 is an illustrated embodiment of an advanced user notification and description such as an indication that detonation has been detected. Other notifications are provided such as when engine power is reduced in a "limp home" mode after certain severe faults are detected. FIG. 47 illustrates an icon in the lower right corner indicating detection of an engine fault. When selected, the display screen provides an error or fault code and a written description of the problem such as the temperature being too high, for example, as shown in FIG. 48. The display also displays a correction for the problem which is illustratively to contact a dealer. In another embodiment, a description of a possible correction for the fault is provided to the operator so that the fault may be corrected in the field without contacting the dealer. Providing the description of the fault instead of just the fault code permits the operator to diagnose problems and take corrective action.

Figure 49:
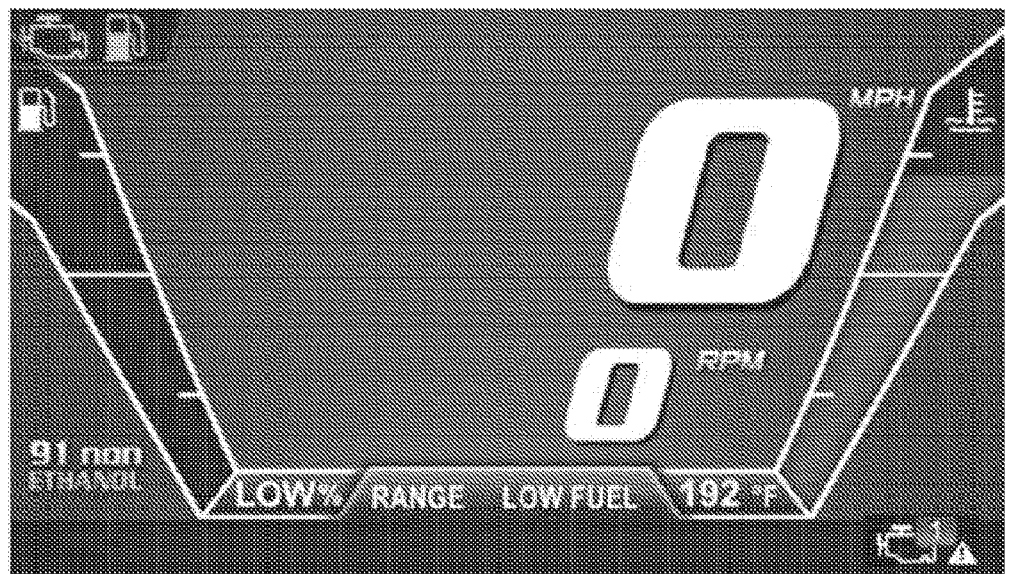
Figure 50:
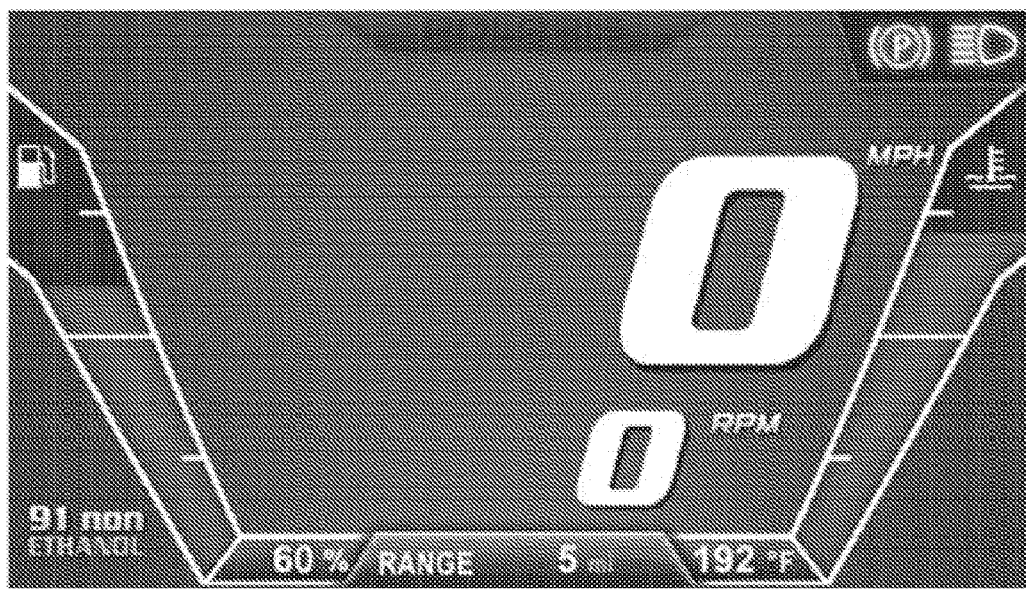
FIG. 50 illustrates dynamic indication bars displayed on the display screen of a gauge.

In another embodiment, an image is shown on the display screen showing where on the vehicle the fault or problem has occurred. For example, the faulty sensor location may be displayed. In another embodiment, an electronic copy of the owner's manual or service manual for the vehicle is stored in memory so that when a particular fault code is generated, specific instructions for correcting the fault are displayed on the display. Drawings or illustrations are also displayed in other embodiments. In other embodiments, video tutorials may also be provided on the display screen showing actual repair of the problem. FIGS. 49 and 50 illustrate additional dynamic indications bars for low fuel, engine problems, parking brake, high beams and the like.

In another embodiment of the present invention, the vehicle records the times at which error or fault codes occur during operation of the vehicle. The stored vehicle operational parameters or attributes such as speed, engine RPM, temperature, fuel consumption, or any of the other vehicle parameters described herein are stored so that these vehicle characteristics are determined at the time that the error occurred. In addition, weather information, geography, or other desired stored data may be linked to the time that the error code occurred. In other words, the technician can determine vehicle operating parameters as well as the type of terrain that the vehicle was driving traversing and the current weather conditions at the time the error occurred to assist with diagnostics. When error or fault codes occur, the gauge 414 may also prompt the user to email or call the dealer to discuss corrective actions or schedule an appointment. Availability of parts at locations near the trail can be checked using an inventory management system.

Figure 51:
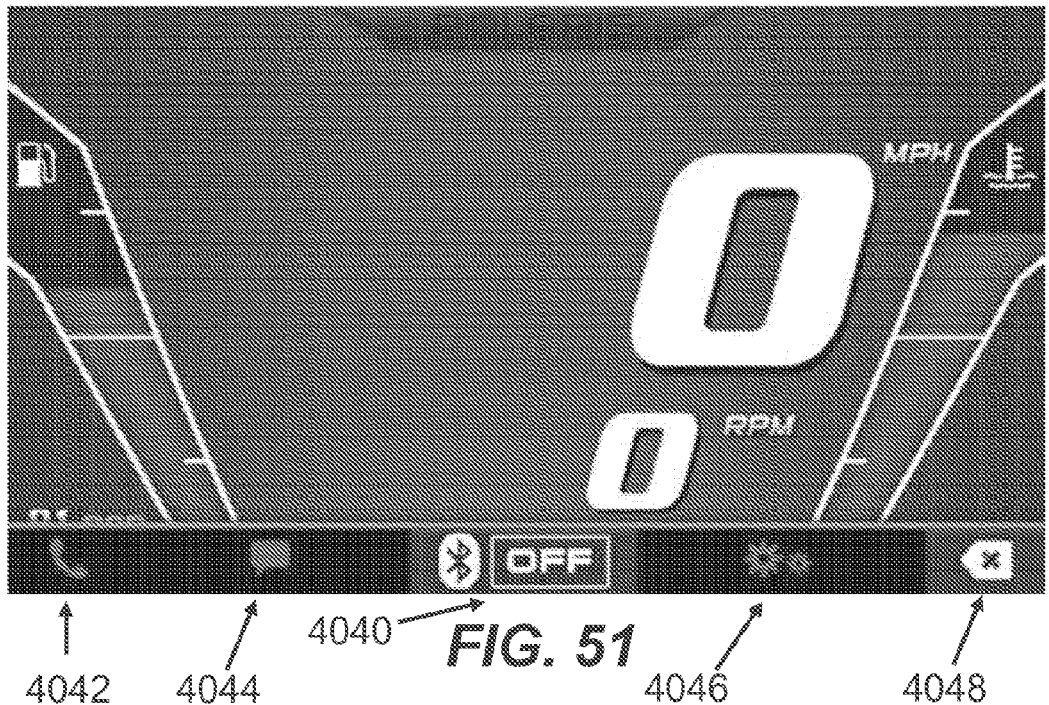
FIGS. 51-58 are exemplary display screens displayed on the gauge related to wireless connectivity and phone functions.

FIG. 51 illustrates a phone menu for the gauge 414. The middle button 4040 turns Bluetooth or other wireless connection to the phone on or off. With the wireless connection on, the far left button 4042 displays phone record information, including toggling to text messages, showing a missed call list to permit the operator to navigate to the most recently missed calls and to refresh the missed calls list. The far right button 4048 returns to the previous menu. The text records indicator button 4044 causes missed text message lists to be displayed on the gauge and allows navigation through the received text messages. The user can toggle to missed calls or return to the previous menu from the text message list.

Figure 52:
Figure 53:
Figure 54:
Figure 55:
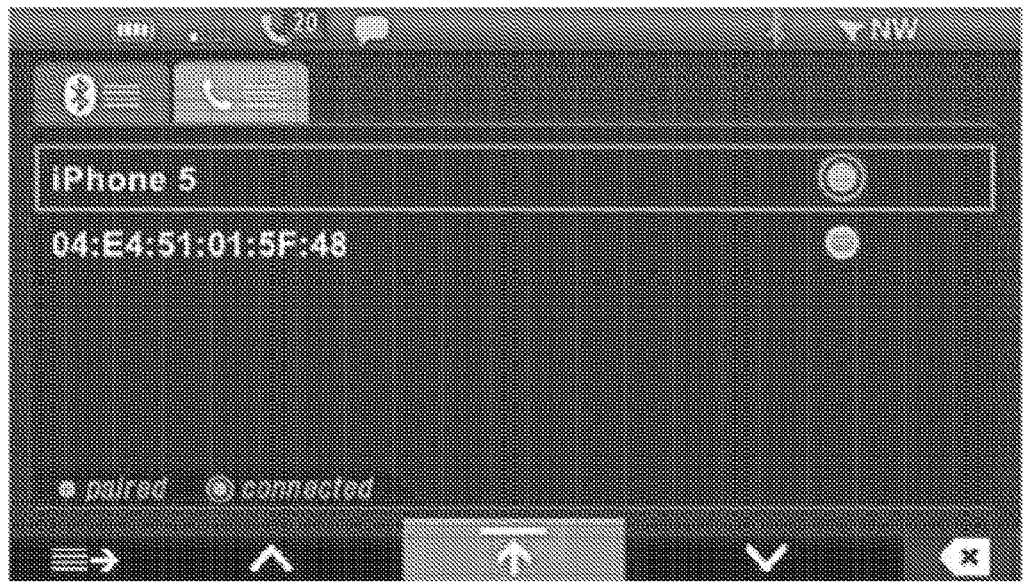
Figure 56:
Figure 57:
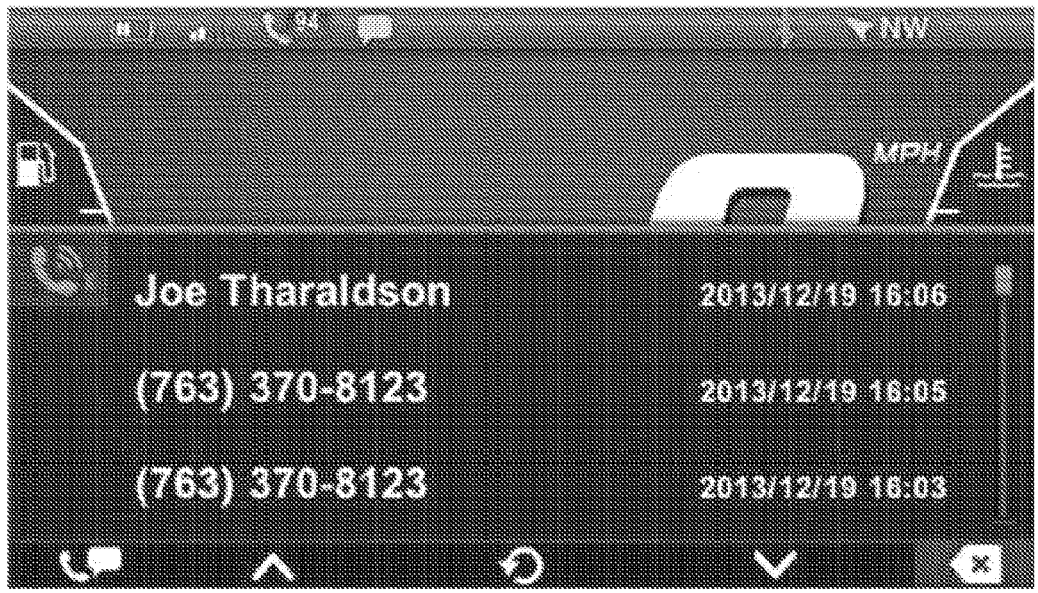
Figure 58:

Button 4046 shows an available device list. The user can navigate to an available device and connect/disconnect a device or pair/unpair a device. The user can also display a device priority list to navigate to a paired device or change the connection priority by using the middle button to move a selected device to priority number 1. Additional details of the Bluetooth wireless connectivity are shown in FIGS. 52-58. FIG. 52 shows a list of devices. FIGS. 53 and 54 illustrate a pairing request and pairing complete screen. FIGS. 55 and 56 are additional Bluetooth wireless connectivity screens. FIG. 57 displays missed calls while FIG. 58 shows calling a particular number.

In one embodiment, the user may read text messages on the display screen of the gauge, but only when the vehicle is not moving. The system is linked to the GPS 2044 or an engine speed or RPM detector to determine whether the vehicle is moving and lock out viewing and sending text messages and/or phone calls. Vehicle speed, RPM, or GPS signals can be used to reconnect the wireless signal if the signal has been lost. Again, the system will wait until the vehicle is not in motion to make the connection. Any desired features of the gauge can be locked out when the vehicle is in motion. Displaying text messages, or use of the maps discussed below, or any feature that it is not desirable to operate while the vehicle is in motion may be locked out. A security code may lock out the phone information while driving, turn off the maps, or other features depending upon the particular operator. A rental fleet, for instance, may lock out certain features. Young drivers may also be prohibited from using certain features.

Figure 61:
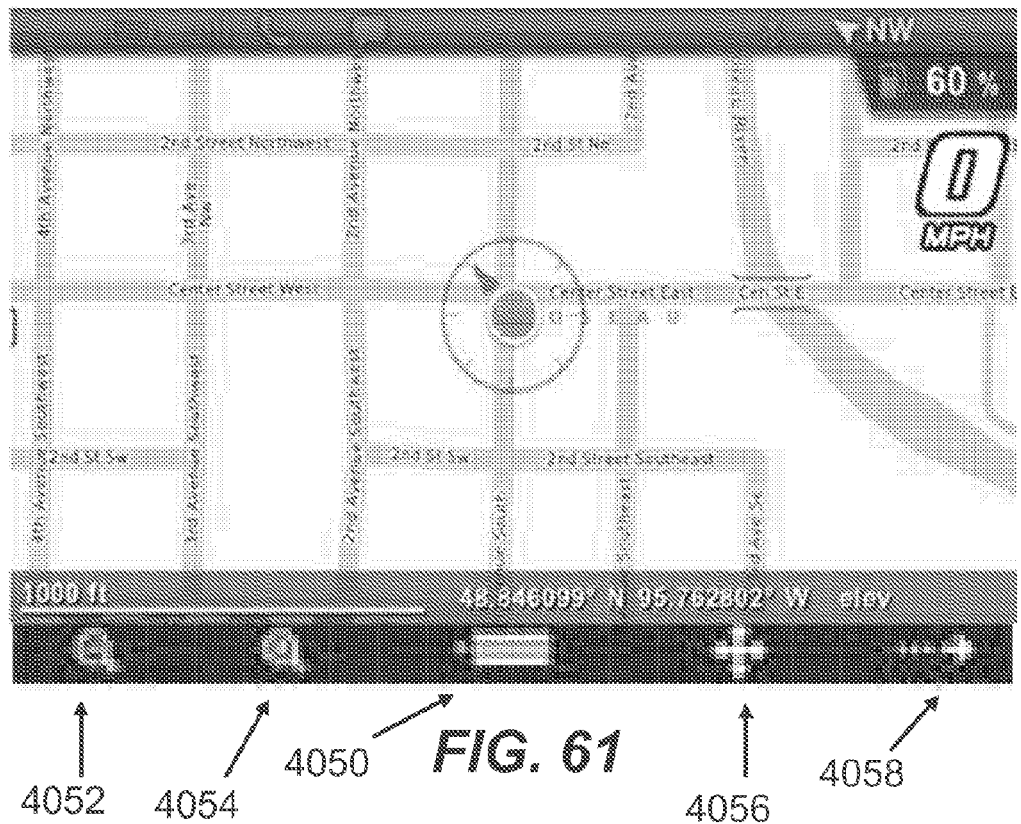
FIGS. 61-69 illustrate exemplary display screens displayed on the gauge related to mapping features and functions.
Figure 62:
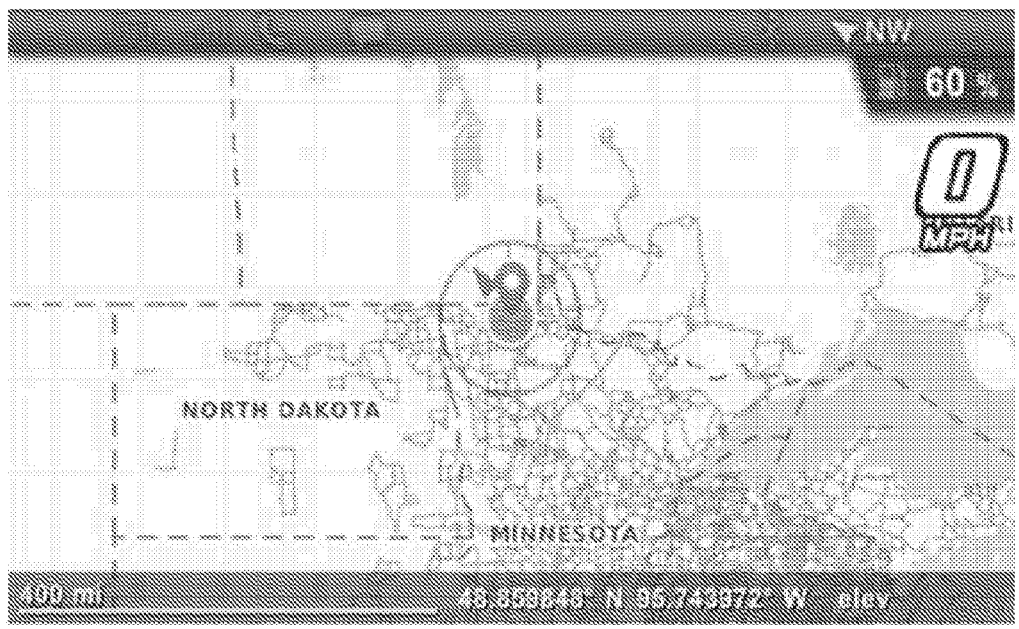
Figure 63:
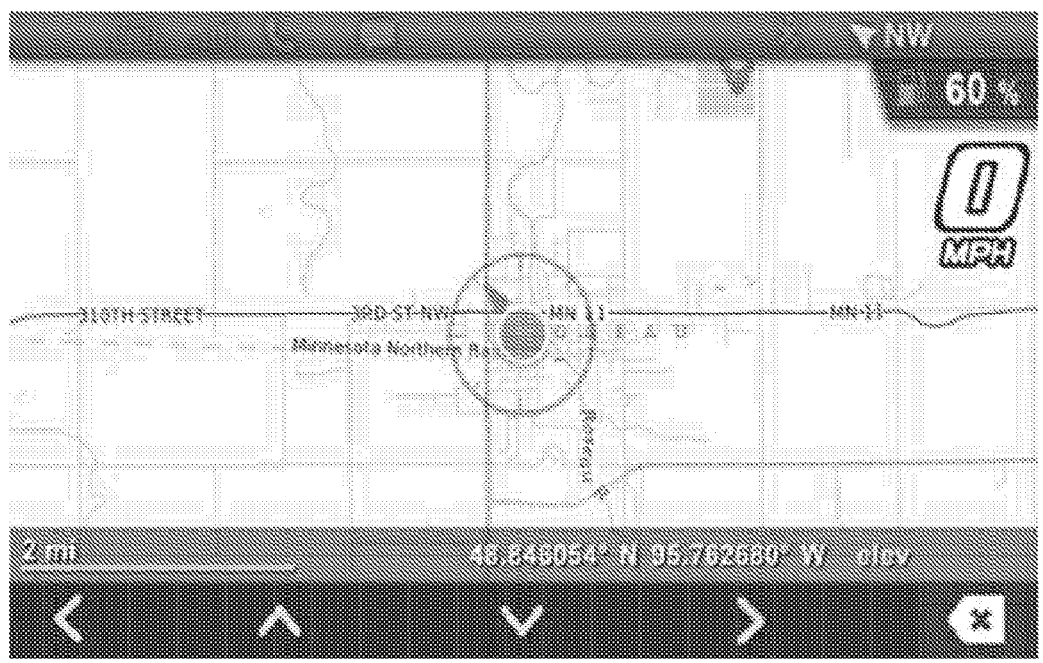
Figure 64:
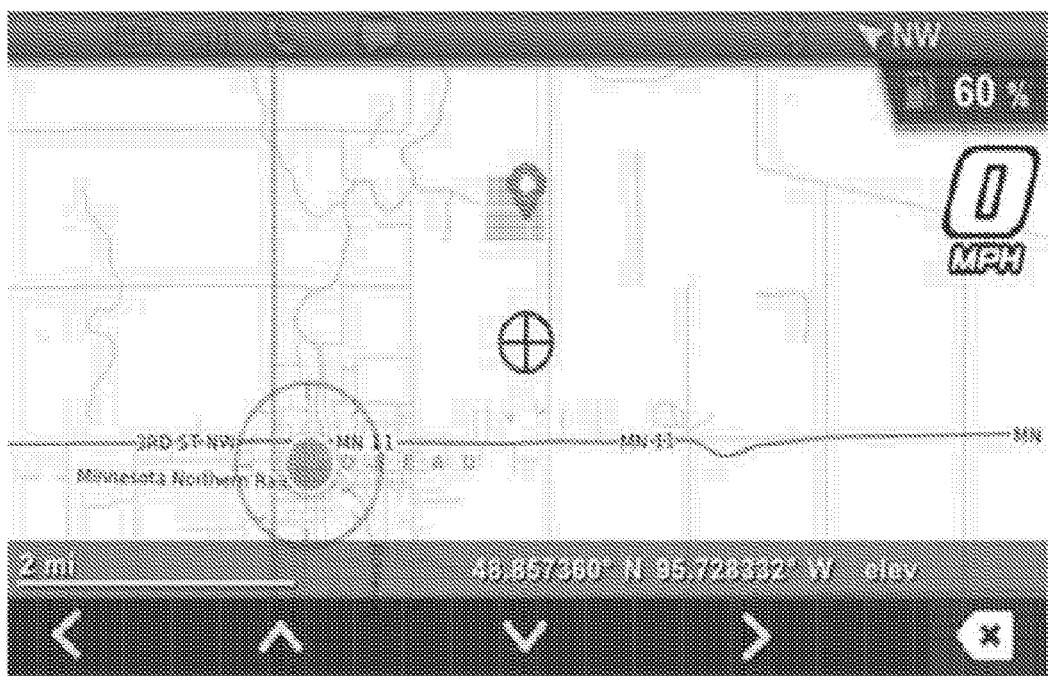

A maps menu is illustrated in FIG. 61. The center button 4050 opens the main menu while the left side buttons 4052, 4054 permit zooming out and in on the map as illustrated in FIGS. 61 and 62. The vehicle direction, destination and trail map are displayed on the map regardless of the level of zooming. Therefore, the desired trail remains visible on the display as the zooming occurs. An arrow indicator on the compass shown on the display of FIGS. 61 and 62 shows a direction of travel of the vehicle. Button 4056 opens a pan menu which allows the user to pan west, north, south and east. FIGS. 63 and 64 illustrate panning on the maps. The far right button 4058 opens further map menu options, including centering the display screen at the current location of the vehicle, establishing a waypoint at a current location or a panned location of the vehicle (the waypoint is also added to the waypoint manager), saving the current track to a USB memory device (adding the current track to track manager), and deleting the track that is currently being recorded.

Figure 59:
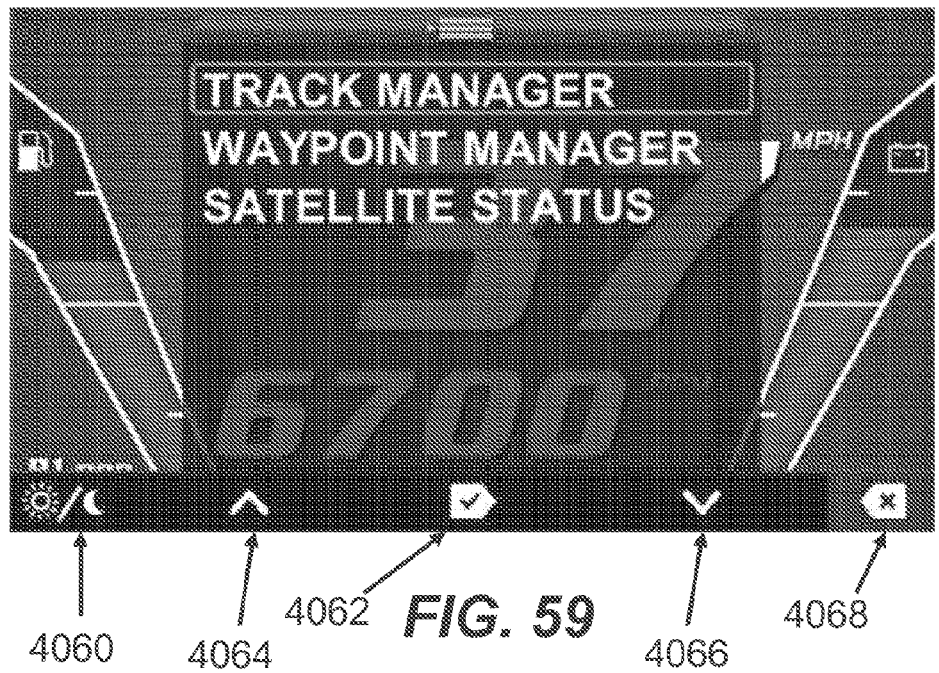
FIG. 59 is a menu for selecting tracks or off-road trails, managing waypoints, and checking the satellite status displayed on the display screen of a gauge.

FIG. 59 is a GPS settings menu. The far left button 4060 controls brightness selection, while the center button 4062 and the up and down arrow buttons 4064, 4066 navigate through the menu. The far right button 4068 returns to the previous menu. The GPS settings menu includes a track manager, waypoint manager, and satellite settings menu items. The track manager allows the user to select a stored track or trail, or edit a track name, show or hide the track on the map, delete the track, import a track from the USB memory, or export a track to USB memory.

The waypoint manager allows the user to select a desired waypoint or open a waypoint editor. The waypoint editor allows the user to change a waypoint name, change a waypoint color on the map, turn the "go to" function on and off, view a waypoint on the map, delete a waypoint, import a waypoint from the USB memory or export a waypoint to the USB memory.

The satellite status menu selection brings up a display screen of FIG. 70 showing satellite signals. The satellite status illustratively includes the number of satellites, latitude and longitude, and satellite error feedback.

Figure 65:
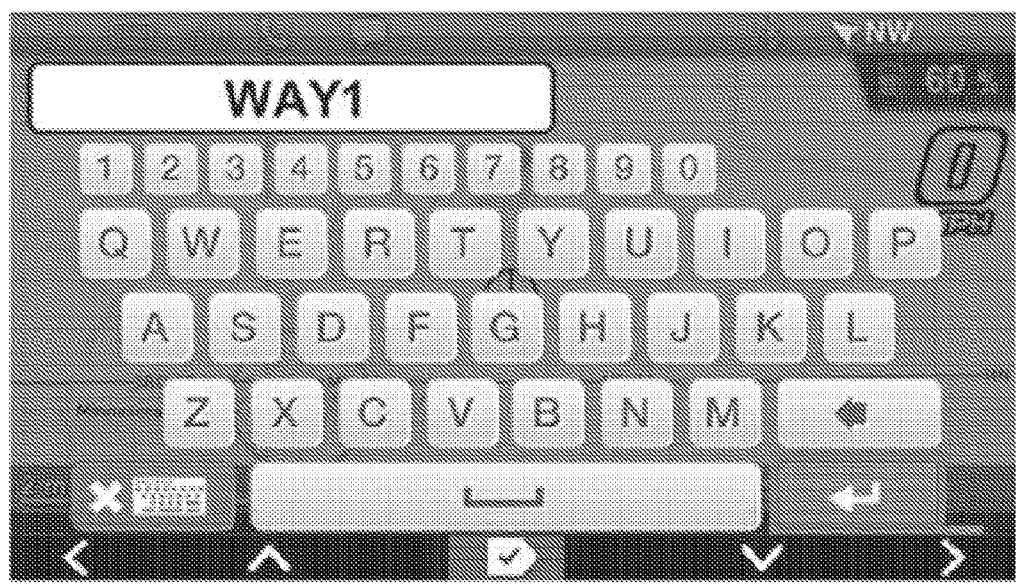
Figure 66:
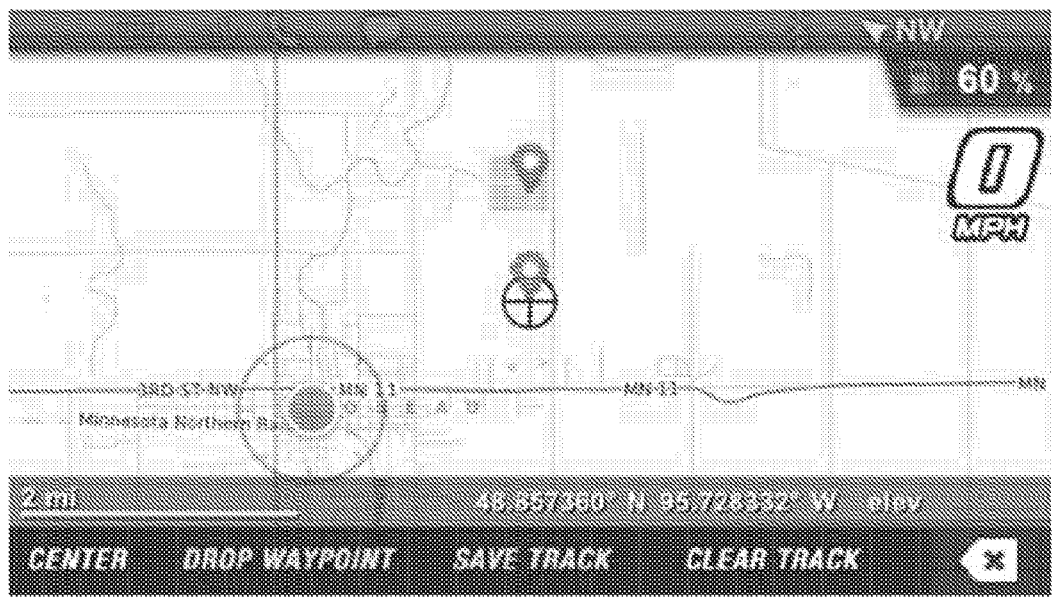
Figure 67:
Figure 68:
Figure 72:
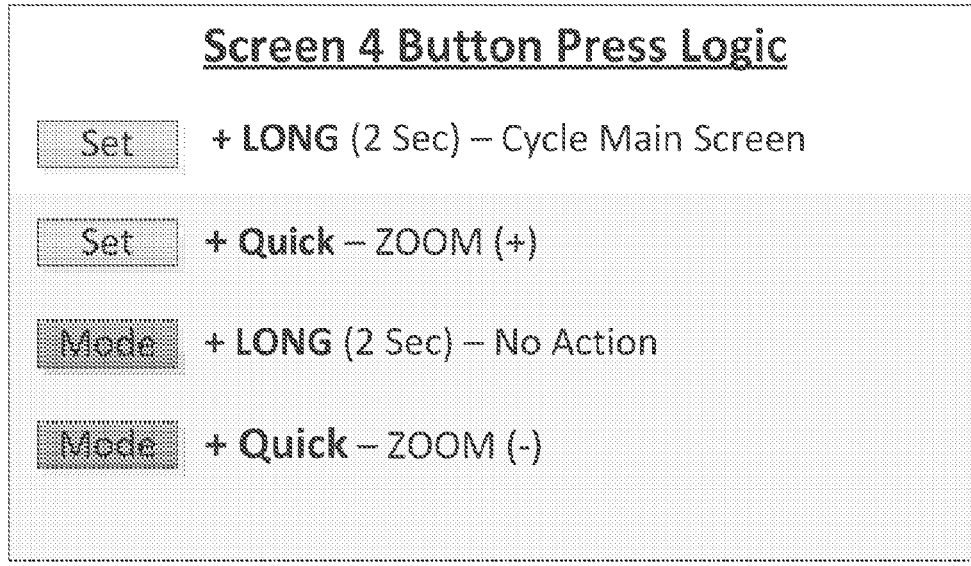
FIGS. 72 and 73 are logic diagrams related to the toggle switch controller of FIGS. 71A and 71B showing logic for navigating through the various menus.
Figure 73:
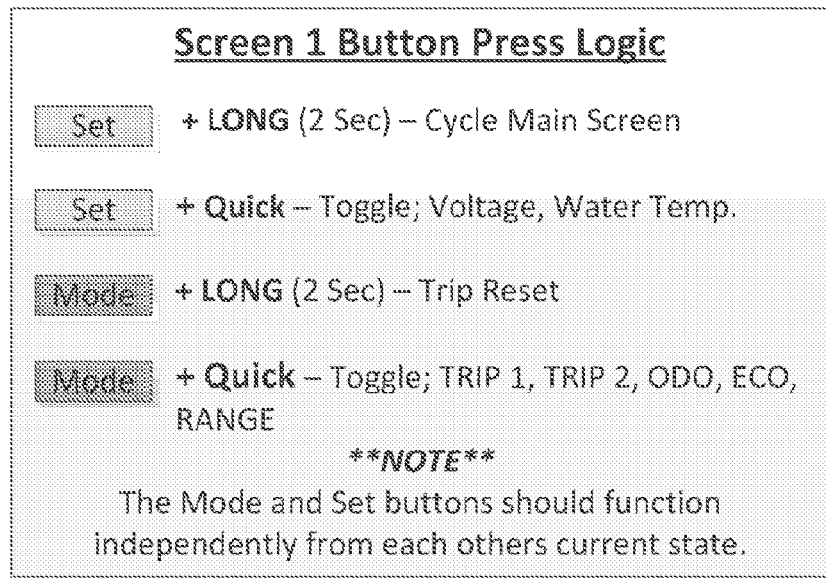

FIGS. 65-67 illustrate addition of a waypoint which is displayed on the map. The cursor is placed at a desired location as shown in FIG. 66. The waypoint is named in FIG. 65 and then the entered waypoint is shown on the map in FIG. 66. Details of the waypoint are shown in FIG. 67. The "go to" function is off in FIG. 67. With the "go to" function selected, the word "off" in FIG. 67 changes to the word "on". A first arrow 4070 of the compass of FIG. 68 shows a current vehicle location and an actual vehicle direction. A second arrow 4072 displayed in the compass shows a desired or necessary direction to reach the next waypoint 4074. This arrow helps guide the operator of the vehicle to the waypoint 4074.

Figure 69:
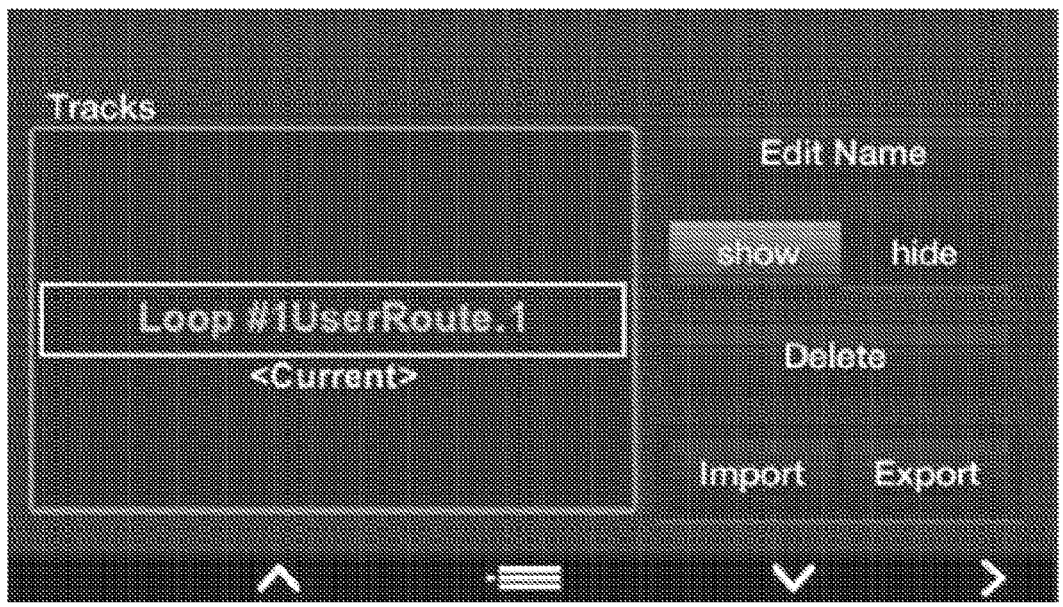

FIG. 69 shows an embodiment for saving or importing tracks. In FIG. 69, the current track is shown with the ability to show or hide the track on the display screen. The track can also be deleted or exported. A new track can also be imported. The map can be displayed on the display screen in different colors. Again, the track or trail map is visible regardless of zooming in and out on the map and remains highlighted on the display as zooming in and out occurs. For waypoints, all waypoints, only specific waypoints, or no waypoints can be selectively displayed. A distance can be displayed to the next waypoint. An estimated travel time to the next waypoint or final destination can also be displayed.

FIGS. 71A and 71B illustrate a toggle switch control 4090 preferably located on a handle bar or other steering control of the vehicle. The toggle switch 4090 is rocker switch having a "mode" selection portion 4092 and a "set" selection portion 4094 depending upon which way the button is pressed. If the set portion 4094 is pressed for a long time, greater than 2 seconds for example, a main screen is cycled. If the set portion 4094 is pressed quickly, a screen specific option 1 is opened. If the mode portion 4092 is pressed for a long time, greater than 2 seconds, a screen specific option 3 is opened. If the mode portion 4092 is quickly pressed, a screen specific option 2 is selected.

The switch control logic for maps is shown in FIG. 32. The exemplary switch control logic for other display screens is shown in FIG. 74. It is understood that other logic may be used to scroll through the various menu screens.

Fleet Management

The system and method of the present disclosure may be used to facilitate fleet management of a plurality of vehicles. GPS tracking enables the vehicles to be tracked and the routes the vehicles take during operation to be stored. Trips may be planned, and vehicles scheduled. Vehicles may be checked in or checked out such as when vehicles are rented at a resort. Campus or urban areas may also include vehicle check out and return. The fleet manager can track maintenance requirements, state of charge of vehicle batteries, location of the vehicles, etc. An estimate of vehicle drag based on power and speed may be provided. Self-diagnostic cycles monitor for proper wheel alignment, bearings, low tire pressure, etc. Indicators are provided to operators and fleet managers when service is necessary. Fleet managers can track the position and locate each vehicle in the fleet. A scheduling system is used to prioritize and assign use of the vehicle. A display of the state of charge for electric vehicles or fuel level of vehicles in the fleet may also be provided and sent to a remote computer accessible by the fleet to manager. An operator's phone or other device may be used as a key or security device for the vehicle. Alternatively, a key card or security badge may be used to activate the vehicle.

Campus, Urban, Trails, Recreational Shared Transportation

In another illustrated embodiment of the present disclosure, a system and method is provided for shared transportation particularly at a college campus, in a city, near trails or other recreational locations. Illustratively, recreational vehicles such as motorcycles, or off-road vehicles such as all-terrain vehicles (ATVs), UTVs and snowmobiles may be shared. In addition, electric vehicles may be shared in accordance with the disclosed system and method.

An illustrated embodiment of the method includes the following features:

1. Reservation, Check In, Check Out system.
   a) Vehicles are checked in and out and left at parking and/or charging stations. Vehicle usage is scheduled as a resource on a wireless enabled application. The application provides data for vehicle locations, availability, scheduling conflicts, charge level, charge status, destinations, charge stations, range to destinations, as well as enabling vehicle reservation and vehicle check-out.
   b) Applications may also be used after vehicle checkout for additional trip planning, and range monitoring.
   c) Security enabled with mobile application or badge.
   d) Requires the vehicle to be properly parked and if applicable, properly connected to charging system to be checked in as a returned vehicle.
   e) Reserves parking and charge station at the destination.
   f) Ensures adequate range for the trip.
   g) Security system checks credentials and tracks the vehicle.
2. Fleet Management
   a) Wireless enabled fleet management. Machines log in at the end of each day, transmit condition and service requirements and confirm proper charge connection.
   b) Enables remote monitoring of fleet usage, maintenance, state of charge and security.
   c) Maintenance is logged and tracked. Alerts sent when vehicle maintenance is required.
   d) Profile vehicle drag over known drive cycles to determine when maintenance is needed like tire pressure, alignment, hung brakes.
   e) Diagnostic profile of vehicle efficiency and vehicle trending to be uploaded to a supervisory system.
   f) Wireless or cellular upload of use profiles, maintenance prompts, and efficiency profiles. Supervisory system notes state of charge, battery aging, efficiency drops and specific diagnostic codes like low tire pressure, motor and/or controller overheat or overload.
3. Trip Planning
   a) State of charge, energy information comes from VCM. Match up with route plan to ensure adequate range to complete the trip.
   b) Trip planning in a campus, central urban, trail or recreational environment. More map detail, charge station locations, vehicle range monitoring and notification of critical charge levels, etc.
   c) Range monitoring allows user to enable economy mode to help ensure that the user reaches a destination point or charge station.

In alternative embodiments, features or applications available on a smart phone may be integrated to the vehicle or gauge through the wireless connection and display. For example, RiderX applications available from Polaris Industries may be implemented on the gauge using the RiderX applications.

As discussed in U.S. Application Ser. No. 61/769,378, incorporated herein by reference, users can input trail information or other data as they traverse a particular trail. Hazards, trail conditions, or other information is transmitted via a cell phone to a remote computer location. Updated information is sent to the vehicle from a central server. Information regarding which trails have been groomed as well as the current location of grooming equipment is provided on the display screen of the gauge in an illustrated embodiment of the present disclosure. Therefore, the operator can select trails based on recent grooming or make sure to watch out for grooming equipment on the trail.

The gauge display is capable of switching between vehicle information and maps on the same display with the push of a button. This improves rider experience, especially for off-road vehicles. The user may quickly toggle between important vehicle information and map screens on the same display with a quick easy-to-use interface.

In another embodiment, a camera 2018 is coupled to the gauge through the video connector 2016 shown in FIG. 1. Display of the camera image is provided on the display of the vehicle gauge to permit the operator to adjust a position of the camera to make sure it is set at the best position for capturing images during the ride.

A server or website may be accessed to provide access to different trails available for drivers of different skill levels. The website permits users to share their experiences on the trail and rate the trail.

In another embodiment, the system stores snow trails accessible by snowmobiles and non-snow trails. The operator can select a user input to show only nearby snow trails, non-snow trails, or both types of trails on the display of the gauge for selection of a desired trail by an operator.

In another embodiment of the present disclosure, the wireless connection is used to perform accessory functions such as opening garage doors, opening gates, turning on lights, remote vehicle starting, or the like.

The system and method of the present disclosure expands the powersport experience by allowing vehicle users to plan a ride, experience a ride and then re-live the ride. Before the ride, users plan the route and view simulations based on photos, videos or other route information discussed above. Illustrative simulation modes include:

Trail riding
Exploring globally
Race the pros
Simulated sound and feel a particular vehicle
Gaming, racing with the pros in Snow cross, Motocross, etc.:
Links to allow on-line shopping. The user can purchase equipment and accessories for the user's vehicle on-line.

The system and method of the present disclosure builds a user's excitement and anticipation before a ride. The user plans the trip with map software including snowmobile and ATV trail information. The trail database includes pictures of points of interest, linked to the map. The user also plans entertainment, music, and information, weather radio etc, and trail boss link to companions. The user simulates all or part of the ride on a PC, or the gauge display, which provides a graphic simulation of the ride, scenery, trail conditions and obstacles.

The user uses a stored ride plan including route information, entertainment, and information flow by loading the stored plan into vehicle systems such as through USB connector 2012. A digital camera or video camera 2018 allows the user to record highlights of the ride linked to the GPS position. During the ride, the system generates a trip log recording actual route, digital photos or videos. Entertainment, and communications are indexed in time and recorded. Sensor readings are also indexed in time to show performance of the vehicle on the ride.

After the ride, the user relives the experience and shares it with others. The user brings an electronic log back to the PC based simulation so that the experience can be relived and shared with others. Indexed to time the simulation include:
GPS position
Trail conditions
Weather
Communication as it happens
The music or entertainment that was playing
Photos and videos taken at points of interest Cellular phone coverage is often not available at locations where recreational vehicles travel. A navigation and traffic alert system is provided for recreational vehicle applications, such as off road vehicles, ATVs, UTVs, and snowmobiles. The system identifies location, direction, and speed of other similar vehicles on roads, trails and in open terrain. This allows for buddy tracking, fleet management, and traffic alerts to similarly equipped vehicles remotely or in organized ride park environments. The illustrated system manages available communications networks based on their availability to provide the best information available:
a. Vehicle system links to smart phones, GPS, and other devices through a Bluetooth or other similar communication link to share information and access local and global information networks.
b. The system continuously assesses available networks and utilizes the best network available to transfer data for vehicle and remote services use. Examples of links could include cellular service, satellite communications, Wifi, GMRS radio, and any other available data service.
c. When no other source of vehicle-to-vehicle communication is available, the system of the present disclosure establishes a local radio transceiver based network using frequencies such as GMRS band to share vehicle location, direction, and speed with similarly equipped vehicles. This allows for group ride buddy tracking, ride park management, and alerts each vehicle to the approach of other vehicles and safety hazards. Alternatively, a fixed base radio transceiver could be used in a ride park like setting to share data with vehicle transceivers to facilitate 2 way communications. Additional information such as radar weather or general trail conditions and traffic is relayed to all vehicles on the network and displayed and/or used as appropriate.
d. When no outside network data is available, including potentially GPS or other locator data, the system predicts, or dead reckons locations of the vehicle, obstacles, and other traffic.
e. An illustrated embodiment of the system incorporates a feature similar to 406 MHz distress transmitters to provide a call for help when other communications aren't available.

In an additional embodiment of the present invention, the system sets a maximum speed for the vehicle based upon driver experience or a location of the vehicle on a planned route. In addition, the maximum speed may be set depending upon an operation being performed by the vehicle such as mowing or fertilizing. A fleet owner can set a maximum speed for users of a fleet of vehicles.

Different components of the vehicle, such as the adjustable shocks 3018, the ECVT 3024, the EPS 3025 or other system components such as an electronic transmission control may be adjusted on the fly during a trip. For example, street mode, a trail mode, an off-trail mode, a rock crawling mode, or other modes may be set for particular driving conditions. These adjustments are automatically made as the vehicle passes over a route or are selected by user using mobile device 110 or gauge 414. In addition, a fuel saving mode may be set for road or trail use, while a maximum performance mode may be set for off-trail sections of the route. A clutching chart is provided for snowmobiles at different elevations.

In an illustrated embodiment, detected engine faults are displayed on the display screen of gauge 414 or mobile device 110. A likely cause of the fault and possible corrective actions to be taken on the trail are also displayed on the gauge 414 or mobile device 110. The integrated mapping system displays dealer locations and additional information such as phone numbers to provide service, help or parts along the route. The mapping system provides a distance to the nearest dealer from the location of the vehicle. In one embodiment, a dealer inventory is checked to determine whether a particular part is available at a particular dealer.

As discussed above, the system provides live updates through the mobile device 110 to the gauge 414 for weather or road conditions and provides overlays on the route map. For example, snow conditions, weather alerts, traffic alerts, or avalanche advisories are provided.

The gauge 414 is integrated into the vehicle in certain embodiments. In other embodiments, the gauge 414 is modular and can be removed from one vehicle, such as a utility vehicle, all terrain vehicle, or snowmobile and placed into another vehicle. Security such as using vehicle identification numbers is provided to reduce theft of the modular gauge 414.

In another embodiment, the mobile device 110 includes a control option for remotely starting the vehicle or opening a garage door through communication with the gauge 414. A GPS clock or Smartphone clock is illustratively used to control contrast on a display of gauge 414.

The data displayed on the gauge and recorded on the vehicle is stored internally so that connection to a phone is not required for operation. Updates occur the next time a wireless connection in made to the network of central servers.

In another illustrated embodiment of the present disclosure, a user or technician sets a vehicle to enter a diagnostic mode. When an accelerator is pressed the vehicle follows a diagnostic profile. The diagnostic profile comprises driving the vehicle for at least one of preconfigured controlled speeds, accelerations, and/or torques, or a profile consisting of a combination of controlled speeds, accelerations, or torques. The profile may be run in one or more iterations and in more than one direction. The directions may include forward and reverse or multiple forward orientations traversing a terrain. Running the profile in multiple iterations may be used to offset the grade of the terrain or may be used in deriving additional vehicle diagnostics.

A controller with a memory records performance data from vehicle sensors as discussed herein. The vehicle sensors may measure vehicle metrics such as force, power, torque, motor current, battery current, battery voltage, motor speed, vehicle speed, accelerometer readings, among others. In addition, user may enter any combination of additional features on the vehicle such as vehicle weight, estimated vehicle weight, tire type, tire pressure or other features as a result of vehicle customization.

The data logged from the sensors is used to compute various vehicle diagnostics or may be compared against a profile of known metrics. For example, data may be compared against a maximum of acceptable vehicle metrics related to a constant speed. Data values that exceed the maximum value for a specific metric may detail various aspects of vehicle performance.

In one embodiment related to a vehicle diagnostic profile, a vehicle is driven at a constant speed, vehicle data is logged, then the vehicle speed is increased by a fixed amount at a steady acceleration and another set of vehicle data is logged. The vehicle diagnostic profile may then be repeated in reverse or another forward operational direction. Sensors on the vehicle may then, for example, indicate a tire, suspension or alignment issue. In another embodiment, vehicle diagnostics may include various aspects of vehicle performance including: alignment, brake performance, suspension performance, range performance, battery performance and others.

In accordance with the mobile application, web application, vehicle interface, and overall system discussed herein, a number of additional features may be integrated for both on-vehicle and off-vehicle services as well. This can include, for example, identification of preferred service partners to specific OEMs or trail clubs, as well as integrated advertising in one or both of the web interface and the mobile interface. It is understood that, in some cases, advertising will be limited to the web interface or to certain user interface screens due to screen area limitations regarding a mobile device or gauge display, and to avoid displaying advertising to a user of a mobile device or gauge display while that user is operating a recreational vehicle. In an illustrated embodiment, revenue generated from such advertisements is provided to trail clubs and to maintenance of the system 100 overall.

Embodiments of the present disclosure are practiced in various types of electrical circuits comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, aspects of the methods described herein can be practiced within a general purpose computer or in any other circuits or systems.

Embodiments of the present disclosure are implemented as a computer process (method), a computing system, or as an article of manufacture, such as a computer program product or computer readable media. The computer program product may be a computer storage media readable by a computer system and encoding a computer program of instructions for executing a computer process. Accordingly, embodiments of the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium includes any medium that includes media capable of containing or storing the program for use by or in connection with the instruction execution system, apparatus, or device.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media. Further, the disclosed methods' stages may be modified in any manner, including by reordering stages and/or inserting or deleting stages, without departing from the overall concept of the present disclosure.

U.S. Application Ser. No. 61/769,378, filed on Feb. 26, 2013, and U.S. Application Ser. No. 61/926,013, filed on Jan. 10, 2014, are expressly incorporated by reference herein.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method of facilitating usage of an off-road vehicle, the method comprising:
providing a vehicle gauge having a display, a processor, at least one user input, and a communication link;
receiving through the communication link trail information from a remote computing device related to a selected off-road trail for traversal by the off-road vehicle;
displaying a user interface on the display of the gauge, the user interface including information associated with the trail information including a trail map for the selected off-road trail and trail conditions on the selected off-road trail;
communicating with a handheld mobile device;
transmitting information from the gauge to the handheld mobile device;
receiving by the gauge information from the handheld mobile device; and
providing a memory accessible by the processor and memory having software stored thereon, the software being configured for execution by the processor and including:
instructions for providing a user selectable menu;
instructions for receiving, by the user selectable menu, a user input to selectively display vehicle operation information on the display of the gauge including at least one of vehicle speed, RPM, fuel level, and coolant temperature;
instructions for receiving, by the user selectable menu, a user input to selectively display information from the mobile device on the display including at least one of phone call information, texting information, and cell signal strength; and
instructions for receiving, by the user selectable menu, a user input to selectively display the trail information on the display, the trail information including at least one of the trail map for the selected off-road trail and the information related to the trail conditions on the selected off-road trail.

2. The method of claim 1, wherein the displayed trail conditions include information related to weather conditions at locations on the selected off-road trail.

3. The method of claim 1, wherein the displayed trail conditions include a snow depth at locations on the selected off-road trail.

4. The method of claim 1, wherein the displayed trail information further includes points-of-interest data displayable on the display including information related to at least one of lodging, medical, shelter, rest areas, gas stations, restaurants, dealerships, repair shops and landmarks at locations near the selected trail.

5. The method of claim 1, wherein the displayed trail information further includes hazard data including at least one of reported crashes, fallen trees, closed sections, and snow grooming equipment on the selected trail.

6. The method of claim 1, further comprising transmitting data regarding operation of the off-road vehicle from the gauge to the remote computing device via the communication link.

7. The method of claim 6, wherein the data regarding operation of the off-road vehicle includes a plurality of data items selected from a group of data items consisting of: engine revolutions per minute; vehicle speed; coolant temperature; battery voltage; fuel level; throttle position; pedal position; fuel consumption rate; vehicle range; engine load; barometric pressure; air intake temperature; exhaust air temperature; gear indication; spark timing; operational hours; drive status; and trouble codes.

8. The method of claim 1, wherein the gauge has a radio communication link, the method further comprising receiving radio signals through the radio communication link from a similarly equipped vehicle, the radio signals providing information related to a location, a direction of travel, and a speed of the similarly equipped vehicle, and displaying information related to the location of the similarly equipped vehicle on the trail map on the display of the gauge.

9. The method of claim 1, further comprising transmitting a message to a dealer related to a detected vehicle fault condition on the off-road vehicle.

10. The method of claim 9, further comprising receiving repair instructions from the dealer in response to the message, and displaying the repair instructions on the display of the gauge.

11. The method of claim 1, further comprising receiving a user input to select a waypoint along the selected off-road trail.

12. The method of claim 1, further comprising storing vehicle operation data linked to locations along the selected off-road trail.

13. The method of claim 1, further comprising providing turn by turn directions on the gauge for following selected off-road trail as the off-road vehicle traverses the selected off-road trail.

14. The method of claim 1, further comprising receiving a user input to selectively display service information related to the off-road vehicle on the display of the gauge, the service information including a service interval and a number of hours remaining until service is required.

15. The method of claim 1, wherein the off-road vehicle comprises one of a utility vehicle, an all-terrain vehicle, and a snowmobile.

16. The method of claim 1, further comprising selecting the off-road trail for traversal by off-road using one or more ride parameters selected from a group of ride parameters comprising:
preferred route distance;
route travel time;
nearby points of interest;
skill level of a rider; and
type of off-road vehicle.

17. The method of claim 1, wherein the selected off-road trail for traversal by off-road vehicle is highlighted on the displayed trail map.

18. The method of claim 1, further comprising receiving user inputs to pan and zoom the display of the trail map, and wherein the selected off-road trail for traversal by off-road vehicle remains highlighted on the displayed trail map regardless of panning or zooming.

19. The method of claim 1, further comprising calculating and displaying on the display an estimated range for the off-road vehicle based on fuel consumption.

20. A gauge for an off-road vehicle, the gauge comprising:
at least one processor;
a memory accessible by the at least one processor;
a display coupled to the processor; and
a wireless data link coupled to the processor to provide communication between the gauge and a handheld mobile device so that the gauge transmits information to the handheld mobile device and receives information from the handheld mobile device;
wherein the display includes a user selectable menu and the display receives:
a user input to selectively display vehicle operation information on the display of the gauge including at least one of vehicle speed, RPM, fuel level, coolant temperature;
a user input to selectively display information from a mobile device on the display of the gauge including at least one of phone call information, texting information, and cell signal strength; and
a user input to selectively display trail information on the display of the gauge, the trail information including at least one of a trail map for a selected off-road trail and information related to trail conditions on the selected off-road trail.

21. The gauge of claim 20, wherein the display receives a user input to selectively display service information related to the off-road vehicle on the display of the gauge, the service information including a service interval and a number of hours remaining until service is required.

22. The gauge of claim 20, further comprising a USB connector configured to be connected to a universal serial bus ("USB") drive.

23. The gauge of claim 20, further comprising a video connector configured to be coupled to a video camera so that the at least one processor displays video images on the display of the gauge.

24. The gauge of claim 20, further comprising a communication network connector configured to be coupled to a communication network of the vehicle so that the at least one processor communicates with an electronic control unit (ECU) of the vehicle.

25. The gauge of claim 24, wherein the communication network is a controller area network ("CAN") network.

26. The gauge of claim 20, further comprising an audio output connector, the audio output connector being configured to be connected to an audio output device of the off-road vehicle.

27. The gauge of claim 26, wherein the audio output device is a black box radio.

28. The gauge of claim 20, wherein the gauge also includes a power connector, a ground connector, a plurality of digital I/O connectors, a plurality of analog I/O connectors, and a communication network connector.

29. The gauge of claim 20, wherein the display receives a user input security code to permit operation of the off-road vehicle.

30. The gauge of claim 20, further comprising a toggle switch providing user inputs to navigate through the user selectable menu.

31. The gauge of claim 30, wherein the toggle switch is on a steering control of the off-road vehicle.

32. The gauge of claim 30, wherein the toggle switch is on a handlebar of a snowmobile.

33. The gauge of claim 30, wherein selection of menu items from the user selectable menu is based on an amount of time that the toggle switch is pressed in first and second directions.

34. The gauge of claim 20, wherein the information from the mobile device displayed on the display of the gauge includes phone call information, texting information, and cell signal strength.

35. The gauge of claim 20, wherein the information from the mobile device displayed on the display of the gauge includes information related to music stored on the mobile device.

36. The gauge of claim 20, wherein the information from the mobile device displayed on the display of the gauge includes information related to a software application on the mobile device.

37. The gauge of claim 20, wherein the display receives a diagnostic profile user selectable menu for instructing an operator to drive the vehicle in a controlled manner at a predetermined speed, acceleration, and/or torque, storing vehicle metrics from sensors received during operation of the vehicle in the controlled manner, and determining a diagnostic profile for the vehicle from the stored vehicle metrics.

38. The gauge of claim 37, wherein the vehicle sensors measure vehicle metrics including force, power, torque, motor current, battery current, battery voltage, motor speed, vehicle speed, and acceleration.

39. The gauge of claim 37, wherein the diagnostic profile is also determined based on at least one of an estimated vehicle weight, a tire type, and a tire pressure.

40. The gauge of claim 37, wherein the diagnostic profile includes information related to at least one of vehicle alignment, brake performance, suspension performance, range performance, and battery performance.

* * * * *

UNITED STATES PATENT AND TRADEMARK OFFICE
CERTIFICATE OF CORRECTION

PATENT NO. : 9,644,969 B2
APPLICATION NO. : 14/770424
DATED : May 9, 2017
INVENTOR(S) : David J. Koenig et al.

It is certified that error appears in the above-identified patent and that said Letters Patent is hereby corrected as shown below:

On the Title Page

Inventor Gary L. Gustafson's name is corrected by replacing "Gustafon" with "Gustafson".

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*